US012651125B2

(12) United States Patent
Galvin

(10) Patent No.: US 12,651,125 B2
(45) Date of Patent: Jun. 9, 2026

(54) SYSTEM AND METHOD FOR LATENT CONTEXTUAL THREADING IN PERSONALIZED DIALOGUE USING GEOMETRIC MANIFOLD TRAVERSAL

(71) Applicant: AtomBeam Technologies Inc., Moraga, CA (US)

(72) Inventor: Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/352,401

(22) Filed: Oct. 7, 2025

(65) Prior Publication Data

US 2026/0037743 A1 Feb. 5, 2026

Related U.S. Application Data

(63) Continuation-in-part of application No. 19/339,302, filed on Sep. 25, 2025, now Pat. No. 12,626,167, (Continued)

(51) Int. Cl.
*G06F 40/35* (2020.01)

(52) U.S. Cl.
CPC .................................... *G06F 40/35* (2020.01)

(58) Field of Classification Search
CPC ...................................................... G06F 40/35
See application file for complete search history.

(56) References Cited

U.S. PATENT DOCUMENTS

| | | | |
|---|---|---|---|
| 2019/0147349 A1* | 5/2019 | Ng | G06N 5/02 706/12 |
| 2023/0401262 A1* | 12/2023 | Orús Lacort | G06N 10/60 |
| 2024/0135283 A1* | 4/2024 | Sahoo | G06Q 10/06315 |

OTHER PUBLICATIONS

Gim, In, et al; "Prompt Cache: Modular Attention Reuse for Low-Latency Inference", arXiv:2311.04934v2, Apr. 2024.

* cited by examiner

*Primary Examiner* — Richemond Dorvil
*Assistant Examiner* — Ethan Daniel Kim
(74) *Attorney, Agent, or Firm* — GALVIN PATENT LAW LLC; Brian R. Galvin

(57) ABSTRACT

A system and methods for latent contextual threading for personalized dialogue through geometric manifold-based conversation management. The system maintains a personalized cognitive manifold as a geometric manifold in latent space that encodes user-specific dialogue patterns as navigable geometric structures. Multiple dialogue contexts are maintained as geometric trajectories within the manifold, with dialogue responses generated through manifold traversal rather than discrete context retrieval. A bidirectional adaptation system modifies the manifold's geometric structure based on user interactions. The system preserves dialogue continuity across session boundaries by serializing manifold geometry during session termination and restoring geometric positioning during session resumption. Dialogue coherence is evaluated through geometric analysis including curvature calculations and geodesic deviation measurements. The system maintains conversations through real-time manifold geometry modifications, providing dialogue experiences across session boundaries while maintaining contextual threading and personalized interaction patterns through geometric principles.

12 Claims, 22 Drawing Sheets

Related U.S. Application Data which is a continuation-in-part of application No. 19/294,125, filed on Aug. 7, 2025, now Pat. No. 12,579,437, which is a continuation-in-part of application No. 19/203,069, filed on Jun. 3, 2025, now Pat. No. 12,481,688, which is a continuation-in-part of application No. 19/205,960, filed on May 12, 2025, which is a continuation-in-part of application No. 19/060,794, filed on Feb. 24, 2025, which is a continuation-in-part of application No. 19/044,546, filed on Feb. 3, 2025, which is a continuation-in-part of application No. 19/026,276, filed on Jan. 16, 2025, which is a continuation-in-part of application No. 18/928,022, filed on Oct. 26, 2024, which is a continuation-in-part of application No. 18/919,417, filed on Oct. 17, 2024, now Pat. No. 12,602,586, which is a continuation-in-part of application No. 18/918,077, filed on Oct. 17, 2024, which is a continuation-in-part of application No. 18/737,906, filed on Jun. 7, 2024, and a continuation-in-part of application No. 18/736,498, filed on Jun. 6, 2024, said application No. 19/294,125 is a continuation-in-part of application No. 19/178,873, filed on Apr. 15, 2025, now Pat. No. 12,608,631, which is a continuation-in-part of application No. 19/177,611, filed on Apr. 13, 2025, now Pat. No. 12,572,471, which is a continuation-in-part of application No. 19/051,193, filed on Feb. 12, 2025, now Pat. No. 12,387,050, application No. 19/352,401, filed on Oct. 7, 2025 is a continuation-in-part of application No. 19/329,533, filed on Sep. 15, 2025, which is a continuation-in-part of application No. 19/329,369, filed on Sep. 15, 2025, which is a continuation-in-part of application No. 19/328,199, filed on Sep. 14, 2025, which is a continuation-in-part of application No. 19/328,179, filed on Sep. 14, 2025, application No. 19/352,401, filed on Oct. 7, 2025 is a continuation-in-part of application No. 19/328,103, filed on Sep. 13, 2025, which is a continuation-in-part of application No. 19/326,730, filed on Sep. 12, 2025, now Pat. No. 12,608,555, application No. 19/352,401, filed on Oct. 7, 2025 is a continuation-in-part of application No. 19/321,173, filed on Sep. 6, 2025, now Pat. No. 12,602,549, which is a continuation-in-part of application No. 19/284,115, filed on Jul. 29, 2025, which is a continuation-in-part of application No. 19/051,193, filed on Feb. 12, 2025, now Pat. No. 12,387,050, said application No. 19/326,730 is a continuation-in-part of application No. 19/245,366, filed on Jun. 22, 2025, now Pat. No. 12,418,680, and a continuation-in-part of application No. 19/204,525, filed on May 10, 2025, which is a continuation-in-part of application No. 19/192,215, filed on Apr. 28, 2025, which is a continuation-in-part of application No. 18/972,797, filed on Dec. 6, 2024, now Pat. No. 12,294,392, which is a continuation-in-part of application No. 18/648,340, filed on Apr. 27, 2024, now Pat. No. 12,166,507, which is a continuation-in-part of application No. 18/427,716, filed on Jan. 30, 2024, now Pat. No. 12,093,972, which is a continuation-in-part of application No. 18/410,980, filed on Jan. 11, 2024, now Pat. No. 12,068,761, which is a continuation-in-part of application No. 18/537,728, filed on Dec. 12, 2023, now Pat. No. 12,058,333.

(60) Provisional application No. 63/651,359, filed on May 23, 2024, provisional application No. 63/847,408, filed on Jul. 20, 2025, provisional application No. 63/847,082, filed on Jul. 19, 2025, provisional application No. 63/847,091, filed on Jul. 19, 2025, provisional application No. 63/847,096, filed on Jul. 19, 2025, provisional application No. 63/847,101, filed on Jul. 19, 2025, provisional application No. 63/847,889, filed on Jul. 21, 2025, provisional application No. 63/848,101, filed on Jul. 21, 2025, provisional application No. 63/848,202, filed on Jul. 21, 2025.

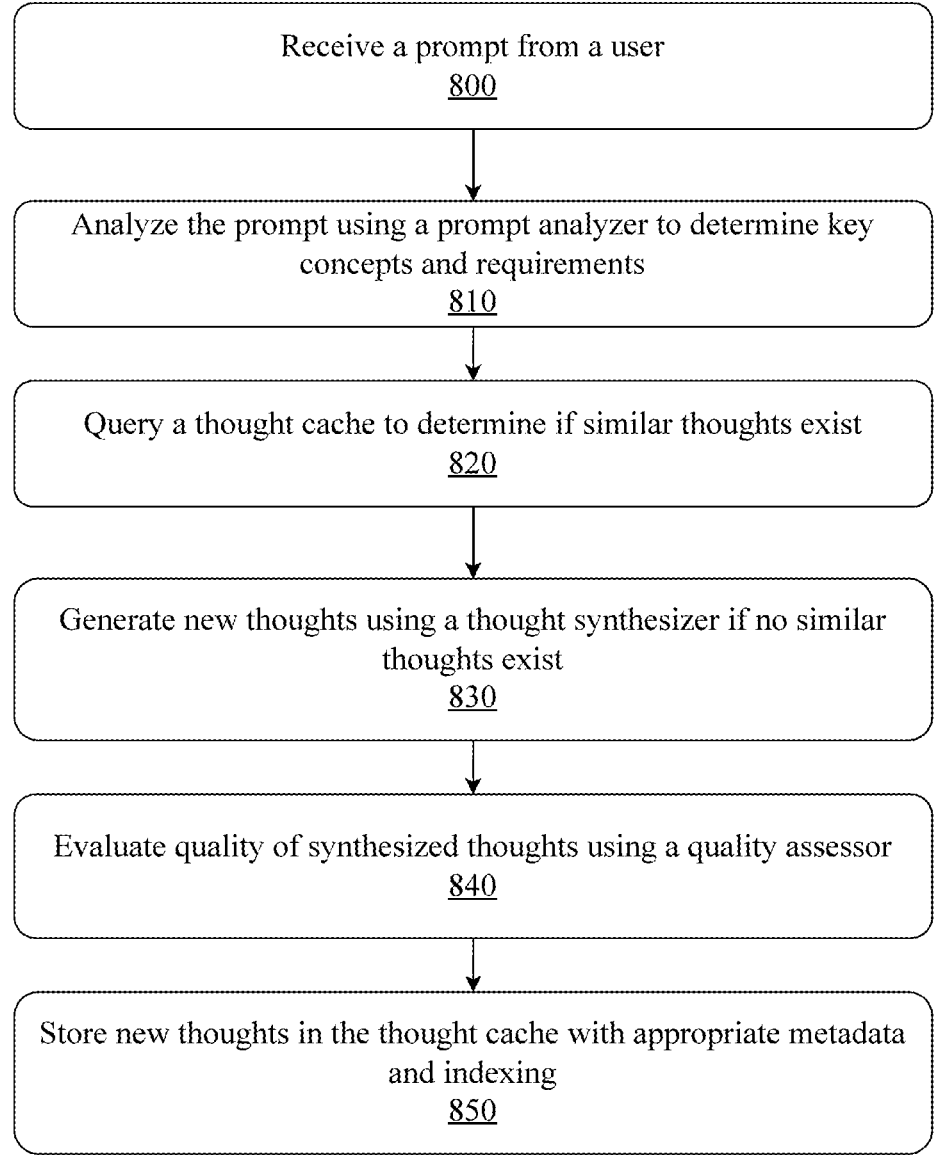

Receive a prompt from a user
800

Analyze the prompt using a prompt analyzer to determine key concepts and requirements
810

Query a thought cache to determine if similar thoughts exist
820

Generate new thoughts using a thought synthesizer if no similar thoughts exist
830

Evaluate quality of synthesized thoughts using a quality assessor
840

Store new thoughts in the thought cache with appropriate metadata and indexing
850

FIG. 8

SYSTEM AND METHOD FOR LATENT CONTEXTUAL THREADING IN PERSONALIZED DIALOGUE USING GEOMETRIC MANIFOLD TRAVERSAL

CROSS-REFERENCE TO RELATED APPLICATIONS

Priority is claimed in the application data sheet to the following patents or patent applications, each of which is expressly incorporated herein by reference in its entirety:

Ser. No. 19/339,302
Ser. No. 19/294,125
Ser. No. 19/203,069
Ser. No. 19/205,960
Ser. No. 19/060,794
Ser. No. 19/044,546
Ser. No. 19/026,276
Ser. No. 18/928,022
Ser. No. 18/919,417
Ser. No. 18/918,077
Ser. No. 18/737,906
Ser. No. 18/736,498
Ser. No. 19/178,873
Ser. No. 19/177,611
Ser. No. 19/051,193
Ser. No. 19/329,533
Ser. No. 19/329,369
Ser. No. 19/328,199
Ser. No. 19/328,179
Ser. No. 19/328,103
Ser. No. 19/326,730
Ser. No. 19/321,173
Ser. No. 19/284,115
Ser. No. 19/245,366
Ser. No. 19/204,525
Ser. No. 19/192,215
Ser. No. 18/972,797
Ser. No. 18/648,340
Ser. No. 18/427,716
Ser. No. 18/410,980
Ser. No. 18/537,728
63/651,359
63/847,408
63/847,082
63/847,091
63/847,096
63/847,101
63/847,889
63/848,101
63/848,202

BACKGROUND OF THE INVENTION

Field of the Invention

The present invention relates to artificial intelligence systems for human-machine dialogue, specifically systems and methods for maintaining personalized conversation continuity through latent contextual threading implemented via geometric manifold traversal and bidirectional adaptation mechanisms.

Discussion of the State of the Art

Current artificial intelligence dialogue systems face significant limitations in maintaining conversation continuity and personalization across extended interactions. Traditional systems rely on context windows that provide only limited historical awareness, typically constrained to recent exchanges within a single session. When context windows exceed capacity, older conversation elements are discarded, leading to loss of important contextual information and degraded dialogue coherence.

Existing approaches to dialogue personalization typically employ retrieval-augmented generation techniques that store and retrieve conversational snippets or user preference profiles as discrete data objects. These systems lack the ability to maintain nuanced, evolving representations of user communication patterns and preferences. While some systems implement user modeling through preference vectors or profile databases, these approaches fail to capture the complex, dynamic nature of human communication preferences that evolve through interaction.

Contemporary dialogue systems also struggle with cross-session continuity. Most implementations treat each conversation session as an independent interaction, requiring users to re-establish context and preferences with each new session. Although some systems attempt to address this through conversation history storage, they typically rely on simple concatenation or keyword matching rather than sophisticated contextual understanding.

Recent developments in large language models have introduced limited forms of contextual memory through techniques such as attention mechanisms and transformer architectures. However, these approaches remain fundamentally constrained by computational limitations and lack the ability to maintain personalized, persistent representations that adapt and evolve based on user interactions. Existing memory mechanisms in language models are typically static during inference and cannot dynamically adapt to user-specific communication patterns.

Current systems also lack sophisticated mechanisms for evaluating dialogue coherence and quality across temporal boundaries. Traditional metrics focus on immediate response quality rather than long-term conversational consistency and user satisfaction. This limitation prevents systems from optimizing their behavior based on extended interaction patterns and user engagement over time.

What is needed is a system and method that maintains persistent, personalized dialogue contexts through mathematical representations that can adapt dynamically to user preferences, preserve conversation continuity across arbitrary temporal boundaries, and provide sophisticated mechanisms for evaluating and optimizing long-term dialogue quality through geometric principles rather than discrete retrieval mechanisms.

SUMMARY OF THE INVENTION

The inventor has developed a system and methods for latent contextual threading for personalized dialogue through geometric manifold-based conversation management. The system maintains a personalized cognitive manifold as a geometric manifold in latent space that encodes user-specific dialogue patterns as navigable geometric structures. Multiple dialogue contexts are maintained as geometric trajectories within the manifold, with dialogue responses generated through manifold traversal rather than discrete context retrieval. A bidirectional adaptation system modifies the manifold's geometric structure based on user interactions. The system preserves dialogue continuity across session boundaries by serializing manifold geometry during session termination and restoring geometric positioning during session resumption. Dialogue coherence is evaluated through geometric analysis including curvature calculations and geodesic deviation measurements. The system maintains conversations through real-time manifold geometry modifications, providing dialogue experiences across session boundaries while maintaining contextual threading and personalized interaction patterns through geometric principles.

According to a preferred embodiment, a computer system for latent contextual threading for personalized dialogue comprising a hardware memory, wherein the computer system is configured to execute software instructions stored on nontransitory machine-readable storage media that: implement a personalized cognitive manifold as a geometric manifold in latent space that encodes user-specific dialogue patterns as navigable geometric structures; maintain multiple dialogue contexts as geometric trajectories within the personalized cognitive manifold, wherein dialogue responses are generated through manifold traversal rather than discrete context retrieval; and modify the geometric structure of the personalized cognitive manifold based on user interactions to improve dialogue personalization through bidirectional adaptation; wherein dialogue continuity is maintained through geometric trajectory following within the personalized cognitive manifold, enabling persistent conversations that adapt to user preferences through real-time manifold geometry modifications.

According to another preferred embodiment, a method for latent contextual threading for personalized dialogue comprising: implementing a personalized cognitive manifold as a geometric manifold in latent space that encodes user-specific dialogue patterns as navigable geometric structures; maintaining multiple dialogue contexts as geometric trajectories within the personalized cognitive manifold, wherein dialogue responses are generated through manifold traversal rather than discrete context retrieval; and modifying the geometric structure of the personalized cognitive manifold based on user interactions to improve dialogue personalization through bidirectional adaptation; wherein dialogue continuity is maintained through geometric trajectory following within the personalized cognitive manifold, enabling persistent conversations that adapt to user preferences through real-time manifold geometry modifications.

According to a further aspect, the method includes personalized cognitive manifold comprises a Riemannian manifold with time-evolving metric tensors that encode dialogue preference strength through local curvature properties.

According to a further aspect, the personalized cognitive manifold comprises a Riemannian manifold with time-evolving metric tensors that encode dialogue preference strength through local curvature properties.

According to a further aspect, maintaining multiple dialogue contexts comprises implementing a contextual thread manager that assigns unique thread identifiers and tracks manifold coordinate positions for each dialogue trajectory.

According to a further aspect, generating dialogue responses through manifold traversal comprises calculating geodesic paths through the personalized cognitive manifold and navigating along computed trajectories to maintain semantic coherence.

According to a further aspect, modifying the geometric structure comprises computing curvature adjustments based on user interaction patterns and implementing geometric flow processes that reshape manifold properties while preserving mathematical consistency.

According to a further aspect, the system is further configured to execute software instructions that preserve dialogue trajectory states across session boundaries by serializing manifold geometry and restoring geometric positioning during session resumption.

According to a further aspect, the system is further configured to execute software instructions that evaluate dialogue coherence through geometric analysis including Ricci curvature calculations and geodesic deviation measurements within the manifold.

According to a further aspect, the bidirectional adaptation comprises analyzing user engagement patterns and implementing real-time metric tensor modifications that adjust manifold distance relationships to reflect learned user preferences.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 8 is a flow diagram illustrating an exemplary method for thought creation, evaluation, and storage within the system.

DETAILED DESCRIPTION OF THE INVENTION

Figure 1:
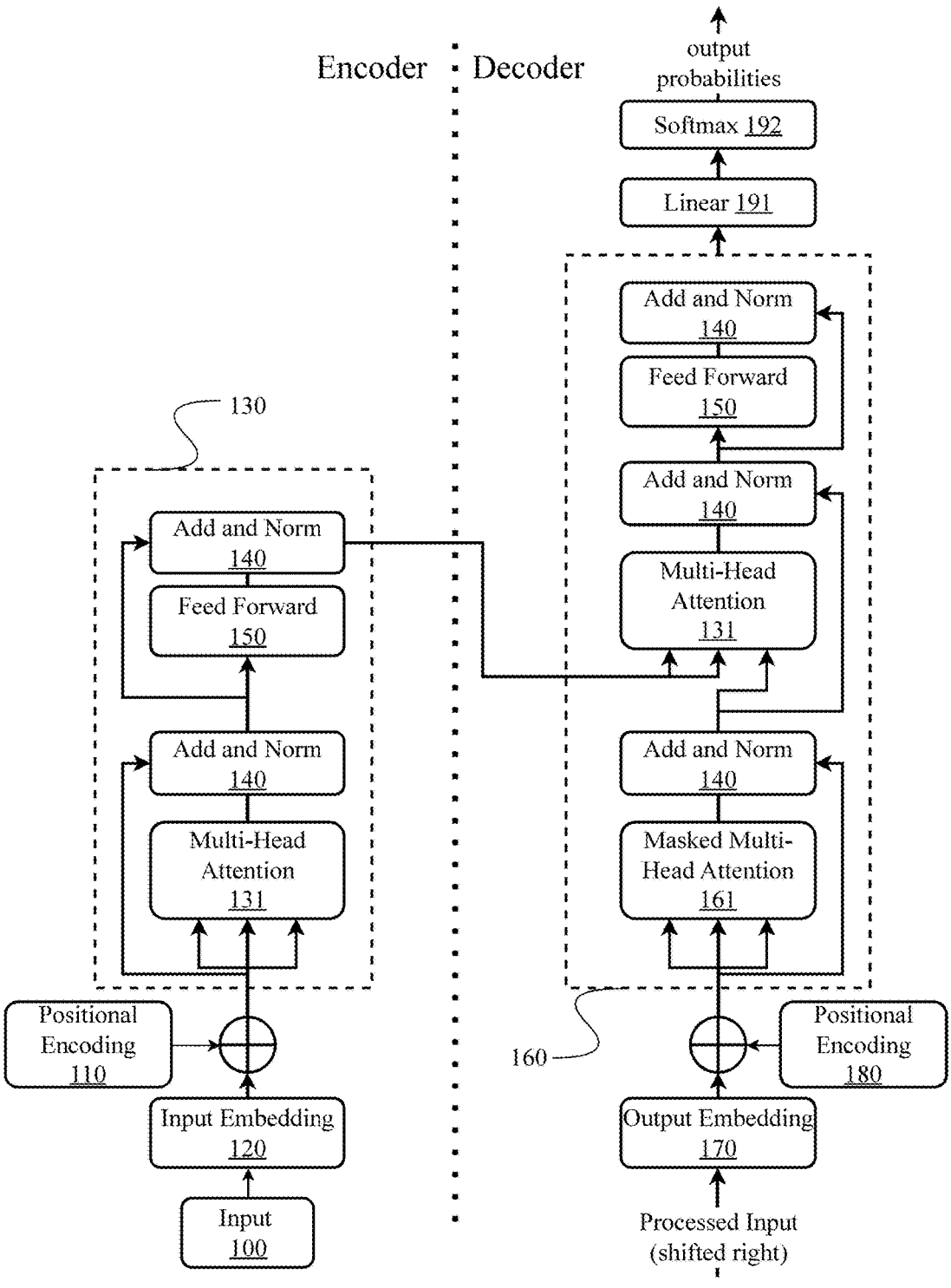
FIG. 1 (Prior Art) is a block diagram illustrating a common transformer architecture used in most large language models.

The inventor has conceived, and reduced to practice, a system and methods for latent contextual threading for personalized dialogue through geometric manifold-based conversation management. The system maintains a personalized cognitive manifold as a geometric manifold in latent space that encodes user-specific dialogue patterns as navigable geometric structures. Multiple dialogue contexts are maintained as geometric trajectories within the manifold, with dialogue responses generated through manifold traversal rather than discrete context retrieval. A bidirectional adaptation system modifies the manifold's geometric structure based on user interactions. The system preserves dialogue continuity across session boundaries by serializing manifold geometry during session termination and restoring geometric positioning during session resumption. Dialogue coherence is evaluated through geometric analysis including curvature calculations and geodesic deviation measurements. The system maintains conversations through real-time manifold geometry modifications, providing dialogue experiences across session boundaries while maintaining contextual threading and personalized interaction patterns through geometric principles.

The multi-tier thought caching architecture consists of a local device cache that stores both user-specific thoughts and frequently accessed generalized thoughts, a user-specific cloud cache that preserves the user's complete thought history with appropriate encryption, and a global generalized thought cache that maintains abstracted reasoning patterns applicable across multiple users. This tiered approach balances the need for personalized, private thought storage with the efficiency benefits of shared reasoning patterns, while ensuring that mobile devices can operate regardless of connectivity status.

Through thought generalization techniques, the system identifies common reasoning patterns across multiple users, removes personally identifiable information and specific context, and abstracts these patterns into generalized thought structures that can be shared without compromising privacy. This generalization process involves pattern recognition to identify similar reasoning approaches, context removal techniques that strip away user-specific elements, and abstraction methods that transform specific thoughts into more universally applicable structures. By sharing these generalized thoughts across users, the system achieves efficiency improvements without requiring each user to independently generate similar reasoning patterns.

The system's mobile-specific optimizations address the constraints of mobile environments, including limited computational resources, battery constraints, and intermittent connectivity. Battery-aware execution scaling adjusts the complexity and resource utilization of language model components based on the device's current power state, implementing multiple execution profiles ranging from high-performance operation when charging to efficient processing when battery levels are low. Incremental thought synchronization optimizes network usage by prioritizing the transfer of high-value thoughts during brief connectivity periods, while predictive thought pre-caching anticipates user needs based on usage patterns and contextual cues, ensuring relevant thoughts are available locally even when connectivity is lost.

To enable extended context while managing the resource constraints of mobile devices, the system implements hierarchical thought management that organizes cached thoughts at different levels of abstraction. Rather than maintaining all historical context as raw tokens, the system progressively compresses older information into more abstract thought representations, preserving essential reasoning patterns and knowledge while reducing storage and processing requirements. This hierarchical approach comprises immediate context level for recent interactions, session context level for the current interaction session, historical context level for previous sessions, and generalized knowledge level for broadly applicable patterns. As information ages or becomes less immediately relevant, it transitions through these levels via context compression processes, while remaining accessible through context expansion when needed for current reasoning tasks.

The system's approach to offline functionality represents an advancement for mobile applications. When network connectivity is unavailable and no directly relevant thoughts exist in the local cache, the system employs adaptation strategies to modify existing cached thoughts to address new prompts. These strategies include generalizing specific thoughts to broader applications, combining multiple partially relevant thoughts to address complex queries, applying thought patterns from one domain to related domains through analogical reasoning, and transforming existing thoughts through modification of context, parameters, or application scope. These adaptation capabilities ensure that users receive responses even without network access, maintaining functionality during offline periods.

This architecture integrates with mobile device capabilities, incorporating contextual awareness through sensor data, supporting voice and visual input modalities, and adapting to the user's environment and activities. Privacy and security considerations are addressed through a hierarchical access control mechanism that maintains separation between personal thoughts in user-specific caches and anonymized thoughts in the global cache, with encryption for user-specific data both on-device and in the cloud.

Through these methods, the system combines the reasoning power of large language models with the efficiency requirements of mobile computing, delivering natural language processing capabilities with reduced computational overhead, offline operation, and optimized battery utilization. This approach enables deployment of advanced language model capabilities in resource-constrained mobile environments without sacrificing the quality of responses, representing an advancement in making language technologies accessible across a broader range of devices and usage scenarios.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "thought" refers to a discrete unit of reasoning or analysis generated by a large language model during its processing of an input prompt. A thought represents the model's intermediate reasoning steps, analysis, or considerations about the prompt before generating a final response. Thoughts are generated during a reasoning phase of the model's operation and contain the model's understanding, context analysis, and logical processing of the prompt. Unlike raw text or embeddings, thoughts encapsulate the model's processed reasoning in a form that can be cached, retrieved, and reused for similar prompts. Thoughts may be explicitly visible in model outputs or may be internally generated, and can be stored in various cache architectures including local and cloud-based systems. These cached thoughts can be combined with new prompts to generate responses using smaller language models, effectively preserving the reasoning capabilities of larger models while reducing computational overhead.

As used herein, "context" refers to both traditional sequence-based context where a language model processes a series of tokens representing prior interactions or information, and thought-based context where the model processes higher-level abstractions in the form of thought sequences. Traditional context operates at the token level, maintaining a history of specific words, phrases, and their relationships through mechanisms like attention windows. In contrast, thought-based context operates at a higher level of abstraction, where each thought represents a complex unit of reasoning or understanding. This dual nature of context allows the system to maintain contextual awareness both through detailed token-level information and through more abstract thought-level representations, enabling efficient processing of complex interactions while reducing the computational overhead typically associated with maintaining long token sequences. Thought-based context can compress what would traditionally require thousands of tokens into a smaller number of thought units, each capturing key reasoning patterns and conceptual relationships relevant to the interaction.

Two Stage LLM with Infinite Context System Architecture

FIG. 1 (Prior Art) is a block diagram illustrating a common transformer architecture used in most large language models. A transformer generally comprises an encoder (the components on the left side of the illustration) and a decoder (the components on the right side of the illustration).

The illustrated transformer comprises an encoder and a decoder. The encoder takes input embeddings and processes them through a stack of layers (represented as dashed box 130). Each layer consists of: positional encoding, which adds position information to the input embeddings; multi-head attention, which allows the model to attend to different parts of the input sequence; add and norm, which applies residual connection and layer normalization; feed forward, which is a fully connected feed-forward network; and add and norm which is another residual connection and layer normalization.

The power of the transformer model lies in the self-attention mechanism. This mechanism contributes to accelerated learning compared to traditional models such as long short-term memory models. Self-attention empowers the transformer model with the remarkable capability to meticulously scrutinize distinct segments of a given sequence or even encompass the entire contextual essence of a sentence. This profound contextual awareness enables the model to make predictions with an elevated degree of accuracy and relevance.

The transformer takes a processed vector as its input 100. The input embedding 120 to the encoder is a sequence of tokens, typically represented as integers. Each token is mapped to a learnable embedding vector of a fixed size. The embedding layer is a lookup table that converts each token into its corresponding dense vector representation. The embeddings are learned during training and capture semantic and syntactic relationships between tokens.

A dense vector representation, also known as a dense embedding or a continuous vector representation, is a way of representing data, particularly words or tokens, as dense vectors in a high-dimensional continuous space. In the context of natural language processing (NLP) and language models, dense vector representations are used to capture semantic and syntactic information about words or tokens. Each word or token is mapped to a fixed-size vector of real numbers, typically with hundreds or thousands of dimensions. Each word or token is represented by a vector of a fixed size, regardless of the length of the input sequence. The size of the vector is a hyperparameter that is determined during model design. The vectors exist in a continuous high-dimensional space, where each dimension represents a latent feature or aspect of the word or token. The continuous nature allows for capturing fine-grained relationships and similarities between words. The dense vector representations are learned during the training process of the model. The model learns to assign similar vectors to words that have similar meanings or occur in similar contexts. The dense vector representations aim to capture semantic and syntactic relationships between words. Words that have similar meanings or are used in similar contexts tend to have similar vector representations. Dense vector representations allow for performing algebraic operations on words, such as addition and subtraction. These operations can capture analogies and relationships between words, such as "prince"−"man"+"woman"≈"princess". Dense vector representations serve as input features for various downstream NLP tasks, such as text classification, sentiment analysis, named entity recognition, and machine translation. The dense representations provide a rich and informative input to the models, enabling them to learn patterns and make predictions. Some popular examples of dense vector representations include, but are not limited to, Word2Vec, Global Vectors for Word Representations (GloVe), FastText, and BERT.

After the input embedding layer, positional encoding 110 is added to the input embedding to provide position information to the model. Since the Transformer architecture doesn't have inherent recurrence or convolution, positional encodings help capture the order and relative positions of tokens. The positional encodings are typically sine and cosine functions of different frequencies, allowing the model to learn relative positions. The positional encodings have the same dimensionality as the input embeddings and are summed with them.

The encoder utilizes a multi-head attention mechanism 131 which is a key component of the transformer architecture. It allows the encoder to attend to different parts of the input sequence and capture dependencies between tokens. The attention mechanism computes three matrices: query (Q), key (K), and value (V). The query, key, and value matrices are obtained by linearly projecting the input embeddings using learned weight matrices. The attention scores are computed by taking the dot product of the query matrix with the transpose of the key matrix, followed by scaling and applying a softmax function. The attention scores determine the importance of each token in the input sequence for a given position. The value matrix is then multiplied with the attention scores to obtain the weighted sum of the values, which forms the output of the attention mechanism. Multi-head attention splits the query, key, and value matrices into multiple heads, allowing the model to attend to different aspects of the input simultaneously. The outputs from each head are concatenated and linearly projected to obtain the final output of the multi-head attention layer 131.

After the multi-head attention layer, a residual connection is applied, followed by layer normalization at add and norm 140. The residual connection adds the input embeddings to the output of the attention layer, helping the model learn faster and deeper. Layer normalization normalizes the activations across the features, stabilizing the training process.

While traditional multi-head attention mechanisms contributes to accelerated learning compared to models like LSTMs, innovations like multi-head Latent Attention (MLA) further enhance efficiency through low-rank key-value joint compression. MLA achieves this by compressing the key-value pairs into a latent vector, significantly reducing the key value cache required during inference while maintaining or improving performance compared to standard multi-head attention mechanism. The attention mechanism still empowers the model to scrutinize distinct segments of sequences, but MLA does so while requiring only a fraction of the computational resources The feed forward layer 150 is a fully connected neural network applied to each position of the encoder's hidden states. It consists of two linear transformations with a Rectified Linear Unit (ReLU) activation function in between. The purpose of the feed forward 150 layer is to introduce non-linearity and increase the model's capacity to learn complex representations. The output of the feed forward 150 layer has the same dimensionality as the input embeddings. A residual connection and layer normalization 140 are applied after the feed forward 150 layer.

The encoder layers 130 are stacked Nx times, where N is a hyperparameter that determines the depth of the Encoder. Each layer follows the same structure: multi-head attention, add & norm, feed forward, and add & norm. By stacking multiple encoder layers, the model can capture hierarchical and long-range dependencies in the input sequence. The output of the final encoder layer represents the encoded input sequence, which is then passed to the decoder for generating the output sequence.

The decoder generates the output probabilities. It has a similar structure to the Encoder, with a few additions. The decoder takes output embeddings and processes them through a stack of layers (represented as dashed box 160). The output embedding layer 170 takes the previous processed input tokens (shifted right by one position) and converts them into dense vectors. Each token is mapped to a learnable embedding vector of a fixed size. The embedding vectors capture semantic and syntactic relationships between tokens.

Positional encoding 180 is added to the output embedding 170 to provide position information to the model. Since the transformer architecture does not have inherent recurrence or convolution, positional encodings help capture the order and relative positions of tokens. The positional encodings are typically sine and cosine functions of different frequencies, allowing the model to learn relative positions.

The masked multi-head attention 161 mechanism prevents the model form attending to future tokens. This layer performs self-attention on the decoder's input sequence. It allows the decoder to attend to different parts of its own input sequence. The attention is "masked" to prevent the decoder from attending to future tokens, ensuring that the predictions are based only on the previously generated tokens. Multi-head attention splits the input into multiple heads, allowing the model to attend different aspect of the input simultaneously.

After the masked multi-head attention, a residual connection is applied follows by layer normalization via add and norm 140. The residual connection adds the input to the output of the attention layer, helping the model learn faster and deeper. Layer normalization normalizes the activations across the features, stabilizing the training process.

The multi-head attention 131 layer performs attention between the decoder's hidden states and the encoder's output. It allows the decoder to attend to relevant parts of the input sequence based on the encoder's representations. The attention weights are computed based on the compatibility between the Decoder's hidden states and encoder's outputs.

Another add and norm 140 layer is then followed by feed forward network 150. This a fully connected feed-forward network applied to each position of the decoder's hidden states. It consists of two linear transformations with a Rectified Linear Unit (ReLU) activation in between. The feed forward layer helps the model capture non-linear interactions and increases the model's capacity.

Another add and norm 140 layer is followed by linear 191 and softmax 192 layers. The final hidden states of the decoder are passed through a linear transformation to project them into the vocabulary space. Vocabulary space refers to the set of all unique tokens or words that the model can generate or predict. In the context of language models, the vocabulary is a predefined set of tokens that the model is trained on and can output. When the decoder's final hidden states are passed through a linear transformation, they are projected into a vector space with the same dimensionality as the size of the vocabulary. Each dimension in this space corresponds to a specific token in the vocabulary. For example, the model has a vocabulary of 10,000 unique tokens. The linear transformation would project the decoder's hidden states into a 10,000-dimensional vector space. Each element in this vector represents the model's predicted probability or score for the corresponding token in the vocabulary.

A softmax function is applied to the projected values (vectors) to generate output probabilities over the vocabulary. The softmax function normalizes the values so that they sum up to 1, representing a probability distribution over the vocabulary. Each probability indicates the likelihood of a specific token being the next output token. The token with the highest probability is selected as the next output token. During the model's training, the objective is to maximize the probability of the correct next token given the input sequence and the previously generated tokens. The model learns to assign higher probabilities to the tokens that are more likely to appear based on the context. At inference time, the token with the highest probability in the vocabulary space is selected as the next output token. This process is repeated iteratively, with the generated token being fed back into the decoder as input for the next step, until a stopping criterion is met (e.g., reaching a maximum length or generating an end-of-sequence token). The size and composition of the vocabulary can vary depending on the specific task and the data the model is trained on. It can include words, sub-words, or even characters, depending on the tokenization strategy used.

The decoder layers 160 can be stacked Nx times, allowing the model to capture complex dependencies and generate coherent output sequences.

This transformer architecture allows the model to process input sequences, capture long-range dependencies, and generate output sequence based on the encoded input and the previously generated tokens.

There are at least three variations of transformer architecture that may enable an LCM. A first such variation comprises Auto-Encoding Models. In autoencoders, the decoder portion of the transformer is discarded after pretraining and only the encoder is used to generate the output. The popular BERT and ROBERTa models are examples of models based on this architecture and perform well on sentiment analysis and text classification. These types of models may be trained using a process called masked language modeling (MLM).

The primary goal of an autoencoder is to learn efficient representations of input data by encoding the data into a lower-dimensional space and then reconstructing the original data from the encoded representation. Autoencoders are trained in an unsupervised manner, meaning they don't require labeled data. They learn to capture the underlying structure and patterns in the input data without explicit guidance. An autoencoder consists of two main components: an encoder and a decoder. The encoder takes the input data and maps it to a lower-dimensional representation, often referred to as the latent space or bottleneck. The decoder takes the latent representation and tries to reconstruct the original input data. Autoencoders can be used for dimensionality reduction by learning a compressed representation of the input data in the latent space. The latent space has a lower dimensionality than the input data, capturing the most salient features or patterns. The training objective of an autoencoder is to minimize the reconstruction error between the original input and the reconstructed output. The model learns to encode and decode the data in a way that preserves the essential information needed for reconstruction. Variants and extensions of autoencoders can include denoising autoencoders, variational autoencoders (VAEs) which introduce a probabilistic approach to autoencoders wherein they learn a probabilistic encoder and decoder, allowing for generating new samples from the learned latent space, and conditional autoencoders which incorporate additional conditions or labels as input to the encoder and decoder, enabling the generation of samples conditioned on specific attributes.

Autoencoders can have various applications. Autoencoders can be used to detect anomalies by measuring the reconstruction error. Anomalous samples tend to have higher reconstruction errors compared to normal samples. Autoencoders can be used as a pre-training step to learn meaningful features from unlabeled data. The learned features can then be used for downstream tasks like classification or clustering. Additionally, or alternatively, autoencoders, particularly VAEs, can be used as generative models to generate new samples similar to the training data by sampling from the learned latent space. It's worth noting that while autoencoders can be effective for certain tasks, they have some limitations. They may struggle to capture complex dependencies and may generate blurry or less sharp reconstructions compared to other generative models like Generative Adversarial Networks (GANs).

Another type of variation is the auto-regressive model which feature the use of only the decoder portion of the transformer architecture. In autoregressive architectures, the decoder portion of the transformer is retained and the encoder portion is not used after model pre-training. Auto-regressive models are a class of models that generate outputs by predicting the next element based on the previously generated elements. In the context of the Transformer architecture and language modeling, auto-regressive models are commonly used for tasks such as text generation, machine translation, and language understanding.

Auto-regressive models generate outputs sequentially, one element at a time. In the case of language modeling, the model predicts the next word or token based on the previous words or tokens in the sequence. The prediction of the next element is conditioned on the previously generated elements. The model learns the conditional probability distribution $P(x_t|x\_1, x\_2, \ldots, x\_\{t-1\})$, where $x\_t$ is the element at position t, and $x\_1, x\_2, \ldots, x\_\{t-1\}$ are the previously generated elements. The transformer architecture, particularly the decoder component, is well-suited for auto-regressive modeling. The decoder generates the output sequence one element at a time, conditioned on the previously generated elements and the encoded input sequence from the encoder. In the transformer decoder, the self-attention mechanism is masked to prevent the model from attending to future positions during training. This masking ensures that the model relies only on the previously generated elements to make predictions, following the auto-regressive property. During training, the transformer decoder uses a technique called teacher forcing. Instead of feeding the model's own predictions as input for the next step, the ground truth target sequence is used. This helps the model learn to generate the correct output sequence based on the input sequence and the previous target tokens. During inference or generation, the transformer decoder generates the output sequence one element at a time. At each step, the model takes the previously generated elements as input and predicts the next element. This process continues until a stopping criterion is met, such as reaching a maximum sequence length or generating an end-of-sequence token. Auto-regressive models, including the transformer, have achieved state-of-the-art performance in language modeling tasks. They excel at capturing the statistical properties and dependencies in sequential data, making them effective for generating coherent and fluent text.

While text generation is the most suitable use case of auto-regressors, they perform exceptionally well on a wide variety of tasks. Most modern LLMs are auto-regressors including, for example, the popular GPT series of LLMs, BERT, and XLNet.

The third variation of the transformer model is the sequence-to-sequence model which utilizes both the encoder and decoder portions of the transformer and can be trained in multiple ways. One of the methods is span corruption and reconstruction. These models are, generally, best suited for language translation. The T5 and BART family of models are examples of sequence-to-sequence models.

Figure 2:
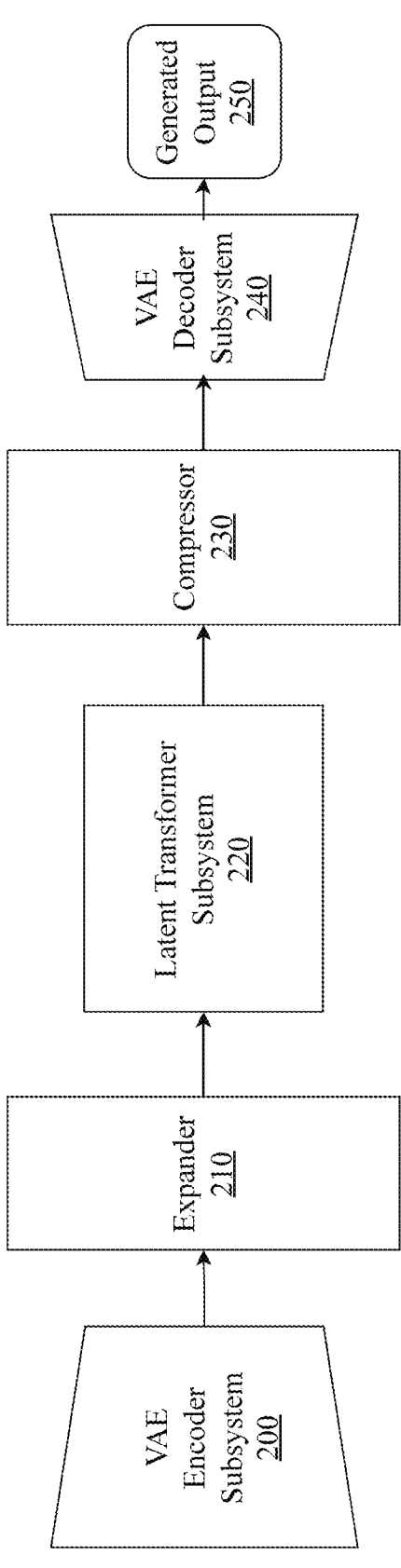
FIG. 2 is a block diagram illustrating an exemplary architecture for a latent transformer, where the transformer operates on latent space vector representations of an input.

FIG. 2 is a block diagram illustrating an exemplary architecture for a latent transformer, where the transformer operates on latent space vector representations of an input. Central to a latent transformer is a latent transformer subsystem 220, which serves as the central processing unit responsible for learning the underlying patterns, relationships, and dependencies within the input data. Latent transformer subsystem 220 leverages advanced techniques such as self-attention mechanisms and multi-head attention to capture the complex interactions and sequences in the data, enabling it to generate accurate and context-aware outputs.

The input to latent transformer subsystem 220 is provided by a VAE (Variational Autoencoder) encoder subsystem 200. VAE encoder subsystem 600 is responsible for encoding an input into a lower-dimensional latent space representation. VAE encoder subsystem 200, learns to compress the data into a compact latent space representation while preserving the essential features and characteristics of the input. Latent space vectors produced by the VAE encoder subsystem 200 may be further processed by an expander 210, which increases the dimensionality of the input data to a point where the vectors can be efficiently processed by latent transformer subsystem 220.

A latent space representation of the input generated by VAE encoder subsystem 200 serves as the input to latent transformer subsystem 220. Latent transformer subsystem 220 operates in this latent space, leveraging the compressed and informative representation to learn the complex patterns and relationships within the data. By working in the latent space, latent transformer subsystem 220 can efficiently process and model the data, capturing the intricate dependencies and generating accurate and meaningful outputs.

Once latent transformer subsystem 220 has processed the latent space representation, the generated output is passed through a VAE decoder subsystem 240. VAE decoder subsystem 240 is responsible for decoding the latent space representation back into the original data space. Prior to processing by VAE decoder subsystem 240, latent transformer subsystem 220 outputs may be compressed back to an original size before being processed by the expander 210 by being processed by a compressor 230. VAE decoder subsystem 240 learns to reconstruct the original data from the latent space representation, ensuring that the generated output is coherent and meaningful.

The reconstructed output from VAE decoder subsystem 240 is provided as a compressed generated output 250. The compressed generated output 250 represents the final result of the latent transformer, which is a compressed version of the original input.

VAE encoder subsystem 200 and VAE decoder subsystem 240 play large roles in the overall functioning of the latent transformer. VAE encoder subsystem 200 enables the system to learn a compressed and informative representation of the input data in the latent space, while the VAE decoder subsystem 240 ensures that the compressed generated output 250 is coherent and meaningful by reconstructing it back into the original data space. The combination of these subsystems allows the latent transformer to focus on learning the complex patterns and relationships within the data, leading to accurate and context-aware outputs.

The specific architectures and parameters of VAE encoder subsystem 200, latent transformer subsystem 220, and VAE decoder subsystem 240 can be customized and adapted based on the characteristics and requirements of the input data and the specific task at hand. The modular design of the system allows for flexibility and extensibility, enabling the integration of different architectures, attention mechanisms, and training techniques to optimize the performance and efficiency of the latent transformer.

Figure 3:
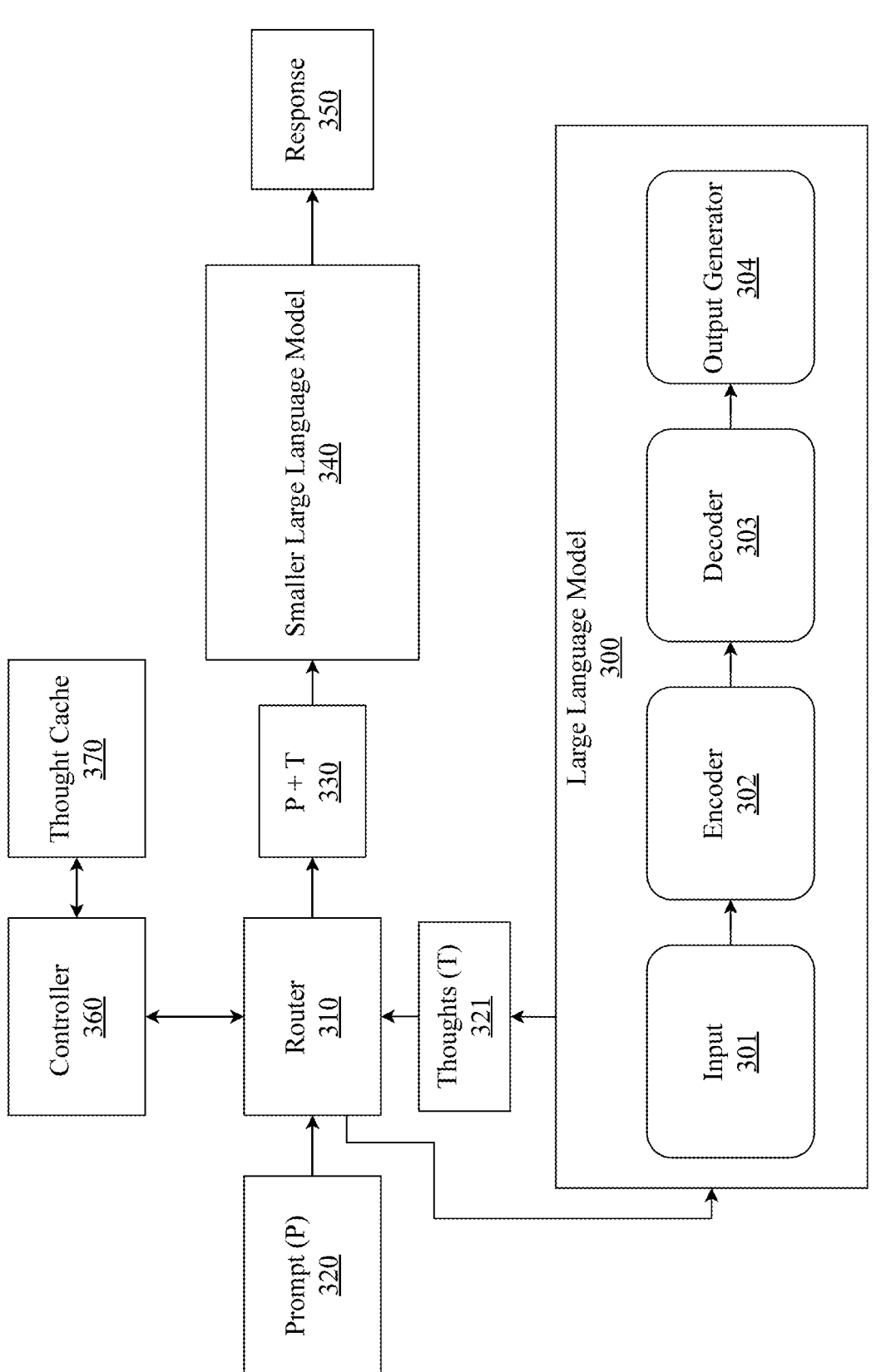
FIG. 3 is a block diagram illustrating an exemplary system architecture for a multi-state LLM with unlimited context.

FIG. 3 is a block diagram illustrating an exemplary system architecture for a multi-state LLM with unlimited context. The system includes a large language model 300, a router 310, a controller 360, a thought cache 370, and a smaller language model 340 that work together to process prompts and generate responses while optimizing computational resources.

The system receives an initial prompt (P) 320 through the router 310. The router serves as the central control component, determining whether to utilize the large language model 300 or access the thought cache 370 through the controller 360. Upon receiving a prompt, the router first queries the thought cache to determine if relevant thoughts exist for similar prompts.

The large language model 300 includes an input component 301, an encoder 302, a decoder 303, and an output generator 304. The large language model 300 can utilize various internal architectures, including but not limited to traditional transformer cores (as shown in FIG. 1) or latent transformer cores (as shown in FIG. 2). The model's attention mechanisms can be implemented using either standard multi-head attention (MHA) or multi-head latent attention (MLA), with the overall system functioning identically regardless of the specific attention mechanism chosen. When using MLA, the model benefits from reduced KV cache requirements during inference while maintaining performance comparable to or better than traditional MHA implementations. When the router determines that cached thoughts are not available or suitable, the prompt is processed through the large language model 300. During this processing, the model enters a reasoning phase where it generates thoughts (T) 321 about the prompt. These thoughts represent the model's analysis and reasoning about the prompt before generating a final response.

The controller 360 manages interaction with the thought cache 370, which can be implemented as either a local or cloud-based storage system. The thought cache stores previously generated thoughts in a vector database format, allowing for efficient retrieval of relevant thoughts for similar prompts. The cache can maintain both session-specific thoughts for temporary storage and long-term thoughts for persistent knowledge.

When thoughts are either generated by the large language model or retrieved from the cache, they are combined with the original prompt to create a prompt and thought combination (P+T) 330. This combination is then routed to the smaller language model 340, which requires significantly fewer computational resources than the large model. The smaller model processes the P+T 330 combination to generate the final response 350.

In operation, for example, if a user submits a prompt asking about climate change impacts, the router first checks the thought cache for relevant existing thoughts. If suitable thoughts exist, they are retrieved and combined with the prompt. If no relevant thoughts are found, the large model processes the prompt to generate new thoughts about climate science, global impacts, and relevant data. These thoughts, combined with the original prompt, are then processed by the smaller model 340 to generate a concise, relevant response. The new thoughts are also cached for future use. To demonstrate how thoughts are created, imagine the prompt "What do you think is the future of string theory, particularly given the spectacular failure of supersymmetry at LHC" being entered into the LLM DeepSeek. During the reasoning phase, the model returns to the user the following thoughts:

"Okay, the user is asking about the future of string theory in light of supersymmetry not being found at the LHC. Let me start by recalling what I know about string theory and SUSY.

String theory relies heavily on supersymmetry because SUSY helps stabilize the extra dimensions and makes the math work better. But the LHC hasn't found any superpartners, which challenges some of the more popular SUSY models. However, I should note that SUSY isn't the only part of string theory. There are versions without it, like bosonic string theory, but those aren't as developed or realistic.

The user might be implying that since SUSY isn't found, string theory is in trouble. I need to address that but also explain why it's not the whole story. Maybe mention that SUSY could still exist at higher energy scales beyond LHC's reach. Also, string theory has other applications beyond particle physics, like in condensed matter or quantum gravity.

I should break down the response into points. First, clarify the relationship between SUSY and string theory. Then discuss the LHC results and their implications. Talk about other areas where string theory contributes, like holography or black hole physics. Mention alternatives within string theory that don't rely on low-energy SUSY. Also, touch on the possibility of future experiments or theoretical breakthroughs.

Need to be balanced. Acknowledge the challenges but also the potential. Avoid being too dismissive or overly optimistic. Maybe conclude by saying the future is uncertain but still active in different areas. Check if there are recent developments post-LHC that I should consider, but since the user didn't specify, stick to general points.

Make sure to explain technical terms like "landscape" or "holography" briefly. Keep the language accessible but precise. The user might be someone with a basic understanding of physics, possibly a student or enthusiast. They want to know if string theory is still viable and where it's headed. They might also be interested in how scientific theories adapt when experimental evidence is lacking.

In summary, structure the answer to address the SUSY issue, discuss other aspects of string theory, mention alternative research directions, and conclude with the ongoing relevance despite challenges. Ensure each point flows logically and answers the user's concern about the theory's future post-LHC results." Using the above generated thoughts, model generated a response to the user's query.

The above thoughts represent T in the accompanying FIG. 3. By extracting thoughts generated by a model in their reasoning phase and passing both those thoughts and the initial prompt through a substantially smaller model with less parameters, the same response may be given while using much less energy.

The system supports multiple cache architectures, including but not limited to local device storage for personal use and cloud-based storage for enterprise applications. This allows for knowledge sharing across users while maintaining appropriate privacy and access controls. Multiple specialized caches can exist for different domains or use cases, such as financial analysis or scientific research.

The system supports multiple specialized cache architectures that enable domain-specific knowledge storage and AI agent collaboration. These architectures include but are not limited to local device caches for personal use, edge caches for specific AI agents, and distributed cloud-based caches for enterprise applications. Each specialized cache maintains its own thought organization optimized for its domain—for instance, a financial analysis cache might structure thoughts around market patterns and risk assessment frameworks, while a scientific research cache might organize thoughts based on experimental methodologies and theoretical frameworks. AI agents can be assigned primary affinity to specific specialized caches while maintaining ability to access other caches when needed. For example, a financial analysis agent might primarily interact with the financial cache but could access the scientific research cache when analyzing biotechnology investments. The system implements cache-specific validation rules and quality metrics tailored to each domain's requirements—financial thoughts might require numerical accuracy validation, while scientific thoughts might undergo peer-review-style verification by other AI agents. These specialized caches can operate independently or in interconnected hierarchies, with bridge agents managing thought transfer between different domains. Enterprise deployments can maintain multiple parallel specialized caches with varying access levels, enabling selective knowledge sharing while preserving security boundaries. For instance, a pharmaceutical company might maintain separate but interconnected caches for public research, proprietary development, and regulatory compliance, with AI agents navigating these boundaries based on clearance levels and task requirements.

The system achieves effectively unlimited context windows through a combination of thought abstraction and hierarchical memory management. Rather than attempting to maintain extended token sequences, the system is capable of converting contextual information into thought representations that capture higher-level patterns and relationships. These thoughts serve as compressed encodings of context, where each thought unit may encapsulate understanding that would traditionally require thousands of tokens to represent.

In one embodiment, the system implements a multi-tier thought storage architecture where context exists simultaneously at multiple levels of abstraction. The most recent context maintains detailed thought representations with full fidelity, while older context is progressively synthesized into more abstract thought patterns that capture essential relationships and understanding while reducing storage requirements. This progressive abstraction allows the system to maintain effectively unlimited context while managing computational resources efficiently.

When processing new prompts, router 310 analyzes both recent detailed thoughts and older abstract thoughts to identify relevant context. A thought synthesizer 430 can then combine these different levels of abstraction to generate new thoughts that incorporate both immediate context and long-term understanding. This multi-level synthesis enables the system to maintain contextual coherence across extended interactions without requiring linear scaling of computational resources.

Thought cache 370 implements indexing structures that maintain temporal relationships between thoughts while enabling efficient retrieval based on relevance. Unlike traditional attention mechanisms that must process entire token sequences, the system can directly access relevant thoughts across any temporal distance through its hierarchical indexing system. This capability allows the model to maintain contextual awareness across arbitrarily long sequences while keeping retrieval costs nearly constant.

In one embodiment, thought cache 370 implements multiple storage tiers that automatically organize thoughts based on their temporal relevance and utilization patterns. In its primary tier, the thought cache maintains recent thoughts with their complete reasoning chains and relationship mappings intact. As these thoughts age within the cache, specialized consolidation mechanisms within the cache combine related thoughts into more efficient meta-thoughts that preserve essential reasoning while reducing storage overhead.

Thought cache 370 monitors access patterns and triggers consolidation events when thought clusters meet specific temporal or utilization thresholds. During these events, thought cache 370 analyzes thought clusters using its built-in synthesis capabilities to generate consolidated meta-thoughts. These meta-thoughts capture insights and relationships from the original thought cluster while requiring significantly less storage space. For example, a sequence of thoughts about various machine learning algorithms might consolidate into a meta-thought capturing their comparative advantages and key implementation considerations.

Intelligence within thought cache 370 adapts consolidation timing based on thought utility metrics. Thought cache 370 tracks each thought's retrieval frequency, synthesis participation, and relationship density with other thoughts. Thoughts demonstrating high utility retain their detailed form longer, while less frequently accessed thoughts undergo earlier consolidation. This adaptive approach ensures that frequently needed reasoning patterns remain readily available in their most useful form.

Thought cache's 370 hierarchical storage structure spans multiple performance tiers, from high-speed memory for recent and frequently accessed thoughts to more economical storage for consolidated meta-thoughts. Thought cache 370 may migrate thoughts between these tiers based on usage patterns and age, optimizing storage resource utilization while maintaining rapid access to relevant contextual information. This tiered structure enables the cache to efficiently manage large volumes of thoughts while keeping the most pertinent information readily accessible.

Thought cache 370 implements a universal thought representation format that enables consistent interpretation across different language models and reasoning contexts. This standardization occurs through a formal thought schema that defines how reasoning steps, logical relationships, and contextual dependencies are encoded. Each thought contains structured fields for core reasoning components, metadata describing the thought's context and assumptions, and explicit markers for temporal and logical dependencies. This structured format ensures that thoughts remain interpretable regardless of which model originally generated them or which model ultimately consumes them.

Before a cached thought is applied to a new context, the system may perform an automated compatibility analysis. This analysis examines both the structural alignment between the cached thought and the current context, and the semantic applicability of the reasoning pattern. The system maintains model-specific adapters that can transform thoughts between different models' preferred reasoning styles while preserving the core logical structure. These adapters handle variations in formatting, vocabulary, and reasoning granularity, ensuring smooth thought transfer between models with different characteristics.

The cache incorporates a contextual validation layer that assesses thought applicability before reuse. When retrieving a cached thought, this layer examines the current prompt's context against the thought's encoded assumptions and dependencies. If misalignments are detected, the system can automatically generate bridging thoughts that reconcile differences between the cached reasoning and the current context. For example, if a cached mathematical proof assumes certain preconditions that differ slightly from the current problem, the system generates additional reasoning steps to account for these differences.

The system's thought schema includes explicit version controls and model compatibility markers. These markers identify which model versions and architectures have successfully utilized each thought, enabling the cache to predict compatibility issues before attempting thought reuse. When new model versions are deployed, the system can automatically flag thoughts that may require revalidation or adaptation to maintain compatibility with updated model capabilities or knowledge cutoffs.

Through these standardization and compatibility mechanisms, the thought cache ensures reliable thought transfer across different models and contexts while maintaining the integrity of reasoning patterns. The combination of structured thought representation, contextual validation, and adaptive transformation enables efficient thought reuse while preventing inconsistencies or misinterpretations.

Through this architecture, the system achieves effective unlimited context not through brute-force token retention but through intelligent abstraction and synthesis of understanding. The smaller language model can process these thought-based contexts more efficiently than traditional token sequences, enabling contextual reasoning without the computational overhead typically associated with extended context windows.

The system supports multiple architectural approaches for maintaining extended context through thought processing. While transformer-based attention mechanisms provide one implementation path, the system can alternatively employ recurrent neural networks (RNNs) for processing thought sequences. In an RNN-based implementation, thoughts are processed sequentially, with the network's hidden state maintaining a compressed representation of historical context. This approach enables efficient processing of arbitrary-length thought sequences while maintaining a constant memory footprint, as the hidden state size remains fixed regardless of sequence length.

The system may also implement memory networks for thought storage and retrieval. These networks maintain an explicit, addressable memory that stores thought representations and their relationships. Unlike attention mechanisms that must process all context simultaneously, memory networks can selectively access relevant thoughts through content-based addressing. The memory network architecture enables direct access to specific thoughts based on relevance to the current prompt, without requiring linear scanning of the entire context history.

The thought cache itself can be structured as a differentiable neural memory, where thoughts are stored as embeddings that can be smoothly updated and combined. This approach enables the cache to learn optimal thought storage and retrieval patterns through experience, adapting its organization to maximize the utility of cached thoughts. The differentiable memory structure supports gradient-based optimization of thought storage and retrieval operations, allowing the system to continuously improve its context management efficiency.

Hybrid architectures combining multiple approaches can leverage the strengths of each method. For example, in one embodiment, the system might employ RNNs for sequential thought processing while using a memory network for long-term storage, or combine transformer attention for recent context with compressed RNN states for historical context. These hybrid approaches enable flexible scaling of context processing based on specific application requirements and resource constraints.

Figure 4:
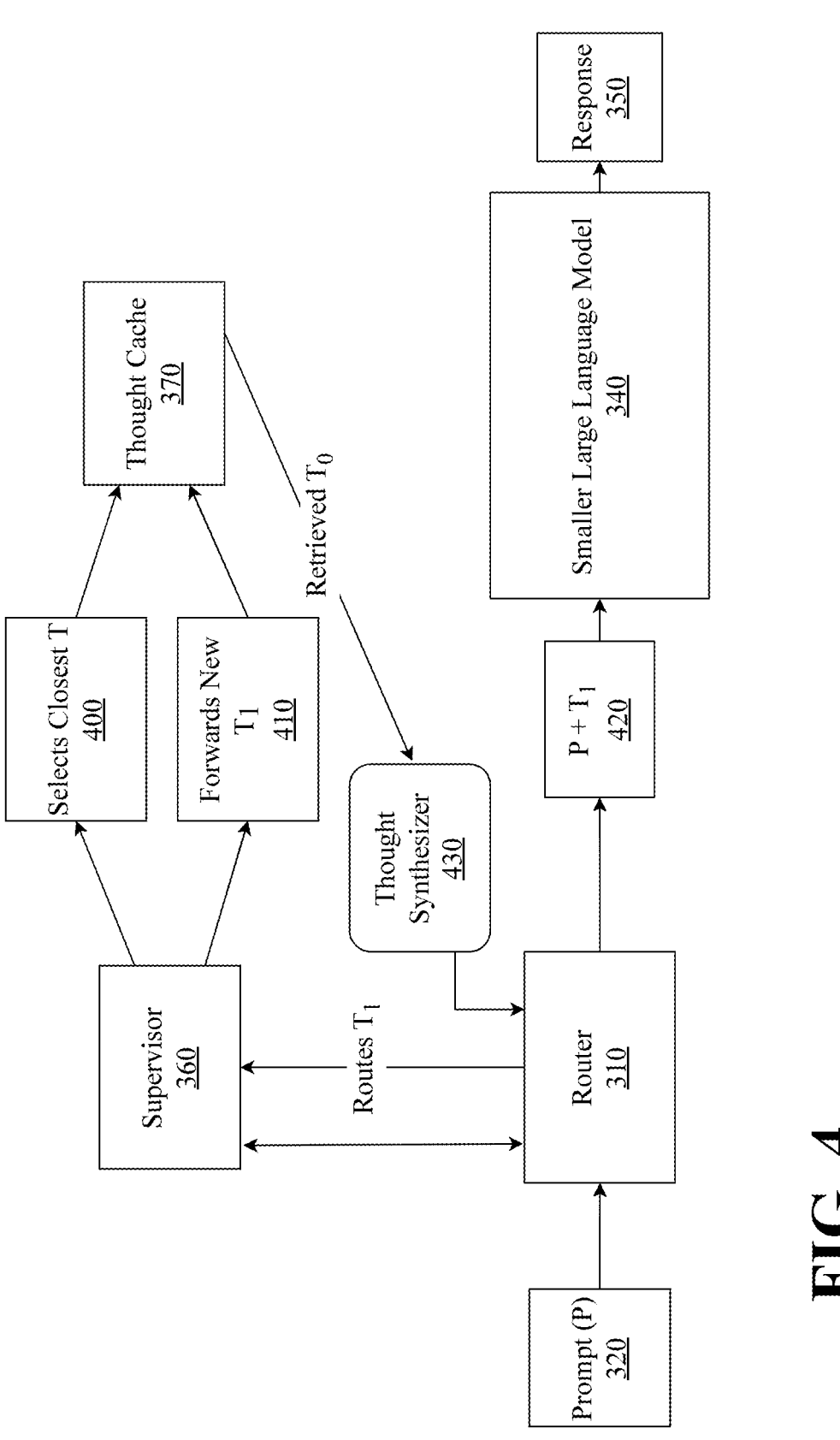
FIG. 4 is a block diagram illustrating an exemplary system architecture for a multi-state LLM with unlimited context with thought synthesis and retrieval.

FIG. 4 is a block diagram illustrating an exemplary system architecture for a multi-state LLM with unlimited context with thought synthesis and retrieval. The figure demonstrates how the system handles scenarios where cached thoughts may be relevant but not precisely matched to the current prompt.

The system begins when a prompt (P) 320 is received by the router 310. When router 310 receives a prompt 320, it interacts with the thought cache 370 through the controller 360 to retrieve potentially relevant thoughts.

The controller 360 performs two key functions in this embodiment. First, it selects the closest thought ($T_0$) 400 from the cache that relates to the current prompt. Second, after a synthesizer 430 creates a new thought $T_1$ 410, controller 360 manages the storage of newly synthesized thoughts. The controller evaluates the retrieved $T_0$ against certain relevance thresholds to determine if synthesis is needed. These thresholds can be configured based on vector similarity scores between the prompt and the cached thought, with different thresholds potentially being set for different domains or use cases. For example, a threshold of 0.8 (on a 0-1 scale) might indicate the thought is relevant enough to use directly, while scores between 0.5-0.8 might trigger synthesis with other related thoughts, and scores below 0.5 might indicate the need to generate entirely new thoughts using the large model. The system can also employ multiple thresholds simultaneously-one for determining if a thought is "close enough" to use directly, another for determining if thoughts are similar enough to be candidates for synthesis, and another for determining if cached thoughts are relevant enough to be considered at all.

The system can assign and append relevance scores and metadata to thoughts in several ways. When a thought (T) is created by the large model, it can be analyzed and scored across multiple dimensions including but not limited to quality assessment metrics, vector embeddings, usage statistics, and domain tags. Quality assessment encompasses the thought's reasoning pattern quality based on its structure and completeness, accuracy scores for verifiable facts, and confidence scores from the model about its conclusions. Vector embeddings can be calculated and stored with each thought, allowing for fast similarity comparisons during cache lookups, with multiple specialized embeddings potentially stored for different aspects like topic, reasoning style, and domain. Usage statistics track metrics such as success rates when the thought is used (including user feedback), frequency of successful reuse, and performance metrics when used with different types of prompts. Domain tags provide additional context through subject matter categorization, specific topic tags, and required expertise level indicators. These scores and metadata can be stored alongside the thought in the cache in a structured format and updated over time based on usage patterns. The comprehensive metadata enables more sophisticated routing and synthesis decisions while allowing the system to improve its thought selection over time through continuous feedback and performance tracking. For instance, a thought might store its general and domain-specific embeddings, various quality and confidence scores, detailed categorization, and usage statistics, all of which can be used to make more informed decisions about when and how to use or synthesize that thought in future operations.

A synthesizer 360 processes $T_0$ to create a new thought $T_1$ that better aligns with the current prompt's requirements. For example, if a prompt asks about specific aspects of quantum computing, and $T_0$ contains general quantum computing concepts, the synthesizer can create a $T_1$ that focuses more precisely on the specific aspects requested in the prompt.

Thought synthesizer 430 combines and processes thoughts when multiple relevant thoughts are found or when existing thoughts need modification. For example, if one cached thought covers quantum bits and another covers error correction, the synthesizer can combine these into a new thought that addresses quantum computing error rates in qubits. The synthesizer can also adapt existing thoughts to better match current prompt requirements. This synthesis process involves understanding the logical relationships between different thoughts, identifying complementary and conflicting information, and creating coherent combinations that preserve the accuracy and context of the original thoughts. The synthesizer employs various combination strategies depending on the relationship between thoughts—it might perform simple concatenation for complementary thoughts, create hierarchical structures for nested concepts, or generate entirely new bridging content to connect related ideas. Additionally, the synthesizer can evaluate the quality of synthesized thoughts and may generate multiple candidate combinations before selecting the most appropriate one based on relevance scores and coherence metrics.

The synthesizer can work with multiple retrieved thoughts simultaneously, combining relevant aspects from each to create a more comprehensive $T_1$. For instance, if one cached thought contains information about neural networks and another about computer vision, the synthesizer could combine relevant aspects of both to create a new thought more specifically targeted to a prompt about neural networks in computer vision applications.

The system may implement multiple strategies for thought synthesis, enabling the combination of existing cached thoughts to generate new, contextually relevant thoughts without necessarily engaging the large language model. These synthesis mechanisms operate on both the semantic content and vector representations of thoughts, employing various combination strategies depending on the relationship between thoughts and specific prompt requirements. The fundamental approach builds upon vector-based synthesis, where thoughts are represented in a high-dimensional embedding space that preserves semantic relationships through spatial relationships. In one embodiment, when multiple relevant thoughts are retrieved from the cache, their vector representations can be combined through a plurality of mathematical operations to create new thought vectors. These operations may include but are not limited to weighted averaging where more relevant thoughts receive higher weights in the final combination, vector addition with normalization that preserves the directional information of component thoughts, dimensional projection where thoughts are combined along specific semantic dimensions while preserving others, and non-linear combination using learned transformation matrices.

The system demonstrates this vector-based synthesis through concrete applications. For instance, when processing a prompt that requires information about quantum computing's impact on cryptocurrency, and the cache contains separate thoughts about quantum computing ($T_1$) and cryptocurrency security ($T_2$), the system performs a weighted combination expressed as $T\_new=\alpha*T1+\beta*T2$, where $\alpha$ and $\beta$ represent relevance weights determined by similarity scores between each thought and the prompt. The resulting vector $T\_new$ is normalized to maintain consistent magnitude in the embedding space, ensuring that the synthesized thought retains proper proportional representation of its component concepts.

Beyond pure vector operations, the system, in additional embodiments, may employ neural synthesis through a specialized small-scale transformer model trained specifically for thought combination. A neural synthesizer would receive multiple thought vectors as input and generates a new, synthesized thought that captures the relevant aspects of all inputs while maintaining internal consistency. The neural synthesis component is capable of identifying and resolving contradictions between input thoughts, preserving temporal relationships and causal chains, generating bridging content to connect related concepts, and maintaining consistency with the original prompt context. This approach proves particularly valuable when combining thoughts that require subtle understanding of context and implications.

In another embodiment, the system may implement rule-based synthesis through a set of predefined combination patterns based on the logical relationship between thoughts. These patterns support sequential combination for thoughts representing steps in a process, hierarchical combination for thoughts with parent-child relationships, comparative combination for contrasting or parallel thoughts, and supplementary combination for thoughts that provide additional context or examples. The rule-based approach ensures that the structural integrity of thought relationships is preserved during synthesis.

In an embodiment, the system may employ a synthesis quality assessor that evaluates potential thought combinations before they are executed. This assessment examines semantic coherence of the combined thought, preservation of critical information from source thoughts, relevance to the original prompt, and internal consistency of the synthesized thought. The quality assessment process helps prevent the generation and propagation of invalid or inconsistent thought combinations.

In scenarios where multiple synthesis strategies might apply, the system employs a multi-stage synthesis process. This process begins by generating candidate syntheses using different strategies, proceeds to evaluate each candidate using quality metrics, selects the highest-quality synthesis result, and caches the successful synthesis strategy for similar future combinations. This approach ensures optimal synthesis results while building a knowledge base of effective strategies.

The synthesis mechanism supports multiple operation modes including synchronous operation for immediate response requirements, asynchronous operation for background synthesis and cache optimization, and hybrid operation for progressive refinement of synthesized thoughts. This flexibility allows the system to balance response time requirements with synthesis quality needs. Through these synthesis mechanisms, the system can effectively combine and evolve cached thoughts to address new prompts without always requiring the computational overhead of the large language model, while maintaining the quality and relevance of generated responses.

Once $T_1$ is created, it is combined with the original prompt to form $P+T_1$ 420, which is then processed by the smaller language model 340 to generate the final response 350. The newly synthesized $T_1$ is also routed back through the controller for potential caching with thought cache 370, allowing it to be used for future similar prompts.

In one embodiment, thought cache 370 provides performance improvements by eliminating redundant reasoning computations across similar prompts. When 310 router identifies a new prompt with reasoning requirements similar to previously processed queries, thought cache 370 can supply validated thought patterns rather than requiring the large language model to reconstruct the reasoning chain from scratch. This caching mechanism is particularly effective for common analytical patterns, such as mathematical derivations, logical deductions, or standard analytical frameworks that appear frequently across different prompts.

Additionally, thought cache 370 is capable of serving as a quality assurance mechanism by maintaining verified reasoning patterns. Once a thought sequence has been validated and demonstrates consistent success in generating accurate responses, that sequence becomes a trusted template for handling similar queries. For instance, when processing mathematical problems, the cache may contain verified proof structures that can be applied to new problems within the same class, ensuring consistent and reliable solution approaches.

In one embodiment, thought cache 370 implements a validation scoring system that tracks the success rate and reliability of each cached thought. This scoring considers factors such as but not limited to response accuracy, user feedback, and consistency with known truth standards. Thoughts that consistently contribute to high-quality responses receive higher validation scores, making them more likely to be selected for reuse in similar contexts. The cache can also mark certain thoughts as "golden" references when they demonstrate exceptional reliability in specific domains, establishing them as preferred reasoning patterns for their respective problem types.

To prevent the propagation of incorrect reasoning, thought cache 370 may employ a continuous validation mechanism. This mechanism monitors the performance of cached thoughts and can automatically flag patterns that lead to inconsistent or incorrect responses. When potential issues are detected, thought cache 370 may temporarily suspend the use of problematic thoughts and route similar prompts through the large language model for fresh analysis. This self-correction capability ensures that the efficiency benefits of thought caching do not come at the expense of response quality.

Thought cache 370 is capable of supporting selective thought inheritance, where new prompts can partially inherit validated reasoning patterns while allowing for context-specific modifications. This flexibility enables the system to leverage proven reasoning frameworks while adapting them to specific query requirements, combining the benefits of cached reliability with contextual relevance. Through these mechanisms, the thought cache achieves both performance optimization and quality enhancement, delivering faster responses while maintaining or improving the reliability of the system's outputs.

Through this synthesis process, the system can effectively leverage partially relevant cached thoughts to create more precise and relevant thoughts for the current prompt, reducing the need to engage the large language model while still maintaining response quality and relevance.

In another embodiment, thought cache 370 implements security and privacy controls to protect sensitive information while enabling efficient thought reuse. At the storage level, thought cache 370 maintains isolation between user contexts through encrypted partitioning. Each user's thoughts are encrypted with user-specific keys, ensuring that even within shared cache infrastructure, thoughts remain securely compartmentalized. This encryption extends to both the thought content and the associated metadata, preventing unauthorized access to reasoning patterns that might reveal proprietary information.

In the embodiment, thought cache 370 implements a permissions framework that governs thought sharing and reuse. By default, thoughts derived from user interactions are marked private and restricted to the originating user's context. Users can optionally designate specific thoughts for shared use through explicit consent mechanisms. When thoughts are marked for sharing, the cache employs automated sanitization processes that strip personally identifiable information and sensitive data while preserving the underlying reasoning patterns. This sanitization uses advanced pattern recognition to identify and remove context-specific details while maintaining the thought's utility for general reasoning.

To protect against cache poisoning attacks, thought cache 370 may incorporate a multi-stage validation pipeline. Before any thought is cached, it undergoes verification through a separate validation model that assesses its logical consistency and checks for potential malicious patterns. The cache maintains cryptographic checksums of validated thoughts, enabling rapid verification of thought integrity during retrieval operations. Additionally, the cache tracks the provenance of each thought, maintaining secure audit trails of thought creation, modification, and usage patterns.

The system implements graduated access controls that can restrict thought reuse based on security clearance levels, organizational boundaries, or specific sharing agreements. These controls allow enterprises to maintain separate thought caches for different security domains while selectively enabling thought sharing under controlled conditions. For instance, a financial institution might maintain separate caches for public customer service interactions and privileged internal analyses, with strict controls governing any cross-domain thought utilization.

Through these security mechanisms, the thought cache enables efficient reasoning reuse while protecting sensitive information and maintaining system integrity. The combination of encryption, access controls, and validation processes ensures that the performance benefits of thought caching do not compromise security or privacy requirements.

Figure 5:
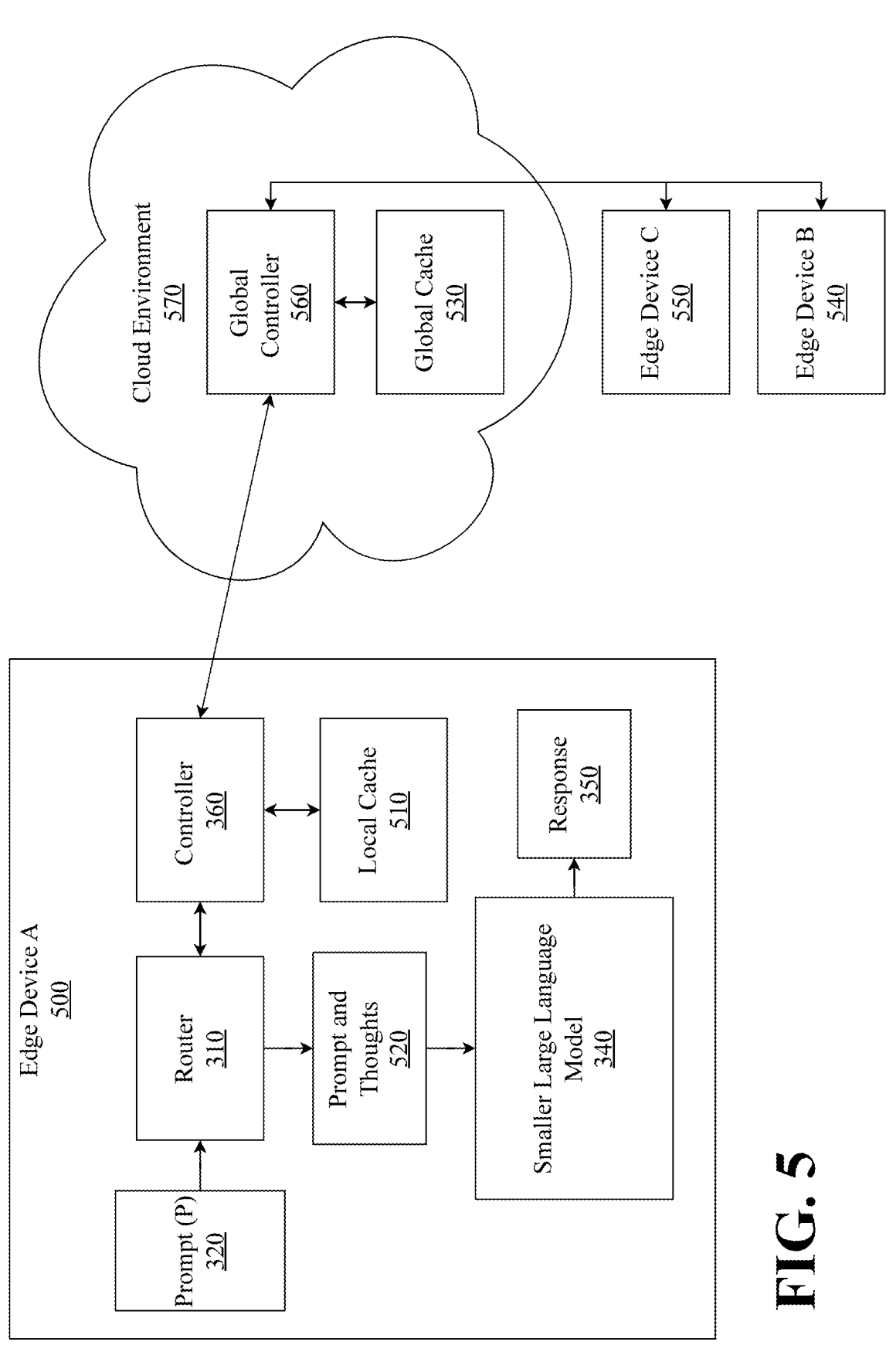
FIG. 5 is a block diagram illustrating an exemplary system architecture for a multi-state LLM with unlimited context with local and global thought caches.

FIG. 5 is a block diagram illustrating an exemplary system architecture for a multi-state LLM with unlimited context with local and global thought caches. This embodiment demonstrates how the system can operate primarily on edge devices while maintaining access to a broader knowledge base through cloud connectivity.

Edge device A 500 represents a complete edge implementation of the system, which could be a device such as but not limited to a mobile phone, tablet, or other personal computing device. Within the edge device 500, router 310 receives prompts (P) 320 and coordinates with a local controller 360 and local cache 510. Local cache 510 stores frequently accessed or personally relevant thoughts directly on the device, enabling quick access and offline functionality.

The smaller language model 340 runs directly on the edge device, processing prompt and thought combinations 520 to generate responses 350. This local processing capability significantly reduces latency and computational requirements compared to constantly accessing cloud resources.

The cloud environment 570 contains a global cache 530 managed by a global controller 560. This global infrastructure serves as a centralized repository for thoughts generated across multiple edge devices (B 540, C 550). The global controller coordinates cache synchronization and manages access patterns across the network of connected devices.

When an edge device's controller 360 cannot find relevant thoughts in its local cache 510, it can query the global controller 560 to search the global cache 530. For example, if a user on edge device A 500 asks a question about a topic they haven't encountered before, the system first checks the local cache 510, then can reach out to the global cache 530 for relevant thoughts.

The system supports bi-directional synchronization, where new thoughts generated on edge devices can be uploaded to the global cache, and frequently accessed global thoughts can be downloaded to local caches. This creates a dynamic knowledge-sharing environment while maintaining efficient local operation.

Through this architecture, the system provides the benefits of edge computing (low latency, offline capability, privacy) while maintaining access to a broader knowledge base through the cloud infrastructure. The distributed nature of the system allows for efficient scaling and knowledge sharing across user communities while minimizing the computational load on individual devices.

Figure 6:
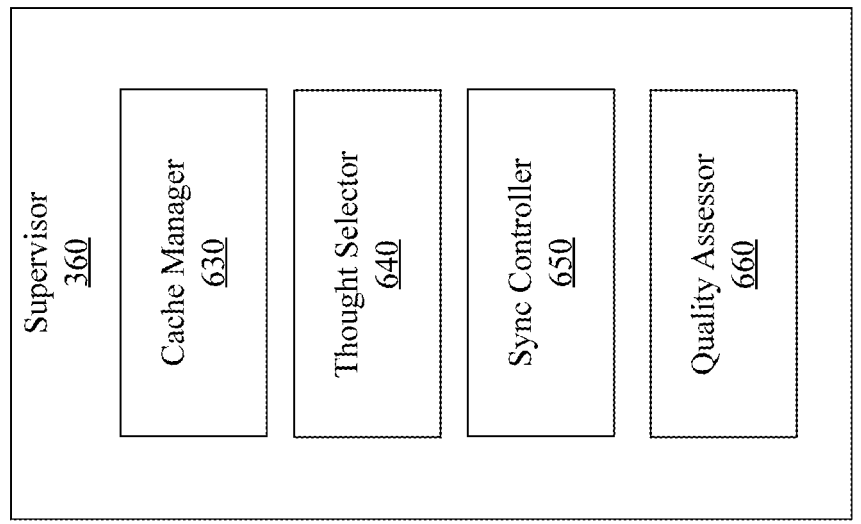
FIG. 6 is a block diagram illustrating exemplary components for a multi-state LLM with unlimited context, a router and a controller.

FIG. 6 is a block diagram illustrating exemplary components for a multi-state LLM with unlimited context, a router and a controller. A prompt analyzer 600 processes incoming prompts to determine their characteristics, domain, and requirements. For example, if a user submits a prompt about quantum computing, the analyzer identifies key technical terms, determines the complexity level, and flags specific concepts that may need specialized thoughts. It also evaluates whether the prompt requires reasoning about multiple concepts (like quantum computing and machine learning) that might benefit from thought synthesis. Analyzer 600 employs natural language processing to break down the prompt into component parts, identifying primary topics, subtopics, relationships between concepts, required depth of knowledge, and any constraints or special requirements specified in the prompt. It can also detect the tone and style of the desired response, technical sophistication level of the user, and whether the prompt requires factual recall, analytical reasoning, or creative synthesis.

A cache query interface 610 serves as the communication bridge between the router and cache systems. It formats prompt analysis results into efficient cache queries and manages the retrieval process. For instance, when searching for thoughts about quantum computing, it might query both technical definition thoughts and practical application thoughts, managing multiple parallel cache requests to both local and global caches. The interface optimizes query patterns based on the analyzer's output, constructing sophisticated search parameters that account for concept hierarchies, semantic relationships, and contextual relevance. It can prioritize different aspects of the query based on importance, manage query timeouts and fallbacks, and handle distributed cache architectures efficiently. The interface also implements caching strategies to optimize frequent queries and manages cache coherence between local and global storage.

A model selector 620 makes intelligent decisions about model utilization based on cache results and prompt analysis. It implements decision logic to determine whether to: use the large model for new thought generation, proceed with cached thoughts through the smaller model, or employ a hybrid approach. For example, if highly relevant thoughts exist in the cache, it might bypass the large model entirely to save computational resources. In one embodiment, model selector 620 employs decision trees and heuristics that consider multiple factors including thought relevance scores, computational resource availability, response time requirements, and quality thresholds. It can dynamically adjust its selection criteria based on system load, cache hit rates, and historical performance metrics. Model selector 620 also maintains statistics about the effectiveness of its decisions to continuously refine its selection strategy and may implement different selection policies based on user preferences or application requirements.

A cache manager 630 handles the organization, storage, and retrieval of thoughts in both local and global caches. It implements indexing strategies for quick thought retrieval and manages cache memory efficiently. For example, it might maintain separate indices for different knowledge domains or implement priority-based storage systems where frequently accessed thoughts are kept in faster memory. Cache manager 630 implements eviction policies to optimize cache utilization, considering factors such as but not limited to thought frequency of use, recency, size, and interdependencies with other cached thoughts. It also handles cache coherence between local and global stores, implements versioning and conflict resolution for distributed caches, and maintains metadata about cache performance and utilization patterns. The manager can dynamically adjust its caching strategies based on usage patterns and system resources, potentially implementing different policies for different types of thoughts or knowledge domains.

A thought selector 640 implements algorithms to identify and select the most relevant thoughts from the cache. It uses similarity metrics and relevance scoring to rank cached thoughts based on their applicability to the current prompt. For instance, when processing a prompt about quantum computing applications in cryptography, it might prioritize thoughts that bridge both quantum and cryptographic concepts. Thought selector 640 may employ multiple ranking algorithms that consider various aspects of thought relevance, including semantic similarity, contextual appropriateness, freshness, and historical success rates. It can perform multi-stage selection processes, first identifying broadly relevant thoughts and then refining the selection based on more specific criteria. The selector also considers relationships between thoughts, potentially selecting groups of related thoughts that together provide comprehensive coverage of the prompt's requirements. It maintains performance metrics about selection accuracy and can adapt its selection criteria based on feedback about the effectiveness of selected thoughts in generating successful responses.

A sync controller 650 manages the complex task of synchronizing thoughts between local and global caches. It implements policies for when to upload local thoughts to the global cache and when to download global thoughts to local storage. For example, it might upload locally generated thoughts about emerging technologies to the global cache while downloading commonly accessed thoughts about fundamental concepts to local storage. Sync controller 650 may employ synchronization strategies that balance network bandwidth usage, storage constraints, and data freshness requirements. It implements conflict resolution mechanisms for handling simultaneous updates, version control for tracking thought evolution, and differential synchronization to minimize data transfer. Sync controller 650 can adapt its sync frequency and policies based on usage patterns, network conditions, and device capabilities. It also maintains detailed synchronization logs and metrics to optimize future sync operations and implements recovery mechanisms for handling failed synchronization attempts. Additionally, sync controller 650 can prioritize synchronization tasks based on thought importance, urgency, and resource availability.

A quality assessor 660 continuously evaluates thought quality and usefulness. It monitors factors such as thought relevance, accuracy, and usage patterns to maintain cache quality. For example, if certain thoughts consistently lead to high-quality responses (as measured by user feedback or other metrics), they might be prioritized for retention and synchronization. Conversely, thoughts that rarely prove useful might be flagged for removal or update. Quality assessor 660 may employ multiple evaluation criteria including syntactic correctness, semantic coherence, factual accuracy, and practical utility. It maintains historical performance metrics for each thought, tracking success rates in different contexts and user satisfaction levels. Quality assessor 660 can detect outdated or inconsistent thoughts, identify redundant thoughts that could be merged, and flag thoughts that may need revision due to changing knowledge or requirements. It implements adaptive quality thresholds that can vary based on thought domain, importance, and usage context. Quality assessor 660 also provides detailed quality reports that can be used to guide cache maintenance operations and thought synthesis decisions, and it can trigger automatic thought improvement processes when quality metrics fall below acceptable thresholds.

DESCRIPTION OF METHOD ASPECTS

Figure 7:
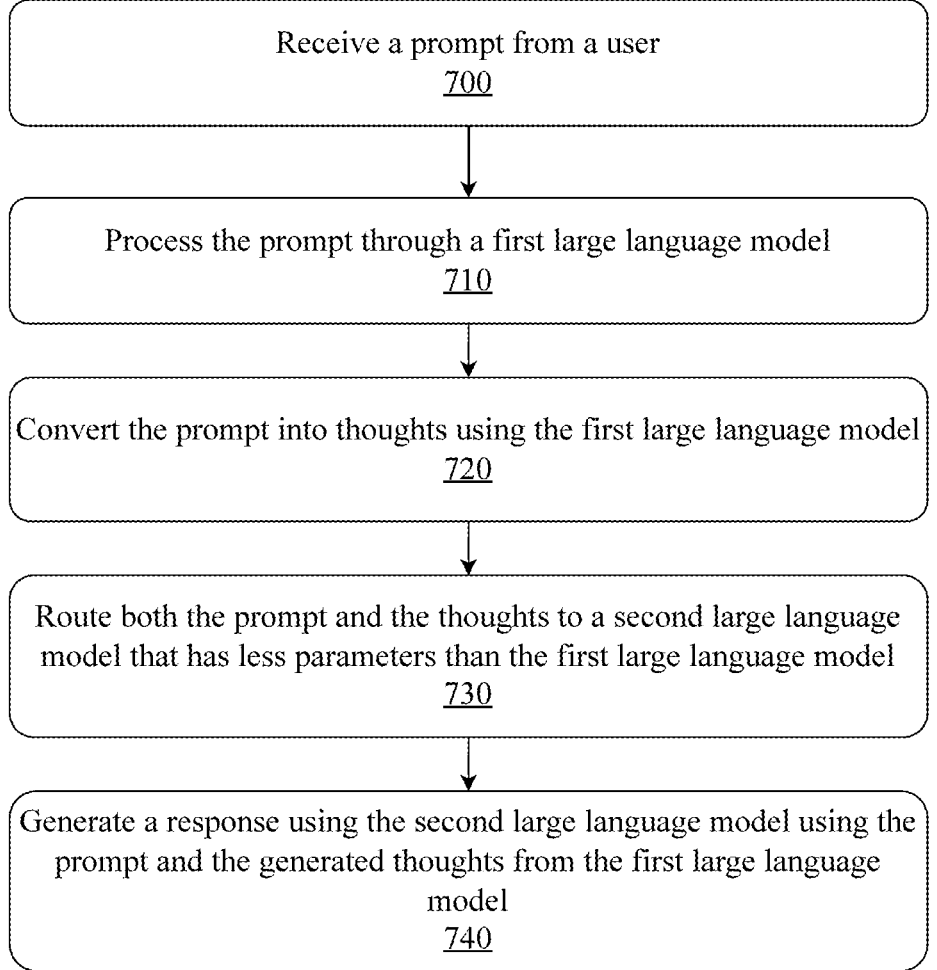
FIG. 7 is a flow diagram illustrating an exemplary method for natural language processing using a dual-model approach with thought generation.

FIG. 7 is a flow diagram illustrating an exemplary method for natural language processing using a dual-model approach with thought generation. In a first step 700, the system receives a prompt from a user. This prompt can be any form of natural language input, such as a question, command, or statement. For example, a user might input "Explain how quantum entanglement works and its applications in quantum computing."

In a step 710, the system processes the prompt through a first large language model. This model is the larger of the two models, containing more parameters and greater processing capability. During this step, the prompt is encoded and processed through the model's architecture to begin the reasoning process. Continuing the example, the large model begins analyzing the quantum entanglement prompt to understand its complexity and required knowledge domains.

In a step 720, the first large language model converts the prompt into thoughts. These thoughts represent the model's reasoning process and understanding of the prompt's requirements. For the quantum entanglement example, the model might generate thoughts such as: "Quantum entanglement involves pairs of particles maintaining correlated properties regardless of distance" and "In quantum computing, entanglement enables quantum bits to exist in multiple states simultaneously, increasing computational power."

In a step 730, the system routes both the original prompt and the generated thoughts to a second large language model that has fewer parameters than the first model. This routing process combines the original prompt and the generated thoughts into a structured input format that the smaller model can efficiently process. Using the example, both the quantum entanglement prompt and the theoretical thoughts about quantum mechanics are packaged together and sent to the smaller model.

In a step 740, the system generates a response using the second large language model, utilizing both the original prompt and the thoughts generated by the first model. This smaller model, while having fewer parameters, can generate high-quality responses because it has access to the sophisticated reasoning already performed by the larger model. In the quantum entanglement example, the smaller model can now generate a clear, accurate response by leveraging both the original prompt and the theoretical framework provided by the larger model's thoughts, without needing to independently reason about complex quantum mechanics concepts.

This method enables efficient use of computational resources while maintaining response quality by leveraging the strengths of both models: the sophisticated reasoning capabilities of the larger model and the efficient response generation of the smaller model.

FIG. 8 is a flow diagram illustrating an exemplary method for thought creation, evaluation, and storage within the system. In a first step 800, the system receives a prompt from a user. This prompt represents any natural language input that requires processing. For example, a user might input "What are the implications of quantum computing on modern cryptography?"

In a step 810, the prompt analyzer processes the input to determine key concepts and requirements. During this step, the analyzer identifies main topics, subtopics, and relationships between concepts. In our example, the analyzer would identify key concepts such as "quantum computing," "cryptography," and their intersection, while also determining the need for forward-looking analysis given the word "implications."

In a step 820, the system queries the thought cache to determine if similar thoughts exist. The query process involves searching both local and potentially global caches for thoughts that match the analyzed concepts. For the example, the system might search for existing thoughts about quantum computing's effects on encryption methods, post-quantum cryptography, or quantum-safe algorithms.

In a step 830, if no similar thoughts exist or existing thoughts aren't sufficiently relevant, the system generates new thoughts using a thought synthesizer. This component may combine fragments of related thoughts or generate entirely new ones. Following the example, if thoughts about quantum computing and modern cryptography exist separately, the synthesizer might combine and adapt them to address their intersection specifically.

In a step 840, the quality assessor evaluates the newly synthesized thoughts. This evaluation considers factors such as relevance, coherence, and completeness. For instance, it would assess whether the synthesized thoughts about quantum computing's cryptographic implications adequately cover both technical and practical aspects of the topic.

In a step 850, the system stores the new thoughts in the cache with appropriate metadata and indexing. This step includes tagging the thoughts with relevant keywords, creating appropriate vector embeddings for future similarity searches, and organizing them within the cache's structure. The thoughts about quantum cryptography might be indexed under both quantum computing and cryptography categories, with metadata indicating their relationship to security, encryption, and future technology implications. This method ensures that the system continuously builds and refines its knowledge base while maintaining quality and accessibility of stored thoughts.

Figure 9:
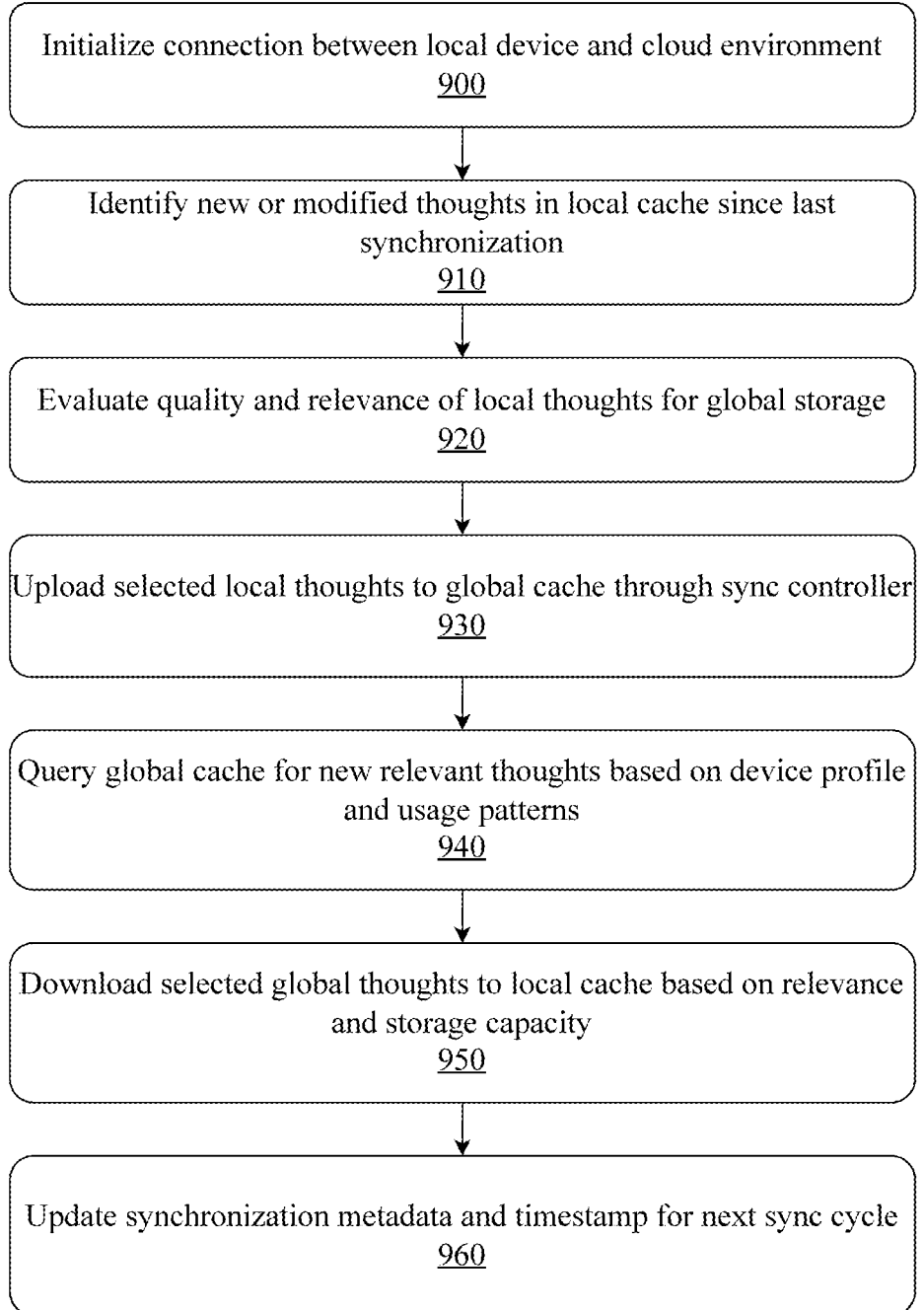
FIG. 9 is a flow diagram illustrating an exemplary method for synchronizing thought caches between local devices and a global cloud environment.

FIG. 9 is a flow diagram illustrating an exemplary method for synchronizing thought caches between local devices and a global cloud environment. In a first step 900, the system initializes a connection between a local device and the cloud environment. This step establishes secure communication channels and verifies authentication credentials. For example, when a user's mobile device connects to the cloud service, it establishes an encrypted connection and validates the device's identity and permissions.

In a step 910, the system identifies new or modified thoughts in the local cache since the last synchronization event. This involves comparing timestamp metadata and modification flags of local thoughts with the last known sync state. For instance, if a user has generated new thoughts about quantum computing on their device while offline, these would be flagged for potential synchronization.

In a step 920, the system evaluates the quality and relevance of local thoughts for global storage. This evaluation considers factors such as thought complexity, uniqueness, and potential value to other users. For example, if a local device has generated highly specialized thoughts about quantum cryptography, the system assesses whether these thoughts would be valuable additions to the global knowledge base.

In a step 930, the system uploads selected local thoughts to the global cache through the sync controller. This step includes formatting the thoughts for global storage and managing the upload process. Continuing the example, the quantum cryptography thoughts would be packaged with appropriate metadata and transferred to the global cache.

In a step 940, the system queries the global cache for new relevant thoughts based on the device profile and usage patterns. This involves analyzing the user's interests and recent activities to identify potentially useful thoughts from the global cache. For instance, if the user frequently works with cryptography-related prompts, the system would search for recent additions to the global cache in this domain.

In a step 950, the system downloads selected global thoughts to the local cache based on relevance and storage capacity. This step optimizes local storage by prioritizing the most relevant thoughts while considering device limitations. For example, the system might download new thoughts about quantum encryption while removing older, less relevant thoughts to maintain optimal cache size.

In a step 960, the system updates synchronization metadata and timestamps for the next sync cycle. This includes recording which thoughts were synchronized, updating version information, and setting markers for the next synchronization event. This information ensures future sync cycles can efficiently identify new changes and maintain cache consistency. This method enables efficient knowledge sharing across a network of devices while maintaining both local and global thought repositories, effectively creating a distributed learning system that benefits from collective user interactions.

Figure 10:
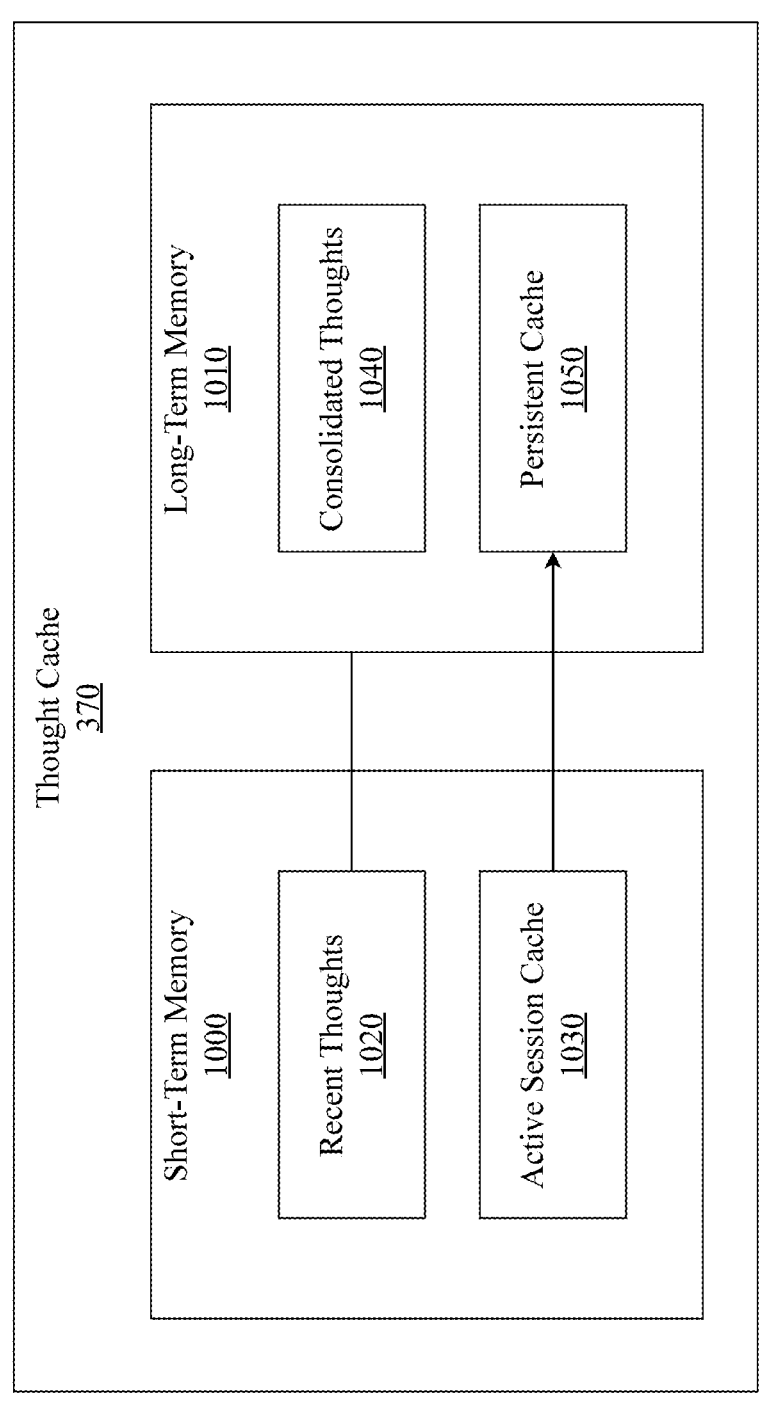
FIG. 10 is a block diagram illustrating an exemplary system architecture of a thought cache that has both a long-term memory and a short-term memory.

FIG. 10 is a block diagram illustrating an exemplary system architecture of a thought cache that has both a long-term memory and a short-term memory. In one embodiment, thought cache 370 represents a system for maintaining effectively unlimited context in language models through progressive compression and intelligent caching of thought patterns, enabling shared reasoning across multiple AI instances.

Thought cache 370 implements both a short-term memory 1000 and a long-term memory 1010. This dual-memory architecture enables the system to maintain both immediate computational context and historical reasoning patterns while managing computational resources efficiently.

The short-term memory 1000 comprises recent thoughts 1020 and an active session cache 1030. Recent thoughts 1020 maintain complete thought fidelity, storing both the explicit reasoning chains and the internal model states that generated them. This storage preserves not only the textual representation of thoughts but also the computational context and attention patterns that produced them, enabling precise replication of reasoning processes. The active session cache 1030 provides rapid access to these thoughts and their associated states, optimizing performance for ongoing interactions and enabling immediate thought sharing between different AI instances or specialized reasoning modules operating within the same session.

The long-term memory 1010 implements a more sophisticated storage approach through consolidated thoughts 1040 and a persistent cache 1050. Consolidated thoughts 1040 represent progressively compressed versions of thought patterns, where multiple related thoughts are combined into more compact representations while preserving essential reasoning patterns. This consolidation process employs various compression techniques, including attention-based compression, semantic clustering, and state space reduction. The persistent cache 1050 implements an indexed storage system that enables semantic search and retrieval of these consolidated thoughts, supporting efficient thought sharing across different AI instances and computing sessions.

The system implements bidirectional information flow between these components. Thoughts can move from recent thoughts 1020 to consolidated thoughts 1040 through progressive compression, while the active session cache 1030 can transfer frequently accessed patterns to the persistent cache 1050 for long-term retention. This bidirectional flow enables dynamic thought sharing between different system components and AI instances, supporting collaborative reasoning across multiple agents.

The architecture supports multiple implementation approaches for thought storage and transfer. Thoughts can be stored as chain-of-thought text, internal model states, attention patterns, or hybrid representations combining multiple formats. The system can dynamically select the most appropriate storage format based on the thought's intended use and the capabilities of the AI instances that may access it.

This architectural design enables the thought cache to serve as a central memory system for multiple AI instances, supporting collaborative reasoning while maintaining computational efficiency. The combination of short-term and long-term memory systems, along with progressive compression and flexible thought representation, allows the system to maintain effectively unlimited context while enabling efficient thought sharing across different AI agents and reasoning modules.

Through this architecture, the system achieves both unbounded context maintenance and efficient cross-instance thought sharing, two key innovations that enable more sophisticated and resource-efficient AI reasoning systems. The design's flexibility in implementation approaches and storage formats helps prevent trivial circumvention while enabling broad application across different types of language models and AI systems.

In one embodiment the system implements a collaborative thought sharing architecture that enables multiple AI agents to access and utilize a common thought cache. This shared cache architecture supports distributed reasoning across different types of language models and specialized reasoning modules while maintaining thought consistency and accessibility. When multiple users or AI agents operate within the system, they can all contribute to and benefit from the accumulated reasoning patterns stored in the shared cache.

The shared thought cache maintains a unified index that enables any authorized user or AI agent to access relevant thoughts regardless of which agent originally generated them. This indexing system tracks not only the content of thoughts but also their originating context, generating agent, and successful usage patterns. For example, when a specialized mathematical reasoning module generates a thought containing a proof strategy, that thought becomes available to general language models handling related mathematical queries, enabling them to leverage expert reasoning patterns without duplicating the computational effort.

Thought transfer between specialized reasoning modules occurs through a standardized thought protocol. This protocol defines how thoughts are packaged, transmitted, and unpacked between different types of AI agents. When transferring thoughts, the system includes not just the reasoning content but also relevant metadata such as the thought's context requirements, assumptions, and compatibility markers. For instance, if a natural language processing agent generates insights about sentence structure, these thoughts can be transferred to a grammar checking module in a format that preserves the structural analysis while adapting it to the specialized module's processing requirements.

The system coordinates collaborative reasoning through a central orchestration mechanism. This orchestrator tracks which agents are actively processing related prompts and manages the flow of thoughts between them. When multiple agents encounter similar reasoning requirements, the orchestrator can initiate thought sharing to prevent redundant computation. For example, if one agent has already performed detailed analysis of a complex concept, other agents can build upon that analysis rather than repeating it.

Cross-instance reasoning is enabled through thought synthesis capabilities. When different model instances approach similar problems from different angles, their thoughts can be combined to create more comprehensive understanding. The system tracks the complementary strengths of different model instances and can route thoughts to the most appropriate agent for specific types of reasoning tasks. For instance, a general language model might handle initial prompt analysis, while specialized agents process domain-specific aspects, with their combined thoughts contributing to the final response.

The shared cache implements sophisticated access control and version management to maintain thought integrity across multiple agents. Each thought is versioned to track its evolution as different agents interact with and build upon it. The system maintains provenance information that records how thoughts are transformed and combined through multi-agent collaboration, enabling attribution and quality assessment of collaborative reasoning patterns.

Through these mechanisms, the system enables efficient distribution of reasoning tasks across specialized modules while maintaining coherent thought flow. The collaborative architecture allows different AI agents to contribute their specialized capabilities while benefiting from the collective reasoning capacity of the system. This approach significantly reduces computational redundancy while enabling more sophisticated reasoning through the combination of multiple specialized perspectives.

Figure 11:
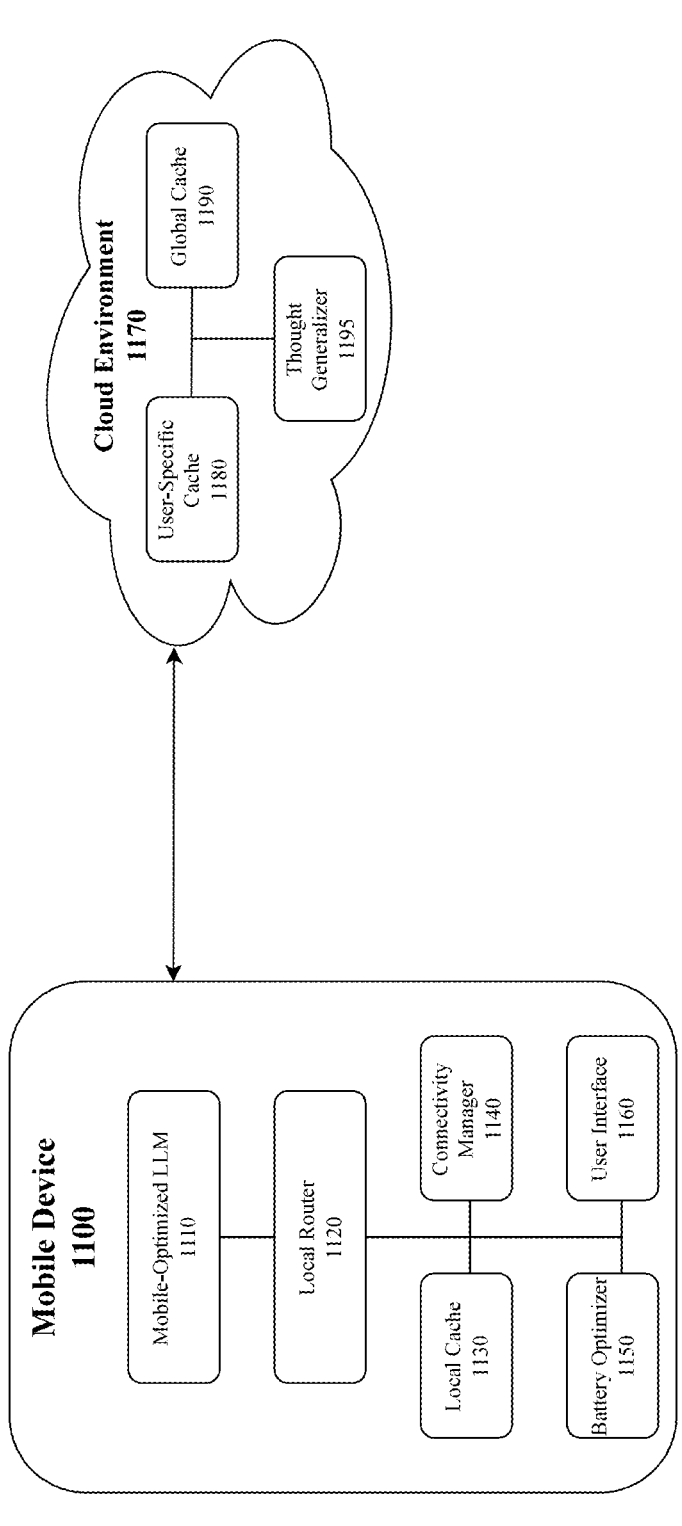
FIG. 11 is a block diagram illustrating exemplary architecture of mobile device optimized multi-stage LLM.

FIG. 11 is a block diagram illustrating exemplary architecture of mobile device optimized multi-stage LLM, in an embodiment. System 1100 operates primarily on mobile computing devices such as, but not limited to, smartphones, tablets, or wearable devices, with cloud connectivity for expanded capabilities.

Mobile device portion of system 1100 comprises several interconnected subsystems that enable efficient natural language processing while addressing mobile-specific constraints. Mobile-optimized LLM 1110 serves as primary processing engine for generating thoughts from user prompts. Unlike traditional large language models, mobile-optimized LLM 1110 employs architectural optimizations specific to mobile execution environments, including model quantization, attention mechanism optimizations, and memory-efficient transformer implementations. Mobile-optimized LLM 1110 processes user prompts to generate intermediate reasoning steps referred to as thoughts, which represent model's analysis and understanding of prompt requirements.

Local router 1120 functions as central coordination mechanism, determining processing paths for user prompts and managing data flow between system components. When user prompt is received, local router 1120 analyzes prompt characteristics and determines whether to process prompt through mobile-optimized LLM 1110 or attempt to retrieve relevant thoughts from local cache 1130. Local router 1120 implements decision logic based on prompt similarity to previously processed queries, availability of cached thoughts, current device resource state, and connectivity status.

Local cache 1130 stores both user-specific thoughts and frequently accessed generalized thoughts directly on mobile device. Local cache 1130 implements efficient storage and retrieval mechanisms optimized for limited mobile storage capacity, including compression techniques and priority-based caching policies. Local cache 1130 maintains two primary sections: personal section for user-specific thoughts and generalized section for commonly used reasoning patterns. This two-section approach enables offline functionality while maintaining privacy boundaries between personal and shared knowledge.

Connectivity manager 1140 monitors network status and manages data synchronization between mobile device and cloud environment. When network connectivity is available, connectivity manager 1140 orchestrates bidirectional synchronization of thoughts between local cache 1130 and both user-specific cloud cache 1180 and global cache 1190. Connectivity manager 1140 implements intelligent synchronization policies, including prioritizing high-value thoughts for limited connectivity scenarios, scheduling bandwidth-intensive operations during optimal network conditions, and maintaining synchronization queues when connectivity is intermittent.

Battery optimizer 1150 monitors device power state and dynamically adjusts system behavior to maximize battery efficiency. Battery optimizer 1150 implements multiple execution profiles for mobile-optimized LLM 1110, ranging from high-performance operation when device is charging to minimal power consumption modes when battery level is critical. Battery optimizer 1150 also coordinates with connectivity manager 1140 to schedule energy-intensive operations such as thought synchronization during charging periods or when device is in idle state.

User interface 1160 provides interaction layer between user and system 1100, handling prompt input and response presentation. User interface 1160 may integrate with mobile device capabilities such as voice input, camera-based context sensing, and haptic feedback to enhance interaction experience. User interface 1160 also provides transparency indicators when system operates in offline mode, communicating confidence levels and limitations appropriately to users.

Cloud environment 1170 extends capabilities of system 1100 beyond constraints of mobile device, providing expanded storage capacity and computational resources for specific operations. User-specific cloud cache 1180 securely stores complete history of user thoughts with appropriate encryption and access controls. Unlike local cache 1130 which must prioritize storage of thoughts based on utility and recency, user-specific cloud cache 1180 maintains comprehensive record of user interactions and generated thoughts, enabling long-term context preservation without consuming mobile device storage resources. User-specific cloud cache 1180 encrypts all stored thoughts with user-specific keys to maintain privacy and prevent unauthorized access.

Global cache 1190 maintains repository of generalized thoughts applicable across multiple users. These thoughts represent common reasoning patterns and knowledge structures that have utility beyond individual user contexts. Global cache 1190 organizes thoughts into domain-specific clusters, reasoning frameworks, and abstracted templates to facilitate efficient retrieval based on prompt characteristics. Unlike user-specific cloud cache 1180, global cache 1190 contains no personally identifiable information or user-specific context.

Thought generalizer 1195 processes user-generated thoughts to create anonymized, generalized thought patterns for global cache 1190. Thought generalizer 1195 implements multi-stage pipeline including pattern recognition to identify similar reasoning approaches across users, context removal techniques that strip away user-specific elements, and abstraction methods that transform specific thoughts into more universally applicable structures. Thought generalizer 1195 operates exclusively in cloud environment 1170 to leverage increased computational resources and access to thoughts across multiple users.

In operation, when user submits prompt through user interface 1160, local router 1120 first queries local cache 1130 to determine if relevant thoughts exist. If suitable thoughts are found, they are combined with original prompt and processed by smaller language model (not shown in FIG. 11, see for example FIG. 5) to generate response. If no relevant thoughts exist in local cache 1130, local router 1120 checks connectivity status through connectivity manager 1140. If online, system may query user-specific cloud cache 1180 and global cache 1190 for relevant thoughts. If offline or if no relevant thoughts are found in cloud caches, prompt is processed by mobile-optimized LLM 1110 to generate new thoughts. These new thoughts are then processed alongside original prompt by smaller language model to generate response.

Throughout this process, battery optimizer 1150 continuously monitors power state and adjusts system behavior accordingly. When device is charging or has sufficient battery capacity, system may utilize more complex model configurations or perform background synchronization operations. When battery level is low, system prioritizes efficiency over comprehensive processing, potentially utilizing more cached thoughts or simplified model configurations.

New thoughts generated during operation are cached in local cache 1130 and, when connectivity permits, synchronized with user-specific cloud cache 1180 through connectivity manager 1140. Connectivity manager 1140 implements priority-based synchronization, ensuring most valuable thoughts are transferred first during limited connectivity periods. Thought generalizer 1195 periodically analyzes thoughts across multiple users to identify patterns suitable for generalization, with resulting abstracted thoughts stored in global cache 1190 for broader reuse across system.

Figure 12:
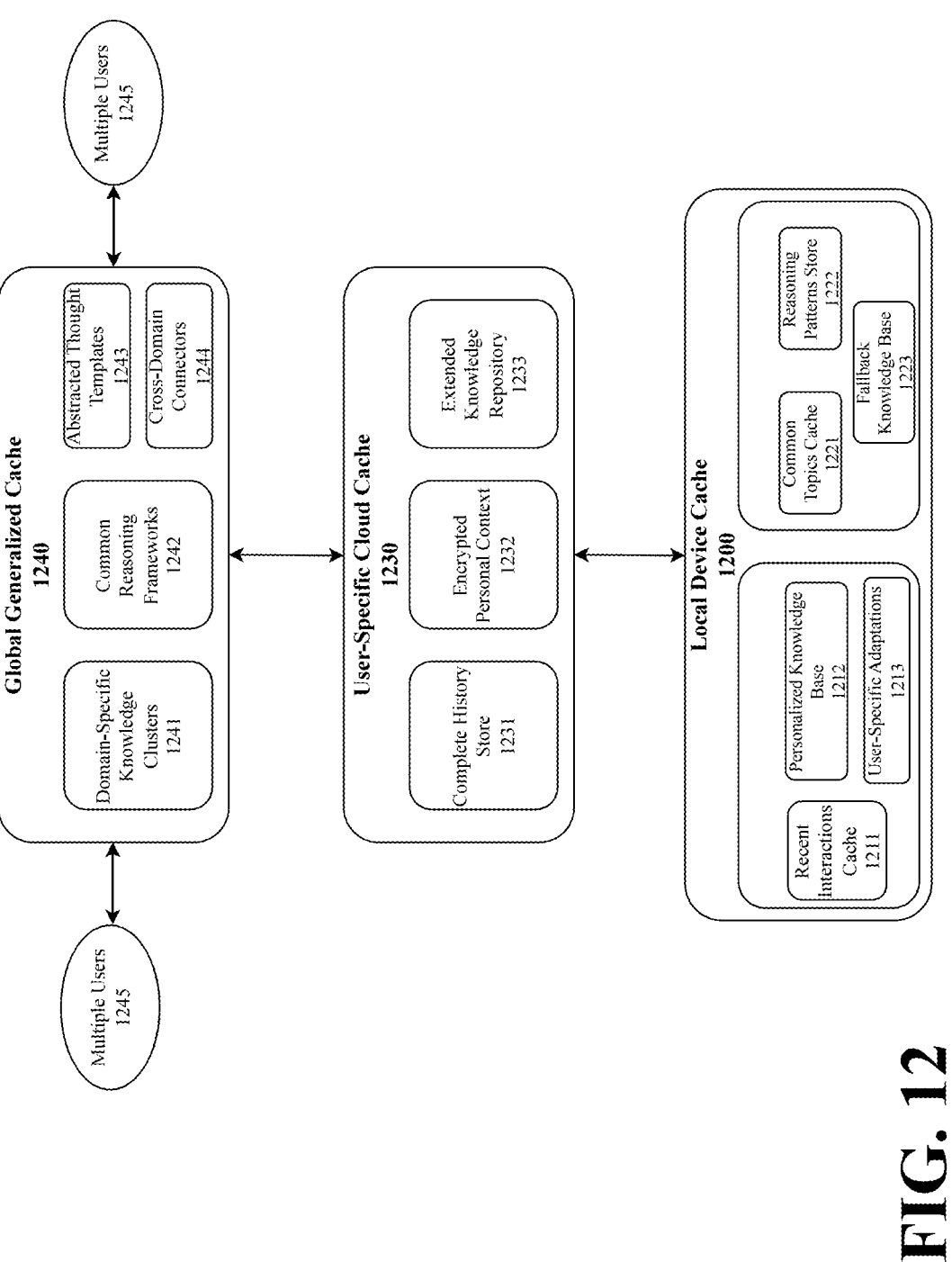
FIG. 12 is a block diagram illustrating exemplary architecture of three-tier thought caching architecture.

FIG. 12 is a block diagram illustrating exemplary architecture of three-tier thought caching architecture, in an embodiment. Three-tier thought caching architecture 1200 implements hierarchical approach to thought storage that balances privacy, efficiency, and knowledge sharing while accommodating constraints of mobile computing environments.

At device level, local device cache 1200 serves as primary storage mechanism for thoughts directly accessible on mobile device without requiring network connectivity. Local device cache 1200 comprises two main sections optimized for different types of thought storage. Personal section 1210 maintains user-specific thoughts and personalized knowledge patterns. Within personal section 1210, recent interactions cache 1211 stores thoughts generated during latest user sessions with full fidelity and minimal compression, ensuring rapid access to immediately relevant context. Recent interactions cache 1211 implements sliding window approach, where older thoughts gradually transition to more compressed formats or move to cloud storage based on configurable retention policies. Personalized knowledge base 1212 maintains thoughts representing user-specific knowledge, preferences, and recurring patterns identified across multiple sessions. Unlike recent interactions cache 1211 which preserves detailed token-level information, personalized knowledge base 1212 stores more abstracted representations focused on core concepts and relationships pertinent to user. User-specific adaptations 1213 captures customizations to general thought patterns based on user interaction history, including terminology preferences, reasoning approaches, and domain-specific variations that diverge from generalized patterns.

Generalized section 1220 of local device cache stores non-personal, broadly applicable thoughts that enhance offline capabilities without compromising privacy. Common topics cache 1221 maintains frequently accessed general knowledge applicable across multiple contexts, prioritizing storage based on usage frequency, user interests, and predictive pre-caching based on user behavior patterns. Reasoning patterns store 1222 contains abstract thought structures representing common reasoning frameworks, such as analysis methodologies, problem-solving approaches, and logical structures that can be applied across domains. Fallback knowledge base 1223 provides essential baseline knowledge for offline operation when network connectivity is unavailable, including fundamental concepts and broadly applicable information selected based on relevance to user's typical interaction patterns.

Second tier of architecture, user-specific cloud cache 1230, extends personal thought storage beyond limitations of mobile device while maintaining strict privacy boundaries. Complete history store 1231 maintains comprehensive record of user-generated thoughts across all interactions, enabling access to historical context beyond storage constraints of local device. Complete history store 1231 implements intelligent compression strategies where older thoughts transition to increasingly abstract representations while maintaining essential semantic content and relational links. Encrypted personal context 1232 secures sensitive user-specific information using encryption keys accessible only to specific user, ensuring personal data remains protected even within shared cloud infrastructure. Encrypted personal context 1232 stores thoughts containing personally identifiable information, private preferences, and confidential content with enhanced security measures beyond standard cache protections. Extended knowledge repository 1233 maintains broader collection of user-relevant thoughts that exceed local storage capacity, organized by topic domains, temporal relationships, and usage patterns to facilitate efficient retrieval when needed.

Third tier, global generalized cache 1240, enables knowledge sharing across multiple users without compromising individual privacy. Domain-specific knowledge clusters 1241 organize thoughts by subject areas, professional domains, or topic categories, enabling efficient retrieval based on prompt context. Domain-specific knowledge clusters 1241 may implement varying levels of specialization, from broadly applicable concepts to highly technical domain knowledge, with appropriate metadata to support context-aware retrieval. Common reasoning frameworks 1242 store generalized thought patterns representing widely used analytical approaches, problem-solving methodologies, and logical structures independent of specific content domains. These frameworks serve as templates that can be instantiated with domain-specific knowledge to address particular prompts. Abstracted thought templates 1243 provide standardized reasoning structures derived from recurring patterns across multiple users, with all personal information and specific context removed. Abstracted thought templates 1243 maintain core logical flow and analytical value while eliminating any identifiable user connections or private information. Cross-domain connectors 1244 facilitate knowledge transfer between different subject areas by maintaining thoughts that establish relationships, analogies, or transformations between distinct knowledge domains, enabling more sophisticated reasoning across traditional domain boundaries.

Multiple users 1245 interact with global generalized cache 1240, both contributing to and benefiting from shared knowledge repository. Each user maintains separate local device cache 1200 and user-specific cloud cache 1230, while accessing common global generalized cache 1240, creating ecosystem where reasoning patterns can be refined and enhanced through collective usage while maintaining clear privacy boundaries.

Data flows within three-tier architecture follow specific patterns designed to balance efficiency, privacy, and knowledge sharing. When new thoughts are generated on mobile device, they are first stored in local device cache 1200, typically beginning in recent interactions cache 1211. Based on thought characteristics and privacy implications, thoughts may remain exclusively in personal section 1210 or, if containing no personal information, may also be stored in generalized section 1220 for offline access. When network connectivity is available, connectivity manager synchronizes appropriate thoughts with user-specific cloud cache 1230, prioritizing thoughts based on value, recency, and bandwidth availability. Personal thoughts with private information are exclusively synchronized to encrypted personal context 1232, while more general thoughts may be stored in extended knowledge repository 1233.

Thought generalizer periodically analyzes patterns across multiple users, identifying common reasoning structures that could benefit broader user base. When candidate patterns are identified, thought generalizer removes all personal information and specific context, creating abstracted versions suitable for global sharing. These generalized thoughts undergo validation for utility, quality, and privacy preservation before being added to global generalized cache 1240 in appropriate categories. Regular synchronization processes ensure most valuable generalized thoughts are available in local device cache 1200 of each user, even during offline operation, while respecting storage limitations of mobile devices.

Through this tiered architecture, system balances competing requirements of mobile environments, enabling efficient local operation with limited storage capacity, comprehensive personal history through cloud extensions, and knowledge sharing across users while maintaining strict privacy boundaries throughout thought lifecycle.

Figure 13:
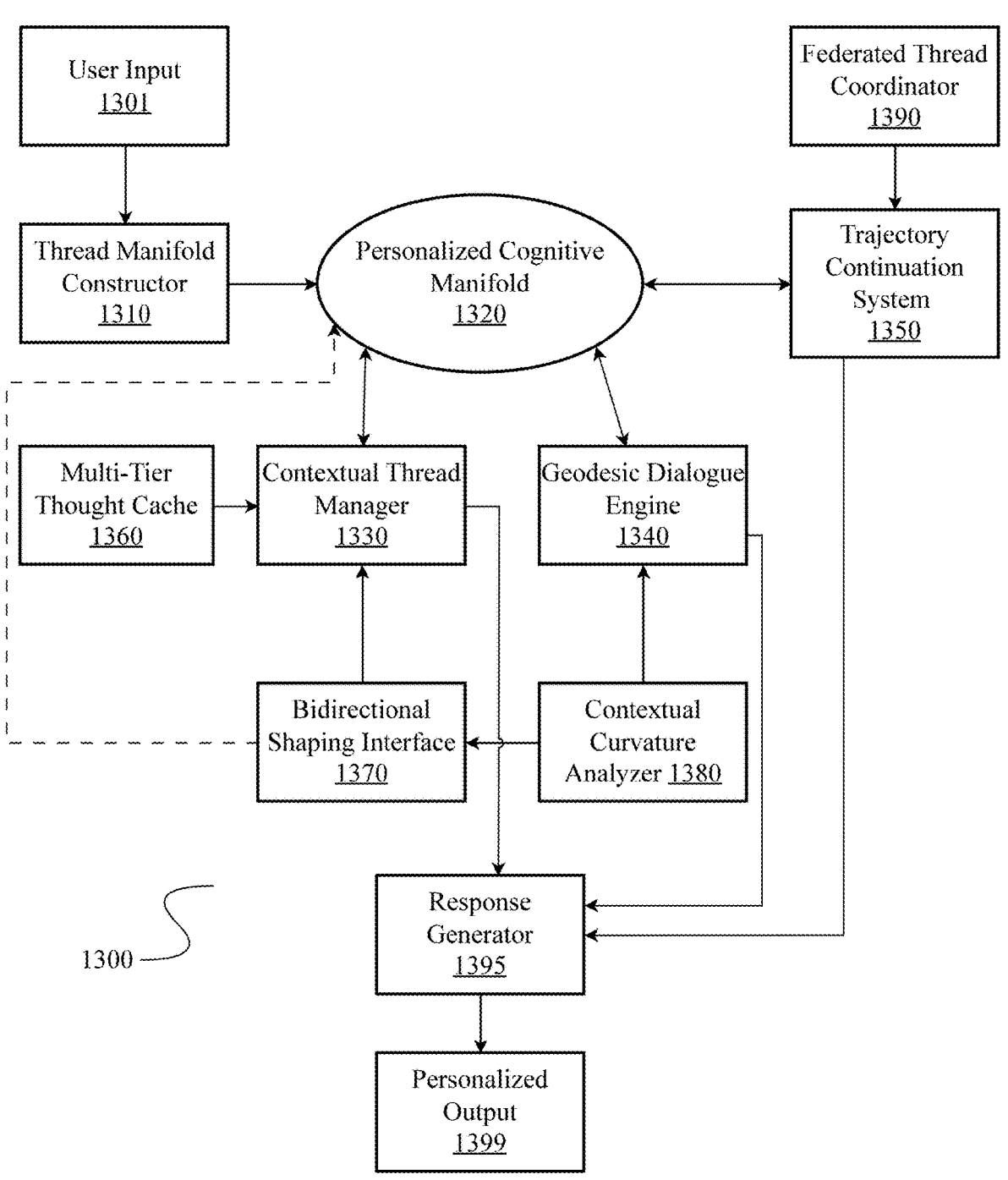
FIG. 13 is a block diagram illustrating exemplary architecture of a latent contextual threading system for personalized PCM-human dialogues, according to an embodiment.

FIG. 13 is a block diagram illustrating exemplary architecture of a latent contextual threading system for personalized PCM-human dialogues 1300, according to an embodiment. The system represents an implementation of a persistent cognitive machine architecture that enables continuous, personalized dialogue experiences through geometric manifold-based contextual threading rather than traditional session-based interactions. Latent contextual threading system 1300 builds upon a mobile-optimized multi-stage LLM architecture and geometric memory manifold systems incorporated herein by reference while introducing components specifically designed to maintain dialogue continuity through personalized cognitive trajectory management.

User input 1301 may comprise various forms of natural language input including text, voice, or multimodal communications that initiate or continue dialogue interactions with the system. User input 1301 may include embedded contextual markers, thread identifiers, or temporal references that assist the system in determining appropriate dialogue continuation strategies. The input may be preprocessed to extract semantic vectors, intent classifications, and trajectory alignment parameters that facilitate geometric manifold navigation. In various embodiments, user input 1301 may be encoded using transformer-based embedding techniques, converted to high-dimensional latent representations, or processed through domain-specific encoding mechanisms that preserve conversational context and user-specific patterns.

Thread manifold constructor 1310 processes user input 1301 through geometric analysis algorithms that determine optimal manifold region selection and trajectory initialization parameters. The constructor may implement Riemannian metric tensor calculations to evaluate local curvature properties, perform geodesic distance measurements to identify proximate dialogue regions, and execute manifold parameterization operations that establish coordinate systems for trajectory navigation. According to various embodiments, thread manifold constructor 1310 utilizes compression-based similarity detection algorithms that identify semantically related dialogue regions, implement attractor field analysis that determines gravitational influences from existing conversation threads, and perform dimensional projection techniques that map high-dimensional input representations onto manifold coordinate systems while preserving essential semantic relationships.

Personalized cognitive manifold 1320 represents the core geometric substrate implemented as a differentiable Riemannian manifold (e.g., $M \subset R^d$) embedded within high-dimensional latent space. The manifold maintains user-specific curvature tensors that encode dialogue preferences, conversation flow patterns, and semantic association strengths developed through repeated interactions. According to various embodiments, the manifold may implement sectional curvature calculations $K(\sigma)$ that quantify semantic coherence within dialogue regions, maintain metric tensor fields guy that encode distance relationships between conversational concepts, and utilize parallel transport operations that enable consistent trajectory continuation across manifold regions. The manifold may store trajectory histories as parameterized curves $\gamma: [t_0, t_1] \rightarrow M$ with associated velocity vector fields that capture conversation momentum and directional preferences.

Contextual thread manager 1330 implements a thread state management system that maintains multiple simultaneous dialogue trajectories through coordinate tracking, state serialization, and context switching algorithms. The manager may utilize thread identification hashing functions that generate unique identifiers for dialogue contexts, implement priority queue data structures for managing thread activation sequences, and maintain thread metadata including creation timestamps, access frequencies, and complexity metrics. According to various embodiments, contextual thread manager 1330 may implement Markov chain models for predicting thread transition probabilities, utilize attention-based weighting mechanisms for determining thread relevance scores, and perform geometric clustering operations that group related dialogue contexts into coherent thread families. Detailed operational algorithms and data structures for contextual thread manager 1330 are further illustrated and described with reference to FIG. 14.

Geodesic dialogue engine 1340 generates responses through manifold traversal operations that follow geodesic paths within personalized cognitive manifold 1320 rather than discrete retrieval mechanisms. The engine may implement path optimization algorithms that solve the geodesic equation $D^2\gamma/dt^2 + \Gamma^k_{ij}(d\gamma^i/dt)(d\gamma^j/dt) = 0$ to determine optimal trajectory continuations, where $\Gamma^k_{ij}$ represents Christoffel symbols encoding manifold curvature. According to various embodiments, geodesic dialogue engine 1340 may utilize variational calculus techniques for minimizing path energy functionals, implement numerical integration schemes for trajectory propagation, and perform geodesic deviation analysis to assess response coherence through geometric stability measures. The engine can also implement intent vector field integration that modulates geodesic paths according to user goal specifications, enabling goal-directed dialogue navigation while maintaining trajectory smoothness.

Trajectory continuation system 1350 maintains dialogue coherence across temporal discontinuities through state serialization, manifold coordinate preservation, and trajectory reconstruction algorithms. The system may implement manifold embedding techniques that preserve geometric relationships during state storage, utilize coordinate transformation matrices for aligning restored trajectories with current manifold configurations, and perform trajectory validation operations that ensure continuation viability through curvature analysis. According to various embodiments, trajectory continuation system 1350 may maintain trajectory caches using compressed representations that preserve essential geometric properties while minimizing storage requirements, implement temporal decay models that adjust trajectory accessibility based on recency and usage patterns, and utilize predictive trajectory extension algorithms that anticipate likely continuation paths based on historical patterns and current context.

Multi-tier thought cache 1360 extends the hierarchical caching architecture with dialogue-specific optimizations including thread-aware indexing, conversation-temporal organization, and personalized retrieval strategies. The cache may implement semantic hashing functions optimized for conversational contexts, maintain separate storage tiers for short-term dialogue working memory, medium-term conversation history, and long-term user interaction patterns. Bidirectional shaping interface 1370 processes user feedback through geometric deformation algorithms that modify manifold curvature in real-time, implementing curvature flow equations $\partial g/\partial t = -2Ric(g) + user\_feedback\_tensor$ that evolve metric properties based on interaction patterns.

Contextual curvature analyzer 1380 evaluates dialogue coherence through Ricci curvature calculations, geodesic deviation measurements, and sectional curvature analysis that provide quantitative assessments of conversation flow quality. Federated thread coordinator 1390 manages cross-user thread interactions through privacy-preserving manifold intersection algorithms and selective knowledge transfer protocols adapted from federated architectures.

Response generator 1395 synthesizes outputs from multiple system components through weighted integration schemes that combine geodesic dialogue continuations, cached thought retrievals, and real-time adaptations to produce contextually coherent responses that maintain geometric trajectory consistency. The generator implements response validation algorithms that verify geometric coherence, semantic consistency, and personalization alignment before producing personalized output 1398.

Throughout operation, latent contextual threading system 1300 maintains continuous bidirectional communication between components through defined interface protocols that enable real-time adaptation, geometric optimization, and personalized dialogue evolution while preserving manifold coherence and ensuring scalable performance across diverse conversational contexts and user interaction patterns.

Figure 14:
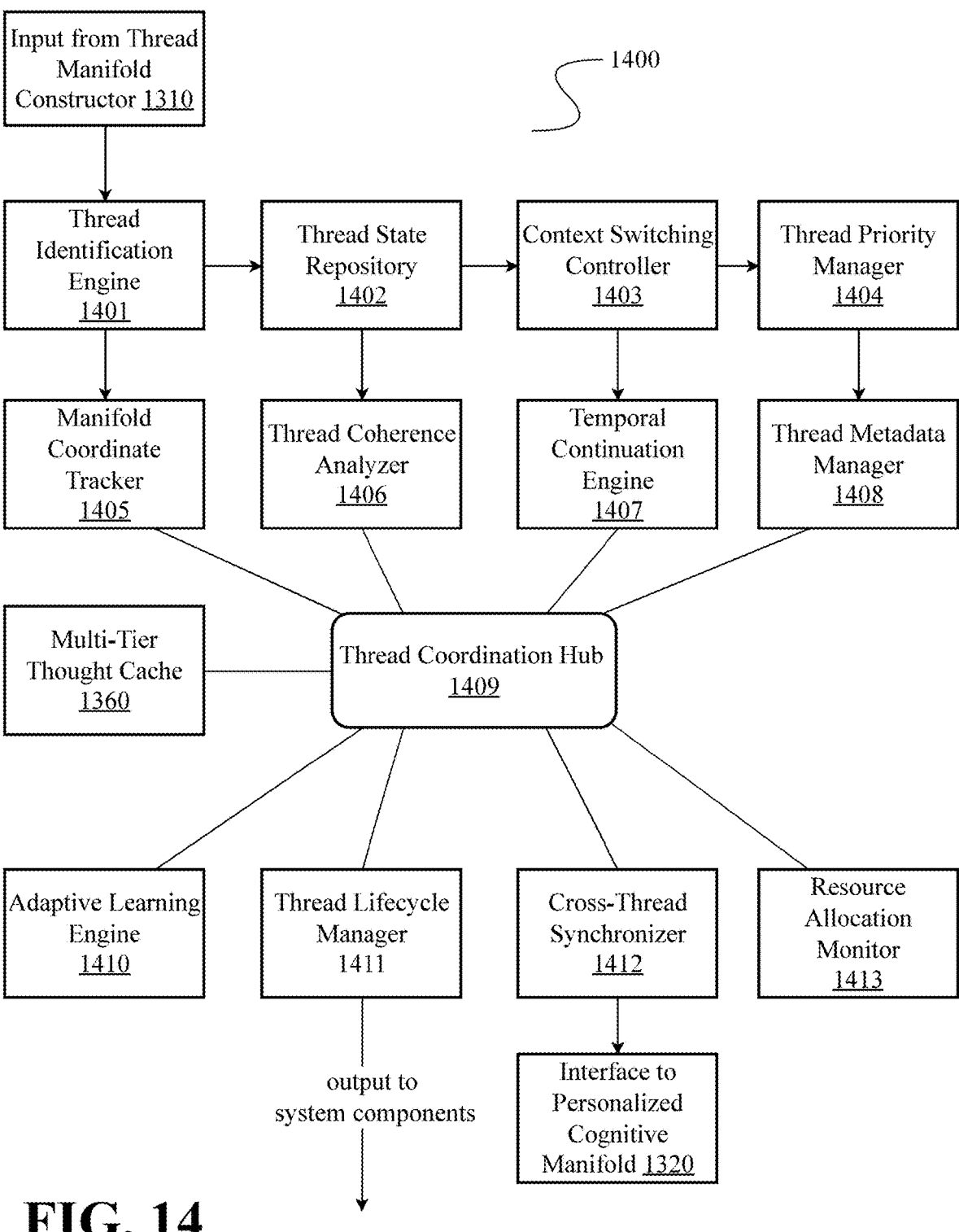
FIG. 14 is a block diagram illustrating exemplary aspect of the latent contextual threading system, a contextual thread manager.

FIG. 14 is a block diagram illustrating exemplary aspect of the latent contextual threading system, a contextual thread manager 1400. Contextual thread manager 1400 is implemented as a component specifically designed to manage multiple simultaneous dialogue threads within personalized cognitive manifolds, enabling users to maintain complex, multi-faceted conversations with seamless context switching and temporal continuity. The architecture implements a hierarchical processing approach comprising distinct functional layers that work cooperatively to provide sophisticated thread management capabilities while maintaining geometric manifold coherence and optimizing computational resource utilization.

Input from thread manifold constructor 1310 provides manifold-aligned user input data that has been preprocessed for geometric compatibility and thread identification. This input may comprise latent vector representations, manifold coordinate specifications, semantic feature vectors, and contextual metadata that facilitate thread classification and routing decisions. Thread identification engine 1401 processes incoming input through pattern recognition algorithms that analyze semantic signatures, temporal patterns, and manifold proximity measures to determine whether input corresponds to existing dialogue threads or requires new thread instantiation. According to various embodiments, thread identification engine 1401 may implement locality-sensitive hashing functions for rapid thread matching, utilize semantic embedding similarity calculations for content-based thread identification, and maintain thread signature databases that enable efficient lookup operations. The engine can also implement fuzzy matching algorithms that account for natural variations in user expression while maintaining thread identity consistency across sessions.

A thread state repository 1402 maintains comprehensive state information for all active and dormant dialogue threads using hierarchical storage mechanisms optimized for rapid access and efficient serialization. The repository may implement thread state data structures comprising manifold coordinate vectors, conversation history summaries, context preservation buffers, and temporal metadata including creation timestamps, last access times, and activity frequency metrics. According to various embodiments, thread state repository 1402 may utilize compressed state representations that preserve essential thread characteristics while minimizing storage overhead, implement differential state tracking that records incremental changes rather than complete state snapshots, and maintain state validation mechanisms that ensure thread integrity across system operations. The repository can also implement automated archival policies that migrate inactive threads to long-term storage while preserving accessibility for future reactivation.

A context switching controller 1403 manages transitions between different dialogue threads through one or more state preservation and restoration algorithms that maintain conversational coherence during thread changes. The controller may implement context preservation mechanisms that capture current dialogue state, manifold position, and semantic context before thread transitions, utilize context restoration algorithms that seamlessly reestablish previous dialogue contexts with minimal latency, and perform context validation operations that ensure restored threads maintain semantic and temporal consistency. According to various embodiments, context switching controller 1403 implements predictive context loading that anticipates likely thread transitions based on user patterns, utilize graduated context switching that provides smooth transitions rather than abrupt changes, and maintain context switching metrics that optimize transition performance based on historical usage patterns.

A thread priority manager 1404 implements dynamic prioritization algorithms that determine thread activation sequences, resource allocation strategies, and processing priorities based on multiple factors including user engagement patterns, thread importance indicators, temporal relevance measures, and system resource constraints. The manager may maintain priority queue data structures that enable efficient thread scheduling, implement adaptive priority adjustment algorithms that respond to changing user behavior patterns, and utilize multi-criteria decision making frameworks that balance competing priority factors. According to various embodiments, thread priority manager 1404 can implement machine learning algorithms that predict thread importance based on historical usage data, utilize attention-based weighting mechanisms that adjust priorities based on user focus patterns, and maintain priority inheritance schemes that propagate importance across related threads.

A manifold coordinate tracker 1405 maintains precise positioning information for each dialogue thread within the personalized cognitive manifold, enabling geometric navigation and trajectory-based thread management. The tracker can implement coordinate update algorithms that maintain thread positions as conversations evolve, utilize manifold projection techniques that map thread states onto geometric coordinates, and perform coordinate validation operations that ensure thread positions remain within valid manifold regions. According to various embodiments, manifold coordinate tracker 1405 may maintain coordinate history buffers that enable trajectory analysis and prediction, implement coordinate interpolation algorithms that estimate intermediate positions during thread transitions, and utilize coordinate clustering techniques that identify related thread groupings based on manifold proximity.

A thread coherence analyzer 1406 evaluates dialogue consistency and semantic flow within and across threads using geometric analysis techniques rather than traditional linguistic metrics. The analyzer can implement curvature-based coherence measurements that assess thread stability through manifold geometry analysis, utilize geodesic deviation calculations that quantify conversation flow consistency, and perform cross-thread coherence analysis that identifies potential conflicts or synergies between simultaneous threads. According to various embodiments, thread coherence analyzer 1406 generates coherence scores that guide thread management decisions, implement coherence prediction algorithms that anticipate potential thread degradation, and maintain coherence optimization recommendations that suggest thread consolidation or separation strategies.

A temporal continuation engine 1407 manages time-based aspects of thread management including, but not limited to, session continuity, temporal decay modeling, and long-term thread persistence. The engine can implement temporal weighting algorithms that adjust thread accessibility based on recency and usage patterns, utilize session boundary detection that identifies natural conversation breakpoints, and perform temporal clustering analysis that groups related temporal interactions within thread contexts. According to various embodiments, temporal continuation engine 1407 implements adaptive temporal decay models that preserve important threads longer than casual interactions, utilize predictive temporal modeling that anticipates likely thread reactivation times, and maintain temporal optimization strategies that balance thread availability with resource efficiency.

A thread metadata manager 1408 maintains comprehensive attribute information for each thread including creation parameters, usage statistics, performance metrics, and user-specific customization settings. The manager can implement metadata schema that capture thread characteristics, semantic categories, user preferences, and system performance indicators, utilize metadata indexing mechanisms that enable efficient thread discovery and categorization, and perform metadata analysis operations that identify usage patterns and optimization opportunities. According to various embodiments, thread metadata manager 1408 implements automated metadata generation that infers thread properties from usage patterns, utilize metadata-based recommendation systems that suggest relevant threads to users, and maintain metadata consistency validation that ensures attribute accuracy across system operations.

A thread coordination hub 1409 can be configured as the central logical coordination point that orchestrates interactions between all thread management components, implementing coordination protocols that ensure consistent system behavior and optimal resource utilization. The hub may implement inter-component communication mechanisms that enable efficient data sharing and coordination, utilize global state management that maintains system-wide consistency, and perform coordination optimization that minimizes redundant operations and maximizes processing efficiency. According to various embodiments, thread coordination hub 1409 may implement distributed coordination algorithms that enable scalable thread management across multiple processing instances, utilize event-driven coordination mechanisms that respond to system state changes, and maintain coordination monitoring that tracks system performance and identifies optimization opportunities.

Adaptive learning engine 1410 continuously improves thread management performance through machine learning algorithms that analyze user interaction patterns, system performance metrics, and thread usage statistics to optimize management strategies. The engine may implement reinforcement learning algorithms that adapt thread management policies based on user feedback and engagement metrics, utilize pattern recognition techniques that identify optimal thread management strategies for different user types and usage contexts, and perform continuous model updating that incorporates new data to improve performance over time. According to various embodiments, adaptive learning engine 1410 implements personalized learning models that adapt to individual user preferences and behavior patterns, utilize federated learning approaches that improve performance while preserving user privacy, and maintain learning validation mechanisms that ensure model improvements provide genuine benefits.

A thread lifecycle manager 1411 handles complete thread management from creation through archival, implementing policies and procedures that optimize thread resource utilization while preserving important conversation history. The manager may implement thread creation algorithms that establish new threads with appropriate initial parameters, utilize thread maintenance procedures that preserve thread health and performance over time, and perform thread archival operations that migrate inactive threads to long-term storage while maintaining accessibility. A cross-thread synchronizer 1412 coordinates interactions between multiple simultaneous threads, managing dependencies, conflicts, and information sharing opportunities that arise from parallel thread processing.

A resource allocation monitor 1413 optimizes computational resource usage across all thread management operations, implementing dynamic allocation strategies that balance performance requirements with system constraints. The monitor may implement resource usage tracking that monitors computational overhead, memory utilization, and processing latency across thread operations, utilize predictive resource modeling that anticipates resource requirements based on thread activity patterns, and perform resource optimization that adjusts allocation strategies to maximize overall system performance.

Throughout operation, contextual thread manager 1400 maintains bidirectional communication with multi-tier thought cache 1360 and other system components, enabling integrated thread management that leverages cached thoughts and manifold-based reasoning capabilities. The system produces outputs directed to geodesic dialogue engine 1340 and maintains interfaces with personalized cognitive manifold 1320 that enable seamless integration of thread management with geometric manifold navigation and dialogue generation processes. According to various embodiments, the architecture may implement different operational modes based on system load, user preferences, and thread complexity requirements, ensuring robust thread management performance across diverse usage scenarios while maintaining the core benefits of personalized contextual threading capabilities.

Figure 15:
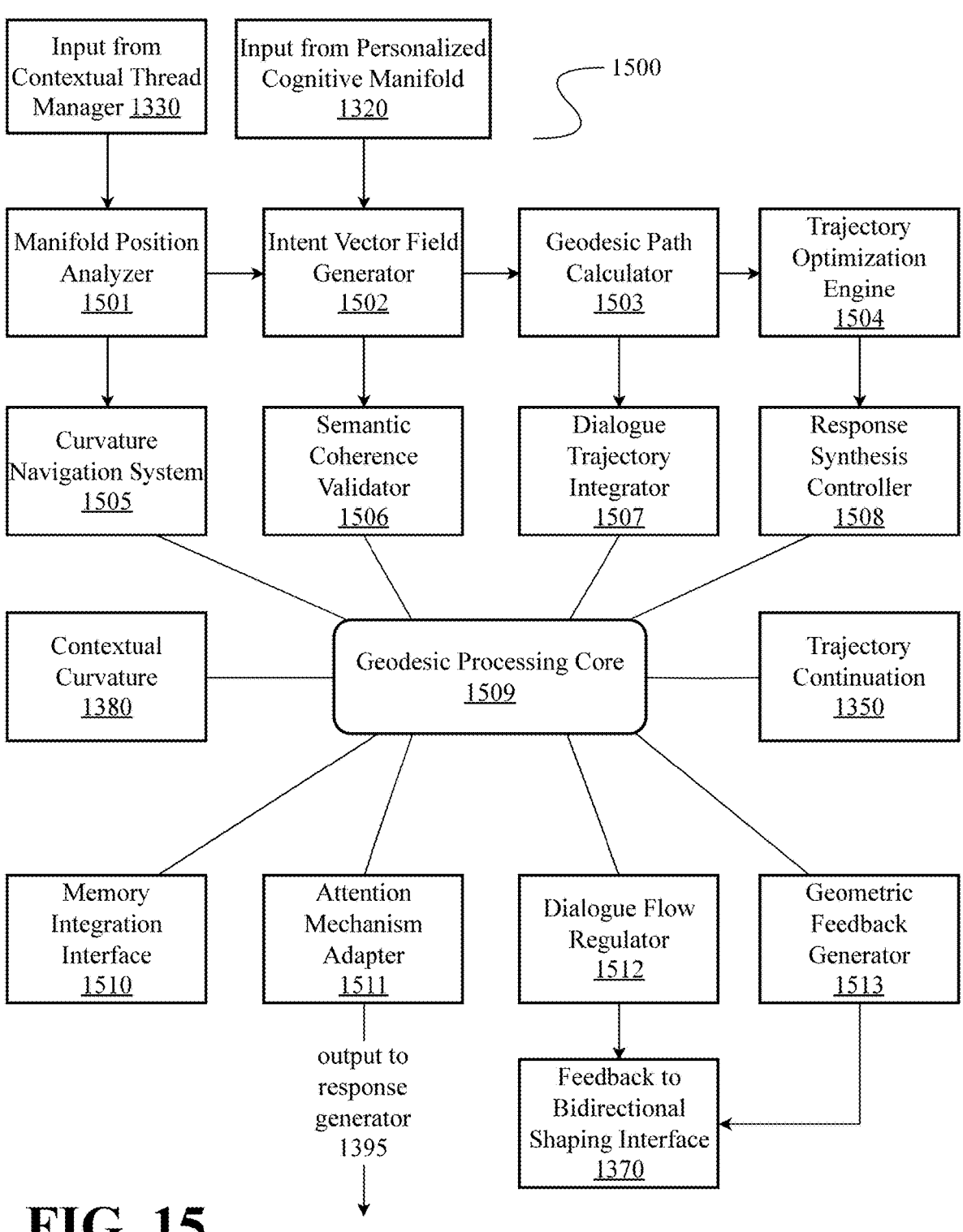
FIG. 15 is a block diagram illustrating an exemplary aspect of the latent contextual threading system, a geodesic dialogue engine.

FIG. 15 is a block diagram illustrating an exemplary aspect of the latent contextual threading system, a geodesic dialogue engine 1500. Geodesic dialogue engine 1500 is configured to generate dialogue responses through geometric manifold traversal rather than traditional retrieval-based or token-prediction approaches, enabling contextually coherent conversations that maintain semantic continuity through geometric trajectory following. The architecture implements a geometric processing pipeline that transforms manifold navigation into natural language responses while preserving dialogue coherence through mathematical principles of differential geometry and Riemannian manifold theory.

Input from contextual thread manager 1330 provides thread-specific context information including, but not limited to, active thread identifiers, manifold coordinate specifications, conversation state parameters, and priority indicators that guide dialogue generation decisions. Input from personalized cognitive manifold 1320 supplies geometric positioning data, curvature information, trajectory histories, and manifold structure parameters that enable precise navigation and trajectory planning within the user's personalized cognitive space. These inputs are processed through coordinated geometric analysis operations that determine optimal dialogue generation strategies based on manifold geometry and conversation context.

A manifold position analyzer 1501 determines the current location within the personalized cognitive manifold through coordinate analysis algorithms that process geometric positioning data and trajectory information. The analyzer may implement coordinate validation procedures that ensure manifold position accuracy, utilize position interpolation algorithms that estimate intermediate positions during conversation transitions, and perform position optimization operations that adjust coordinates for optimal dialogue generation. According to various embodiments, manifold position analyzer 1501 maintains position history buffers that track conversation trajectory evolution, implement position prediction algorithms that anticipate likely trajectory continuations, and utilize multi-scale position analysis that operates across different manifold resolution levels to capture both fine-grained conversation details and broad thematic structures.

An intent vector field generator 1502 creates goal-directed navigation vectors that guide manifold traversal toward desired dialogue outcomes, adapting intent conditioning techniques from geometric memory manifold systems for dialogue-specific applications. The generator may implement utility function formulation algorithms that convert user intents into mathematical optimization objectives, utilize vector field computation techniques that create smooth guidance fields across manifold regions, and perform field optimization operations that balance multiple competing objectives including coherence preservation, goal achievement, and conversation flow maintenance. According to various embodiments, intent vector field generator 1502 implements adaptive field strength modulation that adjusts guidance intensity based on conversation context, utilize multi-objective field generation that accommodates competing dialogue goals, and maintain field consistency validation that ensures vector fields produce stable trajectory guidance.

A geodesic path calculator 1503 computes optimal dialogue trajectories through the manifold by solving geodesic equations such as $D^2\gamma/dt^2 + \Gamma^k_{ij}(d\gamma^i/dt)(d\gamma^j/dt) = 0$, where $\Gamma^k_{ij}$ represents Christoffel symbols encoding manifold curvature and γ represents the dialogue trajectory path. The calculator cam implement numerical integration schemes for geodesic computation including, for instance, Runge-Kutta methods, symplectic integrators, and adaptive step-size algorithms that maintain computational accuracy while optimizing performance. According to various embodiments, geodesic path calculator 1503 utilizes constrained geodesic computation that incorporates dialogue constraints and boundary conditions, implement multi-path generation that explores alternative trajectory options, and perform path validation operations that ensure computed geodesics remain within valid manifold regions and maintain semantic coherence.

A trajectory optimization engine 1504 refines dialogue trajectories through optimization algorithms that balance multiple objectives including dialogue coherence, user satisfaction, computational efficiency, and manifold stability. The engine may implement variational optimization techniques that minimize action functionals while satisfying dialogue constraints, utilize gradient-based optimization methods that refine trajectory parameters based on performance feedback, and perform multi-objective optimization that accommodates competing dialogue requirements. According to various embodiments, trajectory optimization engine 1504 may implement reinforcement learning algorithms that improve trajectory selection based on dialogue outcomes, utilize predictive optimization that anticipates trajectory consequences, and maintain optimization validation mechanisms that ensure improved trajectories provide genuine dialogue quality benefits.

A curvature navigation system 1505 implements navigation algorithms that utilize manifold curvature properties to guide dialogue generation, enabling responses that naturally follow the geometric structure of the user's cognitive space. The system may implement curvature-aware pathfinding algorithms that prefer routes through regions of appropriate curvature characteristics, utilize sectional curvature analysis that evaluates semantic stability along proposed dialogue paths, and perform curvature-based flow control that adjusts conversation pacing based on geometric properties. According to various embodiments, curvature navigation system 1505 can implement adaptive curvature sensitivity that adjusts navigation behavior based on conversation complexity, utilize multi-scale curvature analysis that operates across different geometric resolution levels, and maintain curvature validation procedures that ensure navigation decisions produce semantically coherent results.

A semantic coherence validator 1506 evaluates dialogue consistency through geometric analysis techniques that assess trajectory stability, manifold coherence, and semantic flow continuity rather than traditional linguistic validation approaches. The validator may implement geodesic deviation analysis that quantifies conversation stability through geometric measures, utilize curvature-based coherence assessment that evaluates semantic consistency through manifold properties, and perform trajectory alignment validation that ensures dialogue progression maintains geometric coherence. According to various embodiments, semantic coherence validator 1506 generates coherence confidence scores that guide dialogue generation decisions, implement predictive coherence modeling that anticipates potential coherence degradation, and maintain coherence optimization recommendations that suggest trajectory adjustments to preserve dialogue quality.

A dialogue trajectory integrator 1507 synthesizes geometric navigation results with linguistic generation processes, transforming manifold traversal outcomes into natural language dialogue responses that preserve geometric coherence while maintaining conversational naturalness. The integrator can implement trajectory-to-language mapping algorithms that convert geometric paths into semantic content, utilize content interpolation techniques that generate smooth dialogue transitions along trajectory segments, and perform linguistic coherence validation that ensures generated responses maintain both geometric and linguistic consistency. According to various embodiments, dialogue trajectory integrator 1507 may implement adaptive integration strategies that adjust mapping approaches based on conversation context, utilize multi-modal integration that accommodates various response types and formats, and maintain integration quality assessment that validates the effectiveness of geometric-to-linguistic translation processes.

A response synthesis controller 1508 orchestrates the generation of final dialogue responses through coordination of geometric navigation results, cached content retrieval, and real-time adaptation mechanisms. The controller may implement response assembly algorithms that combine trajectory-derived content with contextual information, utilize quality control procedures that validate response appropriateness and coherence, and perform adaptive response modification that adjusts content based on real-time feedback and context changes. According to various embodiments, response synthesis controller 1508 may implement multi-source integration that combines geometric navigation with traditional language model capabilities, utilize response optimization that refines generated content for improved quality and relevance, and maintain response validation mechanisms that ensure final outputs meet dialogue quality standards.

Geodesic processing core 1509 serves as the central coordination hub that orchestrates interactions between all geometric processing components, implementing coordination protocols that ensure consistent mathematical operations and optimal resource utilization across the geometric processing pipeline. The core may implement distributed processing coordination that enables scalable geometric computations, utilize mathematical consistency validation that ensures geometric operations maintain mathematical rigor, and perform processing optimization that minimizes computational overhead while preserving geometric accuracy.

A memory integration interface 1510 provides integration with geometric memory manifold systems, enabling dialogue generation to leverage persistent memory structures through manifold-compatible access mechanisms. The interface may implement memory coordinate translation that aligns dialogue manifold positions with memory manifold structures, utilize cross-manifold navigation that enables dialogue generation to access relevant memory regions, and perform memory integration validation that ensures accessed memory content maintains geometric and semantic consistency with current dialogue contexts.

An attention mechanism adapter 1511 transforms geometric manifold coordinates and trajectory information into vector representations compatible with standard transformer attention mechanisms, enabling integration of geometric dialogue generation with conventional language model architectures. The adapter can implement coordinate-to-vector transformation algorithms that preserve geometric relationships while ensuring dimensional compatibility, utilize attention weight modulation that incorporates geometric information into attention computations, and perform attention validation that ensures geometric integration enhances rather than degrades attention mechanism performance.

A dialogue flow regulator 1512 manages conversation pacing, turn-taking, and flow control through geometric analysis of conversation trajectories and manifold navigation patterns. The regulator may implement flow optimization algorithms that adjust conversation pacing based on geometric properties, utilize turn-taking prediction that anticipates conversation transitions through trajectory analysis, and perform flow validation that ensures conversation progression maintains natural dialogue characteristics.

Geometric feedback generator 1513 produces feedback signals that inform bidirectional manifold shaping processes, enabling the dialogue generation process to contribute to ongoing manifold evolution and personalization. The generator may implement feedback signal generation that captures dialogue success metrics and geometric navigation effectiveness, utilize manifold update recommendations that suggest geometric modifications based on dialogue outcomes, and perform feedback validation that ensures feedback signals contribute positively to manifold evolution.

Throughout operation, geodesic dialogue engine 1500 maintains continuous coordination with contextual curvature analyzer 1380 and trajectory continuation system 1350, enabling integrated geometric processing that leverages manifold analysis and trajectory management capabilities. The engine produces outputs directed to response generator 1395 while providing geometric feedback to bidirectional shaping interface 1370, enabling closed-loop dialogue generation that continuously improves through geometric adaptation and manifold evolution. According to various embodiments, the architecture may implement different processing modes based on conversation complexity, computational resources, and dialogue quality requirements, ensuring robust geometric dialogue generation across diverse conversational contexts while maintaining the core benefits of manifold-based dialogue continuity and coherence.

Figure 16:
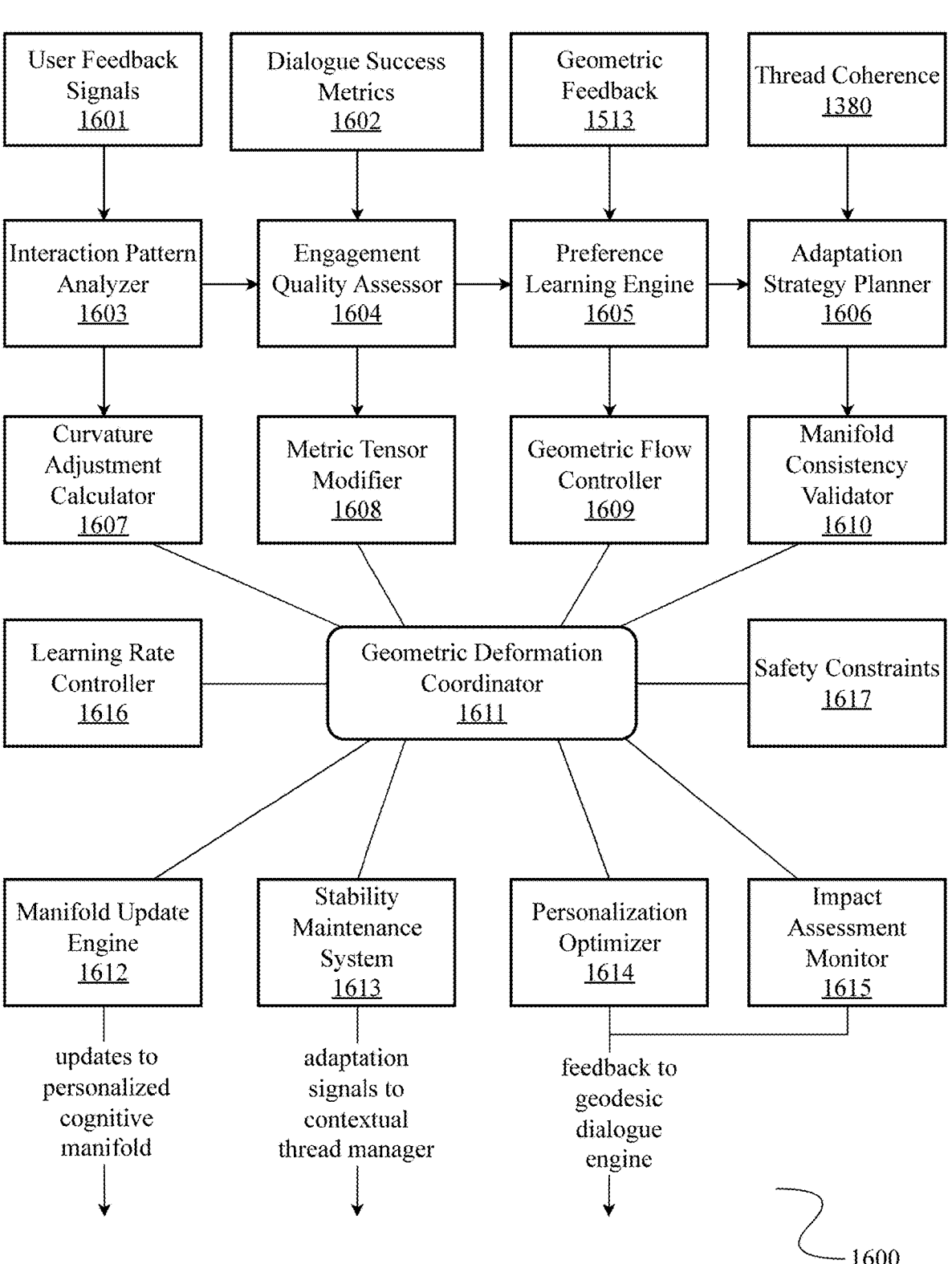
FIG. 16 is a block diagram illustrating an exemplary aspect of the latent contextual threading system, a bidirectional shaping interface.

FIG. 16 is a block diagram illustrating an exemplary aspect of the latent contextual threading system, a bidirectional shaping interface 1600. Bidirectional shaping interface 1600 enables real-time adaptation of the personalized cognitive manifold based on user interactions, system performance feedback, and geometric analysis results. The interface implements one or more learning algorithms that continuously reshape manifold geometry to improve dialogue quality, enhance user satisfaction, and optimize personalization effectiveness while maintaining geometric stability and mathematical coherence throughout the adaptation process.

The architecture receives multiple input streams that provide information about system performance and user interaction patterns. User feedback signals 1601 comprise explicit and implicit feedback from user interactions including satisfaction indicators, engagement metrics, correction signals, and preference expressions that guide adaptation decisions. Dialogue success metrics 1602 provide quantitative measures of conversation quality including coherence scores, task completion rates, user engagement duration, and response appropriateness assessments that inform geometric modification strategies. Geometric feedback from engine 1513 supplies mathematical analysis results from the geodesic dialogue engine including trajectory stability measures, path optimization outcomes, and geometric coherence assessments that guide manifold evolution decisions. Thread coherence analysis 1380 provides geometric evaluation results including curvature measurements, sectional curvature analysis, and geodesic deviation calculations that assess the current state of manifold geometry and identify areas requiring adjustment.

An interaction pattern analyzer 1603 processes user feedback signals through pattern recognition algorithms that identify recurring interaction patterns, behavioral trends, and engagement characteristics that indicate user preferences and adaptation requirements. The analyzer may implement machine learning algorithms including clustering techniques for grouping similar interaction patterns, sequence analysis for identifying temporal patterns in user behavior, and anomaly detection for identifying unusual interaction sequences that may indicate user dissatisfaction or system issues. According to various embodiments, interaction pattern analyzer 1603 maintains pattern history databases that track long-term user behavior evolution, implement pattern classification algorithms that categorize interactions by type and context, and utilize predictive modeling techniques that anticipate likely user behavior patterns based on historical data and current context.

An engagement quality assessor 1604 evaluates user engagement levels through multi-modal analysis techniques that combine explicit feedback indicators, implicit behavioral signals, and conversation flow characteristics to generate comprehensive engagement quality scores. The assessor may implement attention tracking algorithms that monitor user focus patterns, response timing analysis that evaluates user interaction latency and frequency, and sentiment analysis techniques that assess emotional engagement and satisfaction levels. According to various embodiments, engagement quality assessor 1604 may utilize natural language processing techniques to analyze user language patterns for engagement indicators, implement physiological signal processing for users with biometric feedback capabilities, and maintain engagement baseline models that adapt to individual user engagement patterns over time.

A preference learning engine 1605 extracts user preferences from interaction patterns, feedback signals, and engagement data through advanced machine learning algorithms that identify personalization opportunities and adaptation strategies. The engine can implement reinforcement learning algorithms that optimize manifold parameters based on user reward signals, utilize collaborative filtering techniques that leverage patterns from similar users while preserving privacy, and perform preference modeling that captures user-specific dialogue styles, topic interests, and interaction preferences. According to various embodiments, preference learning engine 1605 implements multi-armed bandit algorithms for exploring new personalization strategies while exploiting known successful approaches, utilize hierarchical preference modeling that captures preferences at multiple levels of abstraction, and maintain preference uncertainty estimation that guides exploration strategies in areas with limited user feedback.

An adaptation strategy planner 1606 develops comprehensive manifold modification strategies based on analysis results from other components, implementing strategic planning algorithms that balance competing objectives including personalization effectiveness, geometric stability, computational efficiency, and user satisfaction optimization. The planner may implement multi-objective optimization algorithms that find optimal trade-offs between conflicting adaptation goals, utilize constraint satisfaction techniques that ensure adaptation strategies satisfy geometric and computational constraints, and perform impact prediction that estimates the likely consequences of proposed manifold modifications. According to various embodiments, adaptation strategy planner 1606 can implement hierarchical planning approaches that operate across multiple temporal scales, utilize Monte Carlo simulation techniques for evaluating adaptation strategy outcomes, and maintain strategy validation mechanisms that assess adaptation effectiveness before implementation.

A curvature adjustment calculator 1607 computes specific geometric modifications required to implement adaptation strategies, translating high-level adaptation goals into precise mathematical operations on manifold curvature properties. The calculator may implement differential geometry algorithms for computing curvature modifications, utilize numerical optimization techniques for determining optimal curvature parameter adjustments, and perform geometric validation operations that ensure proposed modifications maintain manifold mathematical properties. According to various embodiments, curvature adjustment calculator 1607 may implement adaptive step-size algorithms that control the magnitude of curvature modifications based on stability considerations, utilize curvature flow simulation that predicts the evolution of geometric properties under proposed modifications, and maintain curvature constraint validation that ensures modifications preserve essential geometric relationships.

A metric tensor modifier 1608 implements modifications to the manifold's metric tensor properties, adapting geometric distance relationships and inner product structures to reflect learned user preferences and improved dialogue flow characteristics. Building upon metric tensor manipulation techniques, the modifier may implement tensor calculus algorithms for computing metric modifications, utilize parallel transport operations for maintaining geometric consistency during metric updates, and perform metric validation procedures that ensure modified tensors maintain positive definiteness and other essential mathematical properties. According to various embodiments, metric tensor modifier 1608 employs gradual metric evolution algorithms that apply modifications smoothly over time, utilize metric interpolation techniques for transitioning between different metric configurations, and maintain metric history tracking that enables rollback of unsuccessful modifications.

A geometric flow controller 1609 manages the temporal evolution of manifold geometry through controlled geometric flow processes that implement adaptation strategies while preserving manifold stability and mathematical coherence. Adapting geometric flow techniques for dialogue-specific requirements, the controller may implement Ricci flow algorithms for curvature evolution, utilize mean curvature flow for surface smoothing operations, and perform flow stability analysis that ensures geometric evolution remains within stable parameter ranges. According to various embodiments, geometric flow controller 1609 may implement adaptive flow rate control that adjusts evolution speed based on stability considerations, utilize flow direction optimization that guides geometric evolution toward desired configurations, and maintain flow checkpoint mechanisms that enable recovery from unstable geometric states.

A manifold consistency validator 1610 ensures that all geometric modifications preserve essential mathematical properties and maintain manifold integrity throughout the adaptation process. The validator may implement topological consistency checking that verifies manifold structure preservation, utilize geometric property validation that ensures curvature modifications maintain mathematical coherence, and perform numerical stability assessment that identifies potential computational issues with proposed modifications. According to various embodiments, manifold consistency validator 1610 may implement automated correction algorithms that adjust modifications to restore consistency when violations are detected, utilize consistency prediction modeling that anticipates potential consistency issues before implementation, and maintain validation history tracking that identifies recurring consistency challenges and develops prevention strategies.

A geometric deformation coordinator 1611 serves as the central coordination hub that orchestrates interactions between all geometric processing components, implementing coordination protocols that ensure consistent mathematical operations and optimal resource utilization across the geometric adaptation pipeline. The coordinator can implement distributed processing coordination that enables scalable geometric computations across multiple processing instances, utilize mathematical consistency validation that ensures geometric operations maintain mathematical rigor throughout the adaptation process, and perform processing optimization that minimizes computational overhead while preserving geometric accuracy and adaptation effectiveness.

A manifold update engine 1612 implements approved geometric modifications through controlled update procedures that apply computed changes to the personalized cognitive manifold while maintaining system stability and performance. The engine may implement atomic update operations that ensure modification consistency, utilize rollback mechanisms for recovering from unsuccessful updates, and perform update validation that confirms successful implementation of geometric changes. Stability maintenance system 1613 monitors manifold stability throughout the adaptation process, implementing stability assessment algorithms that detect potential instabilities and preventive measures that maintain geometric coherence during modifications.

Personalization optimizer 1614 fine-tunes adaptation parameters to maximize personalization effectiveness while balancing computational efficiency and system performance constraints. The optimizer may implement parameter tuning algorithms that adjust adaptation sensitivity based on user feedback quality and frequency, utilize efficiency optimization techniques that minimize computational overhead while preserving adaptation quality, and perform personalization quality assessment that measures the effectiveness of implemented adaptations. Impact assessment monitor 1615 evaluates the consequences of implemented adaptations through comprehensive analysis of dialogue quality improvements, user satisfaction changes, and system performance impacts, providing feedback for future adaptation decisions.

A learning rate controller 1616 manages the speed and magnitude of adaptation processes, implementing adaptive learning rate algorithms that adjust modification intensity based on user feedback confidence, adaptation success rates, and geometric stability considerations. A safety constraints monitor 1617 enforces safety limitations that prevent adaptations from compromising system stability, user privacy, or mathematical coherence, implementing constraint validation algorithms and emergency intervention procedures for addressing potentially harmful adaptations.

Throughout operation, bidirectional shaping interface 1600 maintains continuous coordination with all major system components, producing updates directed to personalized cognitive manifold 1320, adaptation signals for contextual thread manager 1330, and feedback for geodesic dialogue engine 1340. The system implements multiple feedback loops that enable continuous learning and improvement, ensuring that manifold adaptations contribute positively to overall system performance while maintaining the geometric and mathematical properties essential for effective dialogue generation and personalized interaction capabilities. According to various embodiments, the architecture may implement different operational modes based on adaptation complexity, user feedback availability, and system resource constraints, ensuring robust bidirectional shaping performance across diverse usage scenarios while preserving the core benefits of real-time manifold personalization and continuous dialogue improvement.

Figure 17:
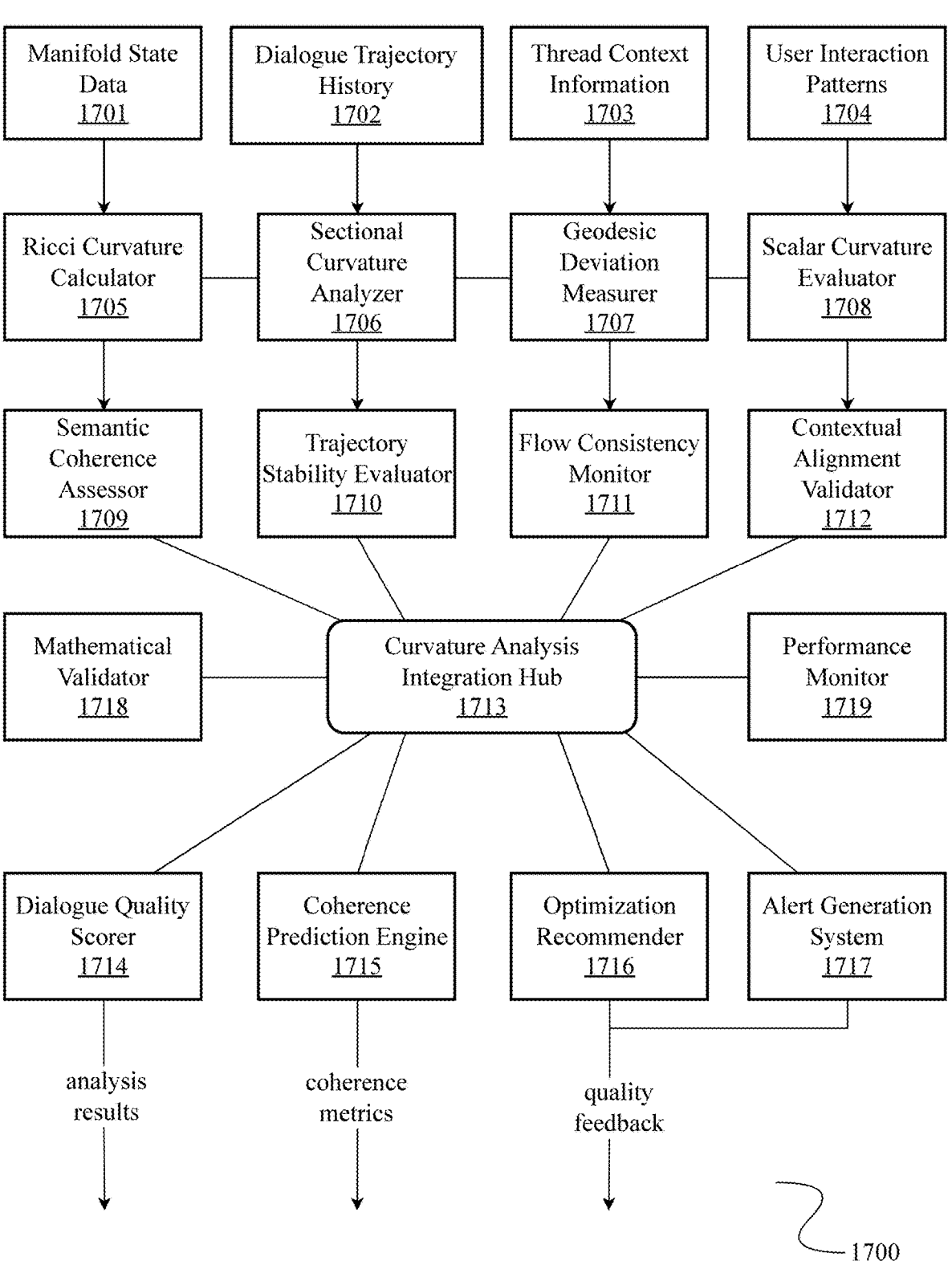
FIG. 17 is a block diagram illustrating an exemplary aspect of the latent contextual threading system, a contextual curvature analyzer.

FIG. 17 is a block diagram illustrating an exemplary aspect of the latent contextual threading system, a contextual curvature analyzer 1700. Contextual curvature analyzer 1700 is configured as a geometric analysis component that evaluates dialogue coherence and semantic flow through mathematical analysis of manifold curvature properties rather than traditional linguistic metrics. The analyzer implements advanced differential geometry algorithms that assess conversation quality, predict trajectory stability, and identify optimization opportunities through rigorous geometric evaluation of the personalized cognitive manifold structure and dynamics.

The architecture processes multiple input streams that provide comprehensive geometric and contextual information for curvature analysis operations. Manifold state data 1701 supplies current geometric configuration information including coordinate positions, metric tensor properties, curvature distributions, and manifold topology characteristics that define the present state of the personalized cognitive manifold. Dialogue trajectory history 1702 provides temporal sequence data including conversation path coordinates, trajectory velocity vectors, acceleration patterns, and historical geometric evolution that enables analysis of conversation flow patterns and trajectory stability characteristics. Thread context information 1703 delivers thread-specific geometric data including thread manifold positions, context boundaries, cross-thread relationships, and thread-specific curvature modifications that inform contextual analysis operations. User interaction patterns 1704 supply behavioral data including interaction frequency distributions, engagement pattern geometries, preference-based curvature influences, and user-specific geometric signatures that guide personalized analysis strategies.

Ricci curvature calculator 1705 computes Ricci curvature tensors that quantify local geometric properties and semantic density concentrations within the manifold, adapting curvature calculation techniques from geometric memory manifold systems for dialogue-specific analysis requirements. The calculator may implement tensor computation algorithms that calculate Ricci curvature components Ric(X,Y) for vector fields X and Y, utilize numerical integration schemes for computing curvature values across manifold regions, and perform curvature distribution analysis that identifies regions of high and low semantic concentration. According to various embodiments, Ricci curvature calculator 1705 can implement adaptive resolution algorithms that adjust calculation precision based on local geometric complexity, utilize parallel computation techniques for efficient curvature evaluation across large manifold regions, and maintain curvature history tracking that enables temporal analysis of geometric evolution patterns.

Sectional curvature analyzer 1706 evaluates sectional curvature $K(\sigma)$ for two-dimensional subspaces $\sigma$ within the manifold, providing insights into semantic robustness and generalization capacity of dialogue regions. Building upon sectional curvature analysis, the analyzer may implement plane selection algorithms that identify semantically significant two-dimensional subspaces for analysis, utilize curvature computation techniques that calculate sectional curvature values for selected planes, and perform curvature interpretation algorithms that translate geometric measurements into dialogue quality indicators. According to various embodiments, sectional curvature analyzer 1706 implements adaptive plane sampling that focuses analysis on regions of high dialogue activity, utilize curvature clustering techniques that group similar curvature characteristics, and maintain curvature significance assessment that identifies geometrically meaningful curvature variations.

A geodesic deviation measurer 1707 quantifies trajectory stability through analysis of geodesic deviation patterns, implementing mathematical techniques that assess how nearby dialogue trajectories diverge or converge over time. In some aspects, measurer may implement Jacobi field calculations that solve the geodesic deviation equation $D^2\xi/dt^2+R(\xi,\gamma)\,\gamma=0$, where $\xi$ represents the deviation vector and R denotes the Riemann curvature tensor, utilize deviation magnitude analysis that quantifies trajectory separation rates, and perform stability classification that categorizes trajectory regions based on deviation characteristics. According to various embodiments, geodesic deviation measurer 1707 can implement predictive deviation modeling that anticipates trajectory stability based on current geometric conditions, utilize multi-scale deviation analysis that operates across different temporal and spatial scales, and maintain deviation threshold monitoring that identifies regions approaching instability conditions.

Scalar curvature evaluator 1708 computes scalar curvature values that provide overall geometric characterization of manifold regions, offering global geometric insights that complement local curvature measurements from other components. The evaluator may implement scalar curvature integration algorithms that compute $S=g^{\{ij\}}\mathrm{Ric}_{\{ij\}}$ where $g^{\{ij\}}$ represents metric tensor components and $\mathrm{Ric}_{\{ij\}}$ denotes Ricci curvature components, utilize curvature averaging techniques that generate representative scalar values for manifold regions, and perform curvature gradient analysis that identifies directional trends in geometric properties. According to various embodiments, scalar curvature evaluator 1708 can implement curvature normalization procedures that enable comparison across different manifold regions, utilize curvature significance testing that identifies statistically meaningful geometric variations, and maintain curvature baseline tracking that establishes reference values for comparative analysis.

Semantic coherence assessor 1709 translates geometric curvature measurements into semantic coherence evaluations, implementing algorithms that interpret geometric properties as indicators of dialogue quality and conversation flow consistency. The assessor may implement geometric-to-semantic mapping algorithms that correlate curvature characteristics with dialogue coherence metrics, utilize coherence scoring techniques that generate quantitative assessments of conversation quality based on geometric analysis, and perform coherence trend analysis that identifies patterns in semantic consistency over time. According to various embodiments, semantic coherence assessor 1709 may implement adaptive coherence thresholds that adjust quality standards based on user preferences and conversation context, utilize multi-dimensional coherence evaluation that assesses coherence across multiple geometric and semantic dimensions, and maintain coherence prediction capabilities that anticipate likely coherence evolution based on current geometric trends.

A trajectory stability evaluator 1710 assesses the stability of dialogue trajectories through comprehensive analysis of geometric stability indicators, trajectory deviation patterns, and manifold flow characteristics. The evaluator can implement stability metric calculations that quantify trajectory robustness against perturbations, utilize Lyapunov exponent analysis for assessing exponential stability characteristics, and perform phase space analysis that characterizes trajectory behavior in high-dimensional geometric spaces. According to various embodiments, trajectory stability evaluator 1710 implements multi-scale stability assessment that evaluates stability across different temporal horizons, utilize comparative stability analysis that benchmarks current trajectory stability against historical patterns, and maintain stability alerting mechanisms that identify potentially unstable trajectory conditions before they manifest as dialogue quality degradation.

A flow consistency monitor 1711 evaluates the consistency of dialogue flow through analysis of manifold flow properties, geometric continuity measures, and conversation momentum characteristics. The monitor may implement flow field analysis that characterizes vector field properties governing dialogue evolution, utilize continuity assessment algorithms that evaluate smoothness of conversation transitions, and perform flow coherence analysis that identifies disruptions or inconsistencies in dialogue progression. Contextual alignment validator 1712 ensures that geometric analysis results align with conversational context and user expectations, implementing validation algorithms that verify the relevance and appropriateness of geometric interpretations for current dialogue situations.

A curvature analysis integration hub 1713 serves as the central coordination mechanism that orchestrates interactions between all geometric analysis components, implementing integration protocols that synthesize diverse curvature measurements into comprehensive dialogue quality assessments. The hub may implement multi-source data fusion algorithms that combine curvature measurements from different analysis components, utilize weighted integration schemes that prioritize different geometric measurements based on context and analysis goals, and perform consistency validation that ensures integrated results maintain mathematical coherence across all analysis dimensions.

A dialogue quality scorer 1714 generates quantitative dialogue quality scores based on integrated geometric analysis results, implementing scoring algorithms that translate complex geometric measurements into interpretable quality metrics. The scorer may implement multi-criteria scoring functions that balance different aspects of geometric quality including curvature consistency, trajectory stability, and semantic coherence, utilize adaptive scoring weights that adjust quality emphasis based on user preferences and conversation context, and perform score normalization that enables comparison across different dialogue sessions and user interactions. Coherence prediction engine 1715 forecasts future dialogue coherence based on current geometric trends and historical patterns, implementing predictive modeling algorithms that anticipate likely coherence evolution under various continuation scenarios.

An optimization recommender 1716 analyzes geometric analysis results to identify specific optimization opportunities and recommend geometric modifications that could improve dialogue quality and coherence. The recommender may implement optimization opportunity detection algorithms that identify geometric configurations conducive to improved dialogue flow, utilize recommendation ranking systems that prioritize optimization suggestions based on potential impact and implementation feasibility, and perform recommendation validation that ensures suggested optimizations maintain geometric consistency and mathematical rigor. An alert generation system 1717 monitors analysis results for conditions requiring immediate attention, implementing alerting algorithms that identify potential coherence failures, geometric instabilities, or dialogue quality degradations before they significantly impact user experience.

Mathematical validator 1718 ensures mathematical rigor and computational accuracy throughout all geometric analysis operations, implementing validation algorithms that verify curvature calculations, geometric consistency, and numerical stability. Performance monitor 1719 tracks computational efficiency and resource utilization across all analysis components, implementing performance optimization strategies that balance analysis depth with computational constraints and real-time responsiveness requirements.

Throughout operation, contextual curvature analyzer 1700 produces comprehensive analysis results directed to bidirectional shaping interface 1370 for manifold adaptation guidance, coherence metrics for contextual thread manager 1330 to inform thread management decisions, and quality feedback for geodesic dialogue engine 1340 to guide trajectory optimization. The system implements multiple feedback loops that enable continuous refinement of analysis capabilities and adaptation to user-specific geometric patterns and dialogue preferences. According to various embodiments, the architecture may implement different analysis modes based on computational resources, analysis depth requirements, and real-time performance constraints, ensuring robust geometric analysis capabilities across diverse operational scenarios while maintaining the mathematical rigor essential for accurate dialogue quality assessment through geometric principles.

Figure 18:
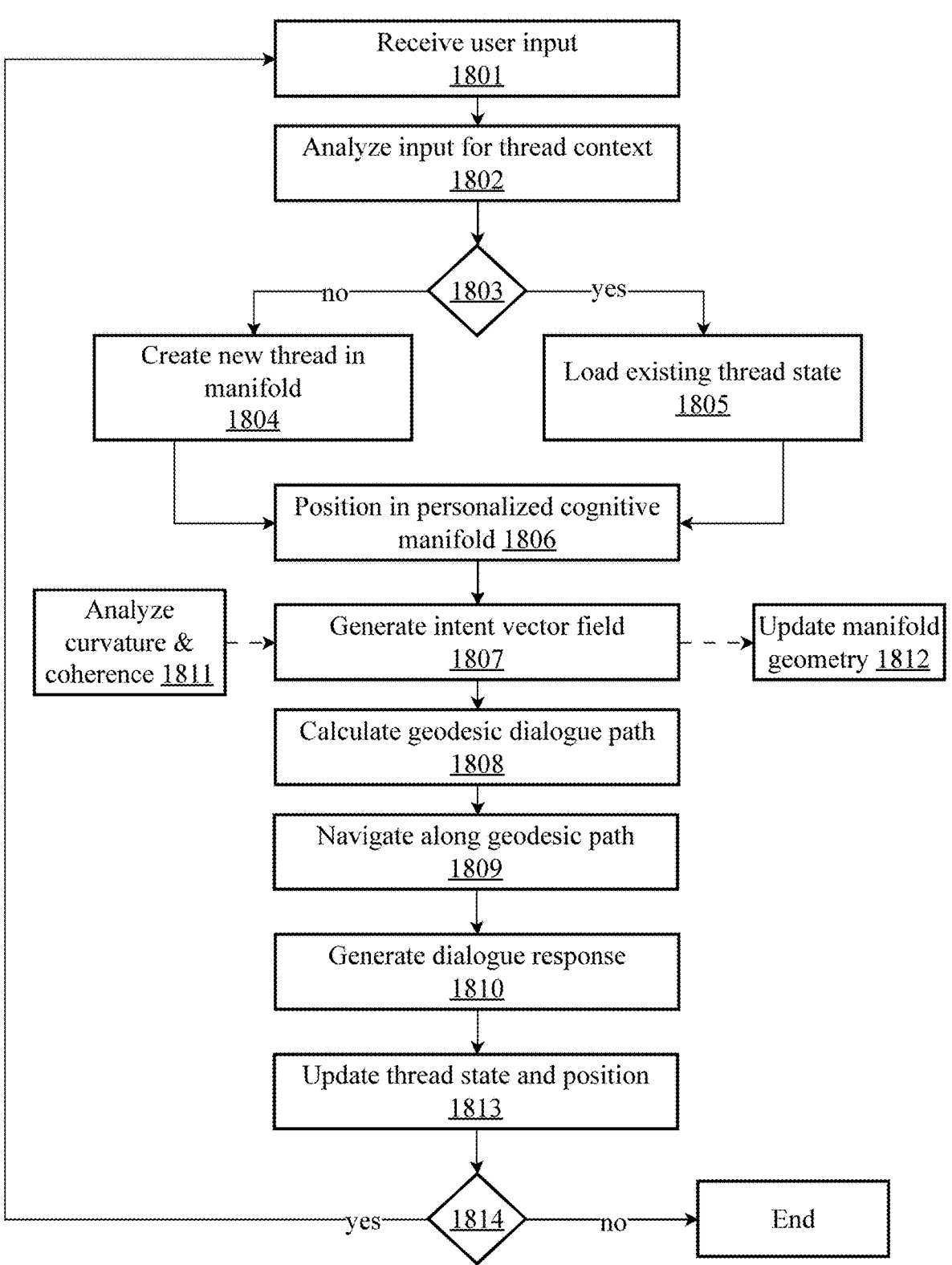
FIG. 18 is a flow diagram illustrating an exemplary method for implementing latent contextual threading for personalized PCM-human dialogues, according to an embodiment.

FIG. 18 is a flow diagram illustrating an exemplary method for implementing latent contextual threading for personalized PCM-human dialogues, according to an embodiment. The method demonstrates a process flow that enables continuous, personalized dialogue experiences through geometric manifold-based contextual threading, incorporating thread management, geometric navigation, real-time adaptation, and bidirectional feedback mechanisms that maintain dialogue coherence across sessions while continuously improving personalization effectiveness.

According to the embodiment, the process begins with receiving user input at step 1801, which may comprise various forms of natural language communication including text, voice, or multimodal inputs that initiate or continue dialogue interactions. The system processes user input through input validation algorithms that verify communication integrity, content analysis procedures that extract semantic information and intent indicators, and preprocessing operations that prepare input data for geometric analysis and thread identification operations. According to various embodiments, receiving user input 1801 may implement multi-modal input processing that accommodates diverse communication channels, input normalization procedures that standardize input formats for consistent processing, and input enrichment operations that augment basic input with contextual metadata and user-specific information.

The system proceeds to analyze input for thread context at step 1802, implementing one or more analysis algorithms that examine user input for contextual indicators, thread identification markers, and conversation continuation signals. This analysis may utilize natural language processing techniques for semantic analysis, pattern recognition algorithms for identifying conversation themes and topics, and context extraction procedures that determine relevant dialogue history and thread associations. According to various embodiments, analyzing input for thread context 1802 can implement machine learning algorithms trained on user-specific conversation patterns, utilize semantic similarity analysis for matching input to existing thread contexts, and perform intent classification that categorizes input according to dialogue goals and conversation types.

The method includes a decision point for determining existing thread presence 1803, where the system evaluates whether user input corresponds to an existing dialogue thread or requires creation of a new conversational context. This decision utilizes thread matching algorithms that compare input characteristics against active and dormant thread profiles, implement similarity scoring techniques that quantify alignment between current input and existing thread contexts, and apply decision thresholds that balance thread reuse with new thread creation based on semantic similarity and contextual relevance measures.

When no existing thread is identified, the method proceeds to create new thread in manifold 1804, implementing thread instantiation procedures that establish new dialogue contexts within the personalized cognitive manifold. This process may involve manifold region allocation that designates geometric space for the new thread, initial positioning algorithms that determine optimal starting coordinates based on input characteristics and user preferences, and thread initialization procedures that establish baseline geometric properties and contextual parameters. According to various embodiments, creating a new thread in manifold 1804 may implement adaptive thread placement that considers existing thread distributions and manifold capacity, utilize predictive positioning algorithms that anticipate likely thread evolution patterns, and perform thread validation operations that ensure new threads maintain geometric consistency with existing manifold structure.

Alternatively, when an existing thread is identified, the method loads existing thread state at step 1805, implementing state restoration procedures that reactivate dormant thread contexts and restore previous dialogue configurations. This process may utilize thread state retrieval algorithms that access stored thread information including geometric positions, conversation history, and contextual parameters, implement state validation procedures that verify thread integrity and geometric consistency, and perform state updating operations that align restored threads with current system configuration and user preferences. According to various embodiments, loading existing thread state 1805 can implement intelligent state restoration that selectively activates relevant thread components while maintaining computational efficiency, utilize state interpolation techniques for bridging temporal gaps in thread activity, and perform state optimization procedures that enhance restored thread performance based on accumulated usage patterns.

The method continues with positioning in personalized cognitive manifold at step 1806, implementing geometric positioning algorithms that establish precise coordinates within the user's personalized cognitive space. This positioning process may utilize coordinate calculation algorithms that determine optimal manifold positions based on thread context and user input characteristics, implement manifold navigation techniques that efficiently traverse geometric space to reach designated positions, and perform position validation operations that ensure geometric consistency and manifold integrity. According to various embodiments, positioning in personalized cognitive manifold 1806 may implement adaptive positioning strategies that adjust coordinate selection based on current manifold state and conversation requirements, utilize multi-scale positioning analysis that operates across different geometric resolution levels, and maintain position optimization procedures that refine coordinates for enhanced dialogue generation effectiveness.

The system proceeds to generate intent vector field at step 1807, implementing vector field computation algorithms that create goal-directed navigation guidance based on user intent and dialogue objectives. This generation process may utilize intent analysis algorithms that extract goal information from user input and conversation context, implement vector field calculation techniques that translate intent into geometric guidance vectors, and perform field optimization operations that balance multiple competing objectives including coherence preservation, goal achievement, and manifold stability. According to various embodiments, generating intent vector field 1807 may implement adaptive field strength modulation that adjusts guidance intensity based on intent confidence and context complexity, utilize multi-objective field generation that accommodates competing dialogue goals simultaneously, and maintain field consistency validation that ensures vector field stability and mathematical coherence.

The method includes calculating geodesic dialogue path at step 1808, implementing sophisticated geometric computation algorithms that determine optimal trajectories through the manifold for dialogue generation. This calculation process may utilize geodesic equation solving techniques that compute paths minimizing geometric action functionals, implement numerical integration schemes for geodesic computation including adaptive step-size algorithms that maintain computational accuracy, and perform path validation operations that ensure computed trajectories remain within valid manifold regions. According to various embodiments, calculating geodesic dialogue path 1808 may implement constrained geodesic computation that incorporates dialogue constraints and boundary conditions, utilize multi-path generation algorithms that explore alternative trajectory options for enhanced dialogue flexibility, and maintain path optimization procedures that refine trajectories based on performance feedback and user preferences.

The system navigates along geodesic path at step 1809, implementing trajectory following algorithms that guide dialogue generation through computed geometric paths while maintaining semantic coherence and conversational flow. This navigation process may utilize path integration techniques that translate geometric trajectories into dialogue progression, implement adaptive navigation algorithms that adjust path following based on real-time feedback and context changes, and perform navigation validation operations that ensure trajectory adherence maintains dialogue quality and geometric consistency. According to various embodiments, navigating along geodesic path 1809 may implement predictive navigation that anticipates trajectory consequences and adjusts navigation accordingly, utilize multi-resolution path following that operates across different temporal and semantic scales, and maintain navigation optimization procedures that enhance path efficiency and dialogue effectiveness.

The method generates dialogue response at step 1810, implementing response synthesis algorithms that transform geometric navigation results into natural language outputs while preserving trajectory-derived semantic coherence and contextual appropriateness. This generation process may utilize trajectory-to-language mapping algorithms that convert geometric path information into semantic content, implement linguistic coherence validation that ensures generated responses maintain both geometric and linguistic consistency, and perform response optimization operations that enhance response quality and relevance. According to various embodiments, generating dialogue response 1810 may implement adaptive response strategies that adjust generation approaches based on conversation context and user preferences, utilize multi-modal response generation that accommodates various output formats and interaction styles, and maintain response quality assessment that validates generation effectiveness and user satisfaction.

Throughout the main process flow, the method implements parallel processing operations including analyzing curvature and coherence at step 1811 and updating manifold geometry at step 1812. These concurrent processes enable real-time geometric analysis and manifold adaptation without interrupting primary dialogue generation operations. The curvature analysis process implements geometric evaluation algorithms that assess dialogue quality through manifold properties, while the manifold update process implements bidirectional shaping operations that adapt geometric structure based on interaction outcomes and user feedback.

The method concludes the primary cycle with updating thread state and position at step 1813, implementing state preservation algorithms that maintain thread continuity for future interactions while recording geometric positions, conversation history, and contextual evolution. This updating process may utilize state serialization techniques that efficiently store thread information, implement incremental update algorithms that minimize computational overhead while preserving essential thread characteristics, and perform state validation operations that ensure updated thread information maintains consistency and integrity.

The method includes a continuation decision point 1814 that determines whether to continue dialogue processing or conclude the threading session. This decision utilizes conversation completion analysis that evaluates dialogue satisfaction and goal achievement, implements user engagement assessment that measures continued interaction interest, and applies continuation criteria that balance user preferences with system resource constraints. When continuation is selected, the method implements a feedback loop that returns processing to receiving user input 1801, enabling iterative dialogue progression with continuous learning and adaptation.

Throughout the entire process flow, the method maintains bidirectional feedback mechanisms that enable continuous improvement of threading capabilities, geometric optimization, and personalization effectiveness. According to various embodiments, the method may implement different processing modes based on conversation complexity, computational resources, and user preferences, ensuring robust latent contextual threading performance across diverse dialogue scenarios while maintaining the core benefits of geometric manifold-based personalized conversation continuity and real-time adaptation capabilities.

Figure 19:
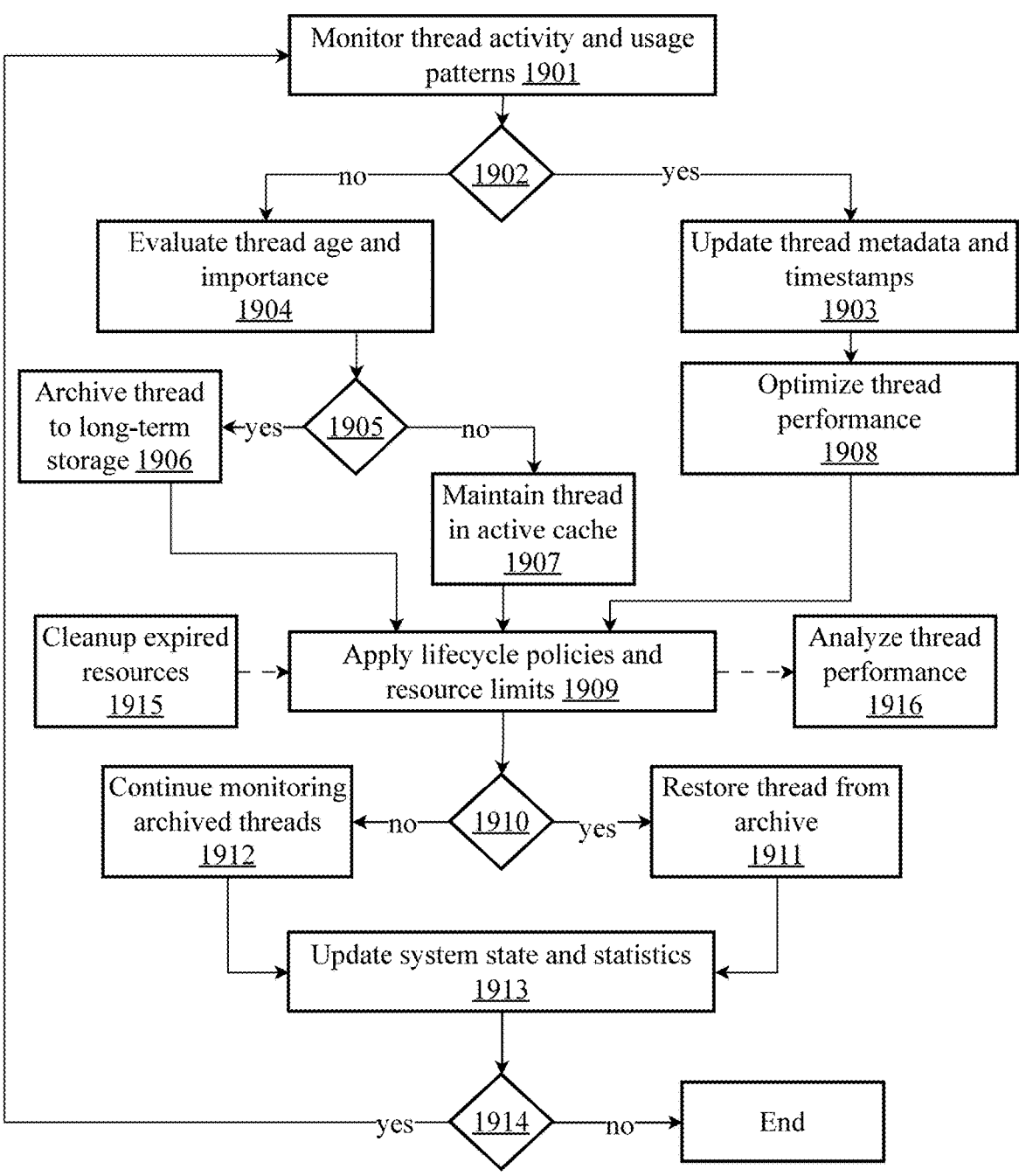
FIG. 19 is a flow diagram illustrating an exemplary method for implementing thread lifecycle management in latent contextual threading systems, according to an embodiment.

FIG. 19 is a flow diagram illustrating an exemplary method for implementing thread lifecycle management in latent contextual threading systems, according to an embodiment. The method demonstrates a lifecycle management process that efficiently manages dialogue threads throughout their complete existence from creation through archival and potential reactivation, implementing sophisticated resource management, performance optimization, and adaptive policies that balance system efficiency with dialogue continuity requirements while maintaining optimal user experience across extended temporal periods.

According to the embodiment, the process begins with monitoring thread activity and usage patterns at step 1901, implementing comprehensive surveillance algorithms that continuously track thread utilization, access frequencies, user engagement levels, and performance characteristics across all active and dormant dialogue threads. This monitoring process may utilize activity tracking algorithms that record thread access timestamps, usage frequency counters, and engagement quality metrics, implement pattern recognition techniques that identify thread usage trends and behavioral patterns, and perform statistical analysis operations that generate usage insights and lifecycle recommendations. According to various embodiments, monitoring thread activity and usage patterns 1901 may implement predictive monitoring algorithms that anticipate thread lifecycle transitions based on usage patterns, utilize multidimensional activity analysis that evaluates threads across temporal, semantic, and user-specific dimensions, and maintain monitoring optimization procedures that balance surveillance depth with computational efficiency requirements.

The system proceeds to evaluate thread activity status 1902, implementing decision algorithms that determine whether individual threads remain actively engaged in dialogue processes or have transitioned to inactive states requiring lifecycle management interventions. This evaluation process may utilize activity threshold analysis that compares current thread engagement against established activity criteria, implement temporal decay assessment that evaluates thread staleness based on last access times and interaction frequencies, and perform engagement quality evaluation that assesses the meaningfulness and value of recent thread interactions. According to various embodiments, determining thread active status 1902 may implement adaptive threshold algorithms that adjust activity criteria based on user behavior patterns and system load conditions, utilize multi-criteria decision frameworks that balance multiple activity indicators including temporal, semantic, and engagement factors, and maintain activity classification validation that ensures accurate thread status determination.

For threads identified as active, the method proceeds to update thread metadata and timestamps at step 1903, implementing maintenance procedures that preserve current thread state information and ensure accurate tracking of thread characteristics and usage patterns. This updating process may utilize metadata synchronization algorithms that maintain consistency between thread state and tracking information, implement timestamp precision management that ensures accurate temporal tracking across system operations, and perform metadata validation operations that verify information integrity and completeness. According to various embodiments, updating thread metadata and timestamps 1903 may implement incremental update strategies that minimize computational overhead while preserving essential tracking information, utilize metadata compression techniques that optimize storage efficiency for frequently updated information, and maintain metadata consistency validation that ensures synchronized information across distributed system components.

Active threads continue to optimize thread performance at step 1908, implementing performance enhancement algorithms that improve thread efficiency, response quality, and resource utilization based on current usage patterns and system conditions. This optimization process may utilize performance metric analysis that identifies enhancement opportunities, implement adaptive optimization strategies that adjust thread configurations based on usage characteristics, and perform optimization validation operations that ensure improvements provide genuine benefits without compromising thread functionality. According to various embodiments, optimizing thread performance 1908 may implement machine learning algorithms that identify optimal thread configurations based on historical performance data, utilize predictive optimization that anticipates performance requirements based on usage trends, and maintain optimization impact assessment that measures enhancement effectiveness and guides future optimization decisions.

For threads identified as inactive, the method evaluates thread age and importance at step 1904, implementing assessment algorithms that determine the lifecycle status and preservation value of dormant threads. This evaluation process may utilize temporal analysis algorithms that assess thread age relative to system policies and user preferences, implement importance scoring techniques that quantify thread value based on historical usage, semantic content, and user engagement characteristics, and perform retention recommendation generation that suggests appropriate lifecycle actions for individual threads. According to various embodiments, evaluating thread age and importance 1904 may implement multi-factor importance assessment that considers user-specific thread value, semantic uniqueness, and historical significance, utilize adaptive aging algorithms that adjust age assessment based on thread characteristics and usage patterns, and maintain importance prediction capabilities that anticipate future thread value based on user behavior trends and content analysis.

The system determines whether threads meet archive threshold criteria at decision point 1905, implementing decision algorithms that evaluate whether inactive threads should be archived to long-term storage or maintained in active cache systems. This determination process may utilize threshold analysis algorithms that compare thread characteristics against established archival criteria, implement resource optimization assessment that balances storage efficiency with accessibility requirements, and perform archival recommendation generation that suggests optimal storage strategies for individual threads. According to various embodiments, determining archive threshold 1905 may implement adaptive threshold algorithms that adjust archival criteria based on system capacity and user behavior patterns, utilize predictive archival modeling that anticipates optimal archival timing based on thread characteristics and usage trends, and maintain threshold optimization procedures that balance storage efficiency with thread accessibility requirements.

Threads meeting archival criteria proceed to archive thread to long-term storage at step 1906, implementing storage migration procedures that transfer thread data to efficient long-term storage systems while maintaining accessibility for potential future reactivation. This archival process may utilize data compression algorithms that optimize storage efficiency while preserving thread integrity, implement storage system selection that chooses appropriate archival platforms based on thread characteristics and access requirements, and perform archival validation operations that ensure successful data migration and storage integrity. According to various embodiments, archiving thread to long-term storage 1906 may implement intelligent compression strategies that balance storage efficiency with decompression speed for potential reactivation, utilize distributed archival systems that enhance data resilience and accessibility, and maintain archival indexing that enables efficient thread discovery and retrieval operations.

Threads not meeting archival criteria continue to maintain thread in active cache at step 1907, implementing cache management procedures that preserve thread accessibility while optimizing cache efficiency and resource utilization. This maintenance process may utilize cache optimization algorithms that arrange threads for optimal access patterns, implement cache capacity management that balances thread retention with system performance requirements, and perform cache validation operations that ensure maintained threads remain accessible and functional. According to various embodiments, maintaining thread in active cache 1907 may implement intelligent cache policies that prioritize thread retention based on predicted reactivation likelihood, utilize adaptive cache sizing that adjusts capacity based on system load and user behavior patterns, and maintain cache performance monitoring that optimizes access efficiency and resource utilization.

The method converges at applying lifecycle policies and resource limits at step 1909, implementing comprehensive policy enforcement that ensures thread management operations comply with system constraints and user preferences while optimizing overall system performance. This policy application process may utilize policy evaluation algorithms that assess current thread distributions against established guidelines, implement resource constraint enforcement that ensures thread management operations remain within system capacity limits, and perform policy optimization procedures that enhance lifecycle efficiency while maintaining user experience quality. According to various embodiments, applying lifecycle policies and resource limits 1909 may implement adaptive policy frameworks that adjust rules based on system conditions and user behavior evolution, utilize predictive resource management that anticipates capacity requirements based on thread lifecycle trends, and maintain policy compliance validation that ensures consistent application of lifecycle management rules.

The system evaluates potential reactivation requests at decision point 1910, implementing decision algorithms that determine whether archived or dormant threads should be restored to active status based on user needs and system conditions. This evaluation process may utilize reactivation criteria analysis that assesses the appropriateness of thread restoration requests, implement cost-benefit assessment that weighs reactivation benefits against resource requirements, and perform reactivation feasibility evaluation that ensures successful thread restoration capabilities. According to various embodiments, evaluating reactivation requests 1910 may implement intelligent reactivation prediction that anticipates likely thread restoration needs based on user behavior patterns, utilize adaptive reactivation criteria that adjust restoration thresholds based on system capacity and user preferences, and maintain reactivation success tracking that optimizes restoration processes based on historical outcomes.

When reactivation is appropriate, the method restores thread from archive at step 1911, implementing restoration procedures that efficiently recover archived thread data and restore full thread functionality within active system operations. This restoration process may utilize data decompression algorithms that efficiently restore archived thread information, implement state reconstruction procedures that rebuild thread context and geometric positioning, and perform restoration validation operations that ensure successfully reactivated threads maintain full functionality and integration with current system state. According to various embodiments, restoring thread from archive 1911 may implement intelligent restoration optimization that minimizes recovery time while preserving thread integrity, utilize predictive restoration that preemptively prepares likely reactivation candidates for faster recovery, and maintain restoration quality assessment that ensures reactivated threads provide equivalent functionality to originally active threads.

When reactivation is not required, the method continues monitoring archived threads at step 1912, implementing surveillance procedures that maintain oversight of archived content while minimizing resource consumption and preserving system efficiency. This monitoring process may utilize lightweight monitoring algorithms that track archived thread status with minimal computational overhead, implement periodic archived content assessment that evaluates long-term storage integrity and accessibility, and perform archived thread lifecycle evaluation that identifies optimization opportunities for long-term storage management.

Throughout the lifecycle management process, the method implements parallel processing operations including cleanup of expired resources at step 1915 and analyzing thread performance at step 1916. These concurrent processes enable efficient resource management and performance optimization without interrupting primary lifecycle management operations. The cleanup process implements resource reclamation algorithms that identify and remove obsolete thread data and expired system resources, while the performance analysis process implements monitoring algorithms that evaluate thread lifecycle efficiency and identify optimization opportunities.

The method concludes with updating system state and statistics at step 1913, implementing comprehensive state management that maintains accurate system-wide information about thread distributions, lifecycle statistics, and performance metrics. This updating process may utilize state synchronization algorithms that ensure consistent system information across distributed components, implement statistical aggregation techniques that generate meaningful insights about thread lifecycle patterns and system performance, and perform state validation operations that ensure accurate system state representation and statistical integrity.

The method comprises a continuation decision point 1914 that determines whether to continue lifecycle monitoring operations or conclude the management session. This decision utilizes system load assessment that evaluates computational capacity for continued monitoring, implements lifecycle completion analysis that determines whether management objectives have been achieved, and applies continuation criteria that balance ongoing monitoring benefits with resource conservation requirements. When continuation is selected, the method implements a feedback loop that returns processing to monitoring thread activity 1901, enabling continuous thread lifecycle management with adaptive optimization and learning capabilities.

Throughout the entire lifecycle management process, the method maintains comprehensive monitoring and optimization mechanisms that enable efficient resource utilization, optimal thread accessibility, and enhanced user experience through intelligent lifecycle management. According to various embodiments, the method may implement different management strategies based on system capacity, user behavior patterns, and performance requirements, ensuring robust thread lifecycle management across diverse operational scenarios while maintaining the core benefits of continuous dialogue availability and efficient resource utilization essential for effective latent contextual threading systems.

Figure 20:
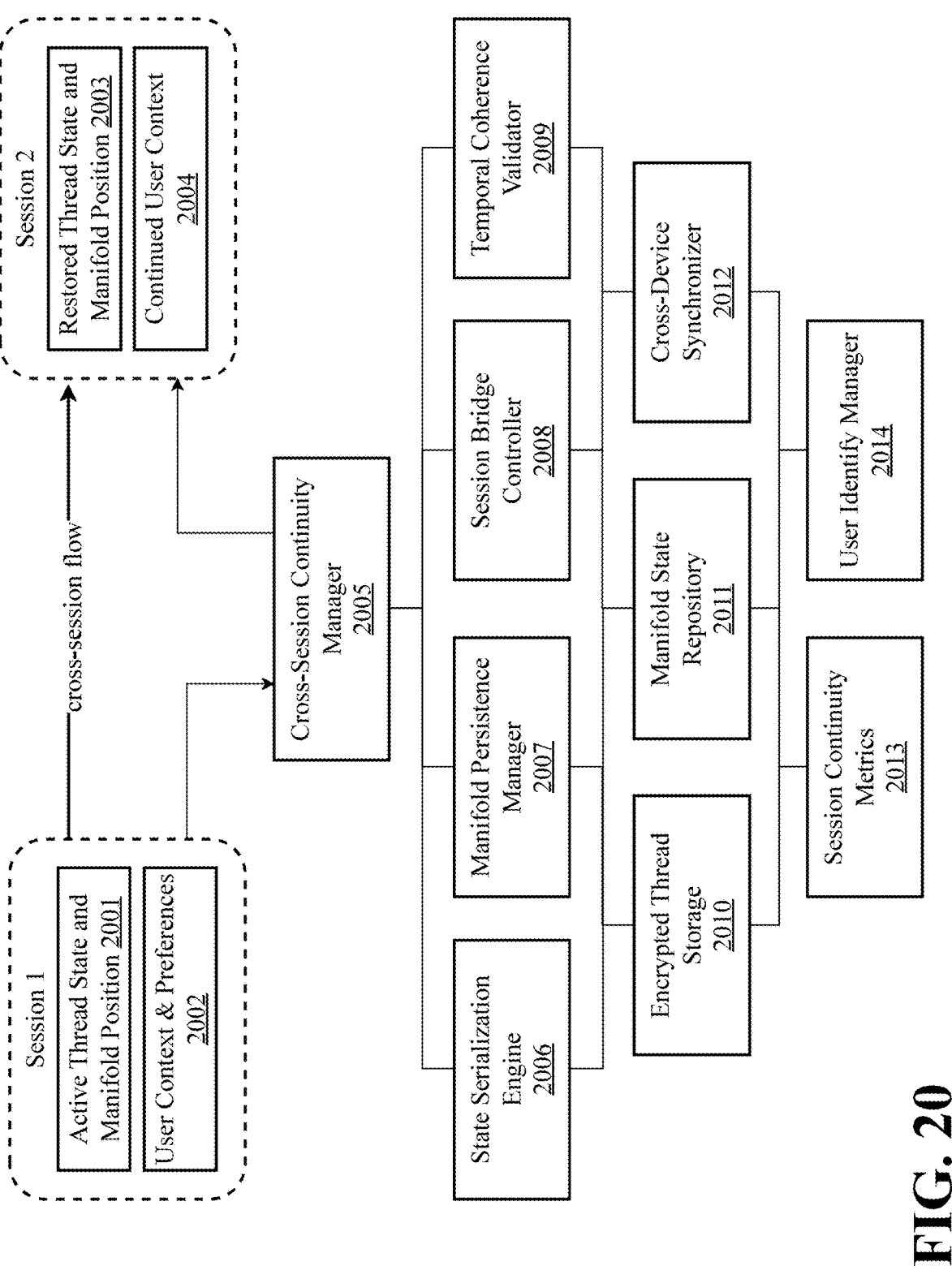
FIG. 20 is a block diagram illustrating an exemplary architecture for cross-session continuity in latent contextual threading systems, according to an embodiment.

FIG. 20 is a block diagram illustrating an exemplary architecture for cross-session continuity in latent contextual threading systems, according to an embodiment. The architecture demonstrates a system that maintains dialogue thread persistence and personalized manifold states across temporal boundaries, session interruptions, and device transitions, enabling seamless conversation resumption while preserving all threading context, geometric positioning, and personalization characteristics that have been developed through previous interactions.

The architecture spans multiple temporal contexts, with Session 1 representing the concluding state of a previous dialogue interaction and Session 2 representing the initiation of a subsequent interaction following a temporal discontinuity. This temporal bridging capability addresses a critical limitation of traditional dialogue systems that lose conversational context and personalization characteristics when sessions end, providing instead a persistent cognitive architecture that maintains continuity across arbitrary time periods and interaction contexts.

Within Session 1, the system captures active thread state and manifold position 2001, implementing one or more state extraction algorithms that preserve all essential characteristics of ongoing dialogue threads including geometric coordinates within the personalized cognitive manifold, thread metadata encompassing conversation history and context parameters, trajectory information including path histories and velocity vectors that characterize conversation momentum, and threading relationships that define connections between multiple simultaneous dialogue contexts. According to various embodiments, capturing active thread state and manifold position 2001 may implement real-time state monitoring that continuously updates thread characteristics during active dialogue, utilize predictive state capture that anticipates likely session termination and prepares state information accordingly, and maintain state validation procedures that ensure captured information maintains sufficient detail for accurate restoration.

Simultaneously, the system preserves user context and preferences 2002, implementing comprehensive user profile management that captures personalization characteristics, interaction preferences, dialogue style indicators, and learned behavioral patterns that inform future dialogue generation strategies. This preservation process may utilize preference extraction algorithms that identify user-specific dialogue characteristics from interaction patterns, implement context summarization techniques that capture essential conversational themes and topics without overwhelming storage requirements, and perform preference validation operations that ensure captured preferences accurately represent user characteristics and provide meaningful personalization guidance.

Cross-session continuity manager 2005 serves as the central orchestration component that coordinates all continuity operations, implementing comprehensive session bridging algorithms that manage the transition from active dialogue states to persistent storage and subsequent restoration to active dialogue capabilities. The manager may implement session lifecycle monitoring that tracks dialogue progression and identifies optimal state capture timing, utilize continuity strategy selection that determines appropriate preservation and restoration approaches based on dialogue characteristics and user preferences, and perform continuity validation operations that ensure successful session bridging while maintaining dialogue quality and user experience continuity.

State serialization engine 2006 transforms active dialogue states into persistent storage formats, implementing sophisticated serialization algorithms that preserve essential thread characteristics while optimizing storage efficiency and restoration speed. The engine may utilize geometric state encoding that preserves manifold coordinates and trajectory information in compact but complete representations, implement thread relationship serialization that maintains connections between multiple dialogue threads and their interdependencies, and perform serialization validation operations that ensure complete information preservation and successful restoration capabilities. According to various embodiments, state serialization engine 2006 can implement adaptive serialization strategies that adjust information density based on thread importance and usage patterns, utilize compression techniques optimized for geometric and conversational data characteristics, and maintain serialization versioning that enables restoration across system updates and architectural modifications.

Manifold persistence manager 2007 specifically addresses the preservation of geometric manifold states, implementing specialized algorithms for maintaining the mathematical properties and geometric relationships that define personalized cognitive spaces. The manager may utilize manifold state encoding that preserves metric tensor properties, curvature characteristics, and geometric structure in mathematically consistent formats, implement coordinate system preservation that maintains geometric relationships across storage and restoration cycles, and perform manifold validation operations that ensure preserved geometric properties maintain mathematical integrity and dialogue generation effectiveness. According to various embodiments, manifold persistence manager 2007 may implement differential manifold storage that preserves only geometric changes rather than complete manifold states for enhanced efficiency, utilize manifold compression techniques that balance storage optimization with geometric precision requirements, and maintain manifold evolution tracking that enables analysis of personalization development over extended temporal periods.

Session bridge controller 2008 orchestrates the complex transition between session termination and session initiation, implementing coordination algorithms that ensure smooth continuity operations while managing system resources and maintaining performance standards. The controller may implement bridge timing optimization that determines optimal moments for state capture and restoration operations, utilize resource allocation strategies that balance continuity operations with ongoing system performance requirements, and perform bridge validation procedures that ensure successful session transitions without data loss or functionality degradation. According to various embodiments, session bridge controller 2008 may implement predictive bridging that anticipates session transitions and prepares continuity operations in advance, utilize adaptive bridging strategies that adjust transition approaches based on dialogue complexity and system conditions, and maintain bridge quality assessment that measures continuity effectiveness and identifies optimization opportunities.

Temporal coherence validator 2009 ensures that restored dialogue states maintain semantic and contextual coherence despite temporal discontinuities, implementing validation algorithms that assess the appropriateness and effectiveness of cross-session continuity operations. The validator may implement coherence measurement techniques that quantify the semantic consistency between pre-interruption and post-restoration dialogue states, utilize temporal alignment algorithms that ensure restored contexts remain relevant and meaningful for continued dialogue, and perform coherence optimization procedures that enhance restoration quality through intelligent context adaptation. According to various embodiments, temporal coherence validator 2009 may implement adaptive coherence standards that adjust validation criteria based on temporal gap duration and context evolution, utilize predictive coherence modeling that anticipates potential coherence challenges and implements preventive measures, and maintain coherence learning capabilities that improve validation effectiveness based on restoration outcomes and user feedback.

The architecture incorporates a storage layer comprising encrypted thread storage 2010, manifold state repository 2011, and cross-device synchronizer 2012. Encrypted thread storage 2010 provides secure persistence for dialogue thread data, building upon privacy and security mechanisms while extending capabilities for cross-session requirements. Manifold state repository 2011 implements specialized storage optimized for geometric manifold data, utilizing mathematical data structures and storage formats that preserve geometric properties and enable efficient restoration of complex mathematical relationships. Cross-device synchronizer 2012 extends continuity capabilities across different devices and platforms, adapting synchronization techniques to enable seamless dialogue continuation regardless of device transitions.

Session continuity metrics 2013 provides comprehensive monitoring and assessment of continuity effectiveness, implementing measurement algorithms that quantify restoration success rates, dialogue quality preservation, user satisfaction with continuity operations, and system performance impacts of cross-session operations. The metrics system may utilize continuity quality scoring that generates quantitative assessments of restoration effectiveness, implement trend analysis that identifies patterns in continuity performance and optimization opportunities, and perform comparative analysis that benchmarks continuity effectiveness across different user types and dialogue characteristics.

User identity manager 2014 ensures appropriate user authentication and identity preservation across session boundaries, implementing security and identity verification algorithms that maintain user privacy while enabling personalized continuity operations. The manager may utilize identity verification techniques that confirm user authorization for accessing preserved dialogue states, implement privacy protection mechanisms that ensure user data remains secure during storage and restoration operations, and perform identity consistency validation that ensures restored personalization characteristics correspond to appropriate user profiles.

In Session 2, the architecture demonstrates successful continuity through restored thread state and manifold position 2003 and continued user context 2004. The restoration process implements comprehensive state reconstruction algorithms that transform stored representations back into active dialogue capabilities, ensuring that restored threads maintain full functionality and geometric positioning equivalent to pre-interruption states. The system validates restoration success through continued user context 2004, confirming that personalization characteristics, preferences, and dialogue patterns remain consistent and effective for ongoing interaction.

Throughout operation, the cross-session continuity architecture maintains bidirectional synchronization between processing components and storage systems, enabling continuous optimization of continuity operations while preserving system performance and user experience quality. The architecture implements temporal bridging that spans arbitrary time periods, from brief interruptions to extended temporal gaps, ensuring robust dialogue continuity regardless of session duration or interruption characteristics.

According to various embodiments, the system may implement different continuity strategies based on temporal gap duration, dialogue complexity, and user preferences, ensuring optimal continuity performance across diverse usage scenarios while maintaining the core benefits of persistent, personalized dialogue experiences that transcend individual session boundaries.

Figure 21:
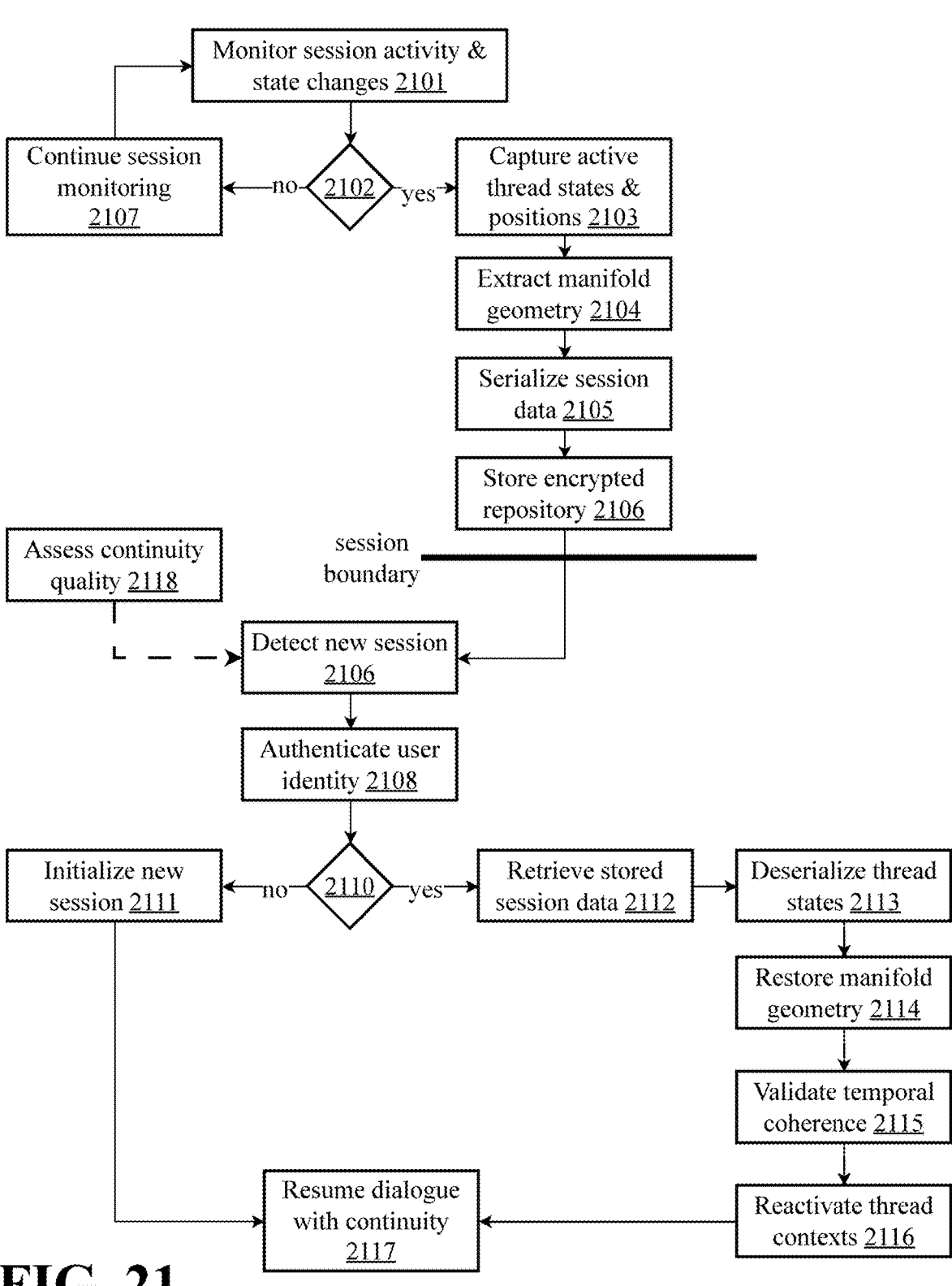
FIG. 21 is a flow diagram illustrating an exemplary method for implementing cross-session continuity in latent contextual threading systems, according to an embodiment.

FIG. 21 is a flow diagram illustrating an exemplary method for implementing cross-session continuity in latent contextual threading systems, according to an embodiment. The method demonstrates a process flow that enables seamless preservation and restoration of dialogue threads and personalized manifold states across temporal boundaries, session interruptions, and device transitions, ensuring dialogue continuity while maintaining geometric positioning, threading context, and personalization characteristics developed through previous interactions.

According to the embodiment, the process begins with monitoring session activity and state changes at step 2101, implementing comprehensive surveillance algorithms that continuously track dialogue session status, user engagement levels, system performance metrics, and environmental conditions that may indicate impending session termination. This monitoring process can utilize activity detection algorithms that analyze user interaction patterns including response timing, engagement frequency, and communication intensity, implement predictive termination analysis that identifies likely session conclusion scenarios based on behavioral patterns and contextual indicators, and perform proactive state preparation that optimizes system readiness for potential continuity operations. According to various embodiments, monitoring session activity and state changes 2101 may implement machine learning algorithms trained on user behavior patterns to predict session termination timing, utilize multi-modal monitoring that combines explicit termination signals with implicit behavioral indicators, and maintain monitoring optimization procedures that balance surveillance depth with computational efficiency requirements.

The system evaluates session termination status at decision point 2102, implementing decision algorithms that determine whether current dialogue sessions are concluding and require continuity preservation operations or continue active operation requiring ongoing monitoring. This evaluation process may utilize termination signal analysis that detects explicit session closure requests, implement implicit termination detection that identifies session conclusion through behavioral pattern analysis, and perform termination confidence assessment that quantifies the likelihood and urgency of continuity operations. According to various embodiments, determining session ending status 2102 may implement adaptive termination thresholds that adjust detection sensitivity based on user patterns and session characteristics, utilize multi-criteria decision frameworks that balance multiple termination indicators including temporal, behavioral, and environmental factors, and maintain termination prediction validation that ensures accurate session status determination without premature or delayed continuity activation.

When session termination is detected, the method proceeds to capture active thread states and positions at step 2103, implementing comprehensive state extraction algorithms that preserve all essential characteristics of ongoing dialogue threads including geometric coordinates within personalized cognitive manifolds, thread metadata encompassing conversation histories and contextual parameters, trajectory information including path histories and velocity vectors that characterize conversation momentum, and threading relationships that define connections between multiple simultaneous dialogue contexts. This capture process may utilize real-time state extraction that minimizes disruption to ongoing dialogue operations, implement priority-based capture that focuses preservation efforts on most critical thread characteristics, and perform capture validation operations that ensure complete information preservation for successful restoration. According to various embodiments, capturing active thread states and positions 2103 may implement intelligent state prioritization that focuses capture operations on threads most likely to require restoration, utilize incremental capture techniques that continuously update preserved state information during active dialogue, and maintain capture optimization procedures that balance preservation completeness with computational efficiency.

The system proceeds to extract manifold geometry at step 2104, implementing specialized algorithms for preserving the mathematical properties and geometric relationships that define personalized cognitive spaces. This extraction process may utilize manifold state encoding that preserves metric tensor properties, curvature characteristics, and geometric structure in mathematically consistent formats, implement coordinate system preservation that maintains geometric relationships and mathematical integrity across storage cycles, and perform geometric validation operations that ensure preserved manifold properties retain mathematical coherence and dialogue generation effectiveness. According to various embodiments, extracting manifold geometry 2104 may implement differential geometric extraction that preserves essential manifold characteristics while optimizing storage efficiency, utilize geometric compression techniques that balance preservation fidelity with storage requirements, and maintain geometric consistency validation that ensures extracted manifold information maintains mathematical rigor and operational effectiveness.

The method continues with serializing session data at step 2105, implementing sophisticated encoding algorithms that transform active dialogue states and geometric information into persistent storage formats optimized for security, efficiency, and restoration accuracy. This serialization process may utilize adaptive encoding strategies that adjust information density based on thread importance and restoration requirements, implement compression techniques optimized for geometric and conversational data characteristics, and perform serialization validation operations that ensure complete information preservation and successful restoration capabilities. According to various embodiments, serializing session data 2105 may implement versioned serialization that enables restoration across system updates and architectural modifications, utilize encryption-aware serialization that optimizes data formats for secure storage requirements, and maintain serialization quality assessment that validates encoding effectiveness and restoration viability.

The system stores data in encrypted repository at step 2106, implementing secure storage operations that preserve serialized session information while maintaining privacy, security, and accessibility requirements for future restoration operations. This storage process may utilize encryption algorithms that protect user data while maintaining restoration efficiency, implement distributed storage strategies that enhance data resilience and availability, and perform storage validation operations that ensure successful data persistence and accessibility. According to various embodiments, storing in encrypted repository 2106 may implement intelligent storage allocation that optimizes storage location based on predicted restoration requirements and access patterns, utilize redundant storage mechanisms that enhance data resilience against system failures, and maintain storage monitoring that tracks data integrity and accessibility over extended temporal periods.

For sessions that do not require immediate termination, the method continues session monitoring at step 2107, implementing ongoing surveillance operations that maintain session oversight while minimizing computational overhead and preserving system performance for active dialogue operations. This continued monitoring may utilize lightweight monitoring algorithms that track essential session characteristics without disrupting dialogue flow, implement adaptive monitoring intensity that adjusts surveillance depth based on session characteristics and termination likelihood, and perform monitoring optimization that balances oversight effectiveness with resource conservation.

Following temporal discontinuity, the method detects new session initiation at step 2108, implementing session establishment algorithms that identify user attempts to resume dialogue interactions and prepare system resources for potential continuity restoration operations. This detection process may utilize session initiation signal analysis that recognizes explicit session startup requests, implement implicit initiation detection that identifies session commencement through user behavior patterns, and perform initiation validation operations that confirm legitimate session establishment requests. According to various embodiments, detecting new session initiation 2108 may implement predictive session detection that anticipates likely session resumption based on user patterns and temporal characteristics, utilize multi-channel initiation monitoring that accommodates various session startup mechanisms, and maintain initiation optimization procedures that minimize session establishment latency while ensuring security and validation requirements.

The system authenticates user identity at step 2109, implementing comprehensive authentication algorithms that verify user authorization for accessing preserved dialogue states while maintaining security and privacy protections. This authentication process may utilize multi-factor authentication techniques that confirm user identity through multiple verification channels, implement adaptive authentication requirements that adjust security measures based on data sensitivity and access context, and perform authentication validation operations that ensure successful identity verification without compromising security standards. According to various embodiments, authenticating user identity 2109 may implement biometric authentication integration that enhances security while maintaining user convenience, utilize contextual authentication that adjusts verification requirements based on access patterns and risk assessment, and maintain authentication optimization that balances security requirements with user experience considerations.

The method evaluates previous data availability at decision point 2110, implementing decision algorithms that determine whether stored session data exists for the authenticated user and assess the appropriateness of continuity restoration operations. This evaluation process may utilize data availability assessment that confirms the existence and accessibility of preserved session information, implement restoration feasibility analysis that evaluates the viability of continuity operations based on data quality and temporal characteristics, and perform restoration recommendation generation that suggests optimal continuity strategies based on available information and user preferences.

For users without previous session data, the method initializes new session at step 2111, implementing session establishment procedures that create fresh dialogue contexts while maintaining system optimization and user experience standards. This initialization process may utilize default session configuration that establishes baseline dialogue capabilities, implement user preference integration that customizes new sessions based on available user information, and perform initialization validation that ensures successful session establishment and functionality.

When previous session data is available, the system retrieves stored session data at step 2112, implementing data access algorithms that efficiently recover preserved session information from encrypted repositories while maintaining security and performance standards. This retrieval process may utilize optimized data access techniques that minimize restoration latency, implement decryption operations that securely access protected session information, and perform retrieval validation that ensures successful data recovery and integrity verification.

The method proceeds to deserialize thread states at step 2113, implementing reconstruction algorithms that transform stored session representations back into active dialogue thread structures. This deserialization process may utilize adaptive reconstruction strategies that optimize restoration accuracy and efficiency, implement validation procedures that ensure reconstructed threads maintain functional integrity, and perform compatibility assessment that ensures restored threads integrate effectively with current system configuration.

The system restores manifold geometry at step 2114, implementing geometric reconstruction algorithms that rebuild personalized cognitive manifold states from preserved mathematical representations. This restoration process may utilize manifold reconstruction techniques that preserve geometric properties and mathematical relationships, implement coordinate system restoration that maintains positional accuracy and geometric consistency, and perform geometric validation that ensures restored manifolds maintain mathematical integrity and dialogue generation effectiveness.

The method validates temporal coherence at step 2115, implementing coherence assessment algorithms that evaluate the semantic and contextual consistency of restored dialogue states despite temporal discontinuities. This validation process may utilize coherence measurement techniques that quantify semantic consistency between preinterruption and post-restoration states, implement temporal alignment algorithms that ensure restored contexts remain relevant and meaningful, and perform coherence optimization that enhances restoration quality through intelligent context adaptation.

The system reactivates thread contexts at step 2116, implementing activation algorithms that restore full thread functionality and integration with active dialogue operations. This reactivation process may utilize thread integration techniques that seamlessly incorporate restored threads into current dialogue processing, implement context synchronization that aligns restored thread contexts with current system state, and perform activation validation that ensures reactivated threads provide equivalent functionality to originally active threads.

Throughout the restoration process, the method implements parallel quality assessment operations through assess continuity quality at step 2118, enabling concurrent evaluation of restoration effectiveness without interrupting primary continuity operations. This quality assessment process implements monitoring algorithms that track restoration success rates, dialogue quality preservation, and user satisfaction with continuity operations.

The method culminates with resuming dialogue with continuity at step 2117, implementing integration algorithms that transition from restoration operations to active dialogue processing while maintaining the preserved threading context, geometric positioning, and personalization characteristics. This resumption process may utilize dialogue integration techniques that blend restored contexts with current interaction requirements, implement continuity validation that ensures successful restoration and dialogue quality preservation, and perform resumption optimization that enhances dialogue flow and user experience following continuity operations.

Throughout the entire cross-session continuity process, the method maintains comprehensive error handling, rollback capabilities, and performance optimization mechanisms that ensure robust continuity operations across diverse temporal scenarios and system conditions. According to various embodiments, the method may implement different continuity strategies based on temporal gap duration, data availability, and user preferences, ensuring optimal restoration performance while maintaining the core benefits of persistent, personalized dialogue experiences that transcend individual session boundaries and provide seamless conversational continuity across arbitrary temporal discontinuities.

Hardware Architecture

Figure 22:
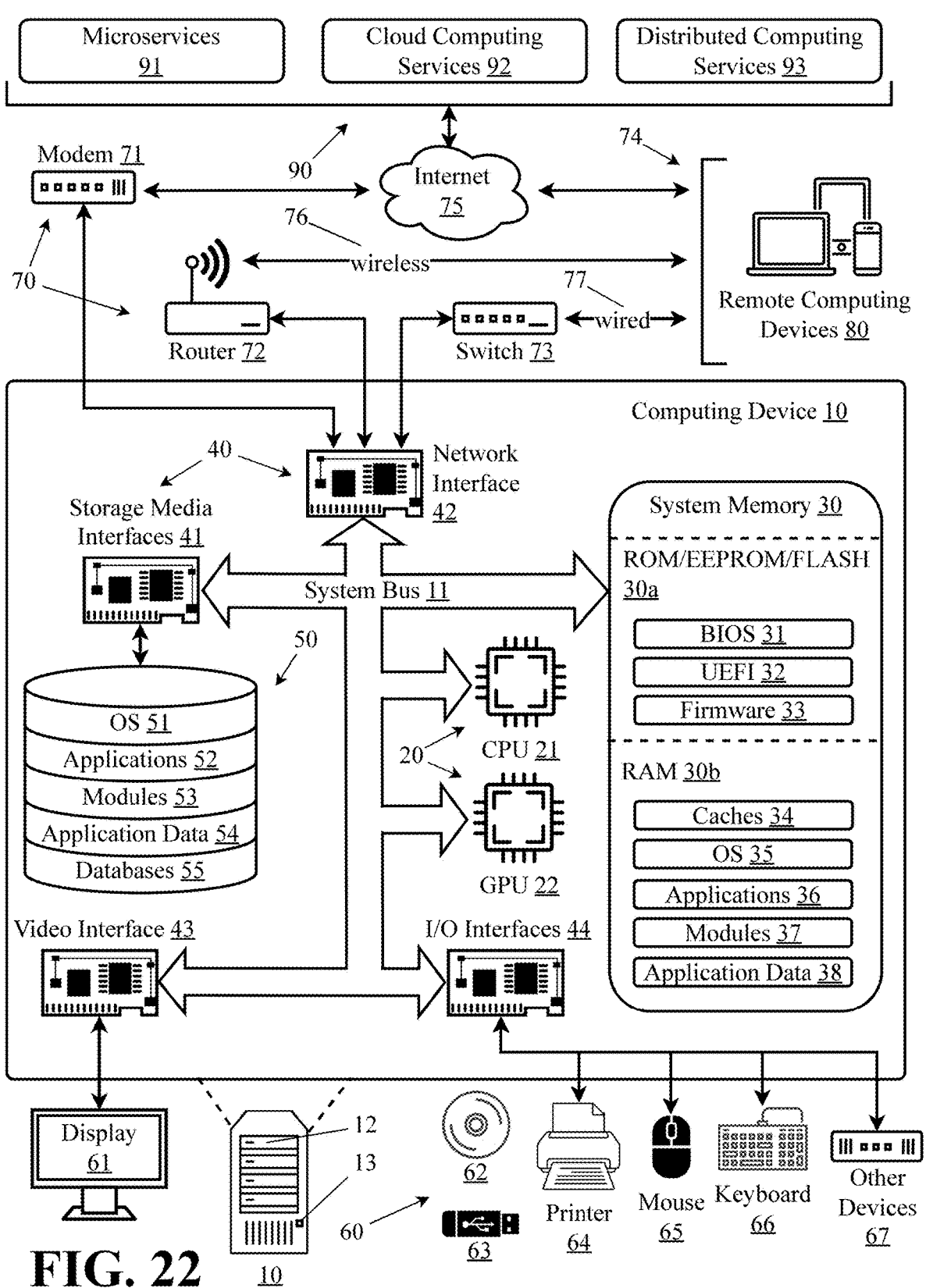
FIG. 22 illustrates an exemplary computing environment on which an embodiment described herein may be implemented.

FIG. 22 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance. There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Container provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Federated distributed computing services 93 provide large-scale processing using multiple interconnected computers or nodes to solve computational problems or perform tasks collectively. In federated distributed computing, the processing and storage capabilities of multiple machines are leveraged to work together as a unified system, even when different tiers or tessellations may have limited or even no visibility into the resources and processing layer up or downstream. Federated distributed computing services are designed to address problems that cannot be efficiently solved by a single computer or that require large-scale computational power and require dynamism and workload distribution for economic, security or privacy reasons not well supported by canonical distributed computing resources; e.g. most commonly cloud-based computing applications, resources or analytics. Federated DCG coordinated variants of these services enable superior decentralization and further enhance parallel processing, fault tolerance, and scalability by distributing tasks across multiple tiers or tessellations while enabling computing process dependency calculation with varying degrees of visibility, assurance and privacy or security based on constituent computing system, network, workload and user or provider needs and preferences as well as practical legal and regulatory concerns to include but not limited to data localization, national data transfer restrictions, privacy and consumer protections, wiretap/telecommunications monitoring requirements, encryption and data routing and intermediate processing restrictions.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system for latent contextual threading for personalized dialogue comprising a hardware memory, wherein the computer system is configured to execute software instructions stored on nontransitory machine-readable storage media that:

implement a personalized cognitive manifold as a Riemannian manifold with time-evolving metric tensors that encode dialogue preference strength through local curvature properties in latent space that encodes user-specific dialogue patterns as navigable geometric structures;

maintain multiple dialogue contexts as geometric trajectories within the personalized cognitive manifold, wherein dialogue responses are generated through manifold traversal comprising calculating geodesic paths through the personalized cognitive manifold and navigating along computed trajectories to maintain semantic coherence, rather than discrete context retrieval; and modify the geometric structure of the personalized cognitive manifold based on user interactions by processing user feedback through geometric deformation algorithms that implement curvature flow equations to evolve metric tensor properties of the personalized cognitive manifold based on user interaction patterns, to improve dialogue personalization through bidirectional adaptation;

wherein dialogue continuity is maintained through geometric trajectory following within the personalized cognitive manifold, enabling persistent conversations that adapt to user preferences through real-time manifold geometry modifications.

2. The computer system of claim 1, wherein maintaining multiple dialogue contexts comprises implementing a contextual thread manager that assigns unique thread identifiers and tracks manifold coordinate positions for each dialogue trajectory.

3. The computer system of claim 1, wherein modifying the geometric structure comprises computing curvature adjustments based on user interaction patterns and implementing geometric flow processes that reshape manifold properties while preserving mathematical consistency.

4. The computer system of claim 1, wherein the computer system is further configured to execute software instructions that preserve dialogue trajectory states across session boundaries by serializing manifold geometry and restoring geometric positioning during session resumption.

5. The computer system of claim 1, wherein the computer system is further configured to execute software instructions that evaluate dialogue coherence through geometric analysis including Ricci curvature calculations and geodesic deviation measurements within the manifold.

6. The computer system of claim 1, wherein the bidirectional adaptation comprises analyzing user engagement patterns and implementing real-time metric tensor modifications that adjust manifold distance relationships to reflect learned user preferences.

7. A method for latent contextual threading for personalized dialogue comprising the steps of:

implementing a personalized cognitive manifold as a Riemannian manifold with time-evolving metric tensors that encode dialogue preference strength through local curvature properties in latent space that encodes user-specific dialogue patterns as navigable geometric structures;

maintaining multiple dialogue contexts as geometric trajectories within the personalized cognitive manifold, wherein dialogue responses are generated through manifold traversal comprising calculating geodesic paths through the personalized cognitive manifold and navigating along computed trajectories to maintain semantic coherence, rather than discrete context retrieval; and modifying the geometric structure of the personalized cognitive manifold based on user interactions by processing user feedback through geometric deformation algorithms that implement curvature flow equations to evolve metric tensor properties of the personalized cognitive manifold based on user interaction patterns, to improve dialogue personalization through bidirectional adaptation;

wherein dialogue continuity is maintained through geometric trajectory following within the personalized cognitive manifold, enabling persistent conversations that adapt to user preferences through real-time manifold geometry modifications.

8. The method of claim 7, wherein maintaining multiple dialogue contexts comprises implementing a contextual thread manager that assigns unique thread identifiers and tracks manifold coordinate positions for each dialogue trajectory.

9. The method of claim 7, wherein modifying the geometric structure comprises computing curvature adjustments based on user interaction patterns and implementing geometric flow processes that reshape manifold properties while preserving mathematical consistency.

10. The method of claim 7, further comprising preserving dialogue trajectory states across session boundaries by serializing manifold geometry and restoring geometric positioning during session resumption.

11. The method of claim 7, further comprising evaluating dialogue coherence through geometric analysis including Ricci curvature calculations and geodesic deviation measurements within the manifold.

12. The method of claim 7, wherein the bidirectional adaptation comprises analyzing user engagement patterns and implementing real-time metric tensor modifications that adjust manifold distance relationships to reflect learned user preferences.

\* \* \* \* \*